US012437335B1

United States Patent
Criddle et al.

(10) Patent No.: US 12,437,335 B1
(45) Date of Patent: Oct. 7, 2025

(54) METHOD, MEDIUM, AND SYSTEM FOR CATEGORY COMPOSITION AND WEIGHTING SELECTION

(71) Applicant: Acquisition Simplicity, LLC, Liberty Lake, WA (US)

(72) Inventors: Shane Criddle, Liberty Lake, WA (US); Matthew Ary, Liberty Lake, WA (US)

(73) Assignee: Acquisition Simplicity, LLC, Liberty Lake, WA (US)

(*) Notice: Subject to any disclaimer, the term of this patent is extended or adjusted under 35 U.S.C. 154(b) by 906 days.

(21) Appl. No.: 17/673,570

(22) Filed: Feb. 16, 2022

Related U.S. Application Data

(63) Continuation-in-part of application No. 15/870,124, filed on Jan. 12, 2018, now abandoned, which is a
(Continued)

(51) Int. Cl.
*G06Q 30/00* (2023.01)
*G06F 16/2457* (2019.01)
(Continued)

(52) U.S. Cl.
CPC ....... *G06Q 30/08* (2013.01); *G06F 16/24578* (2019.01); *G06F 16/335* (2019.01); *G06Q 30/0633* (2013.01)

(58) Field of Classification Search
CPC ............... G06Q 30/08; G06Q 30/0633; G06F 16/24578; G06F 16/335
See application file for complete search history.

(56) References Cited

U.S. PATENT DOCUMENTS 5,765,138 A * 6/1998 Aycock ............... G06Q 30/06
705/7.41
7,302,429 B1 * 11/2007 Wanker ............ G06Q 30/0623
707/999.005
(Continued)

FOREIGN PATENT DOCUMENTS

| CN | 105190616 A | * | 12/2015 | ....... G06F 16/24578 |
| GB | 2374690 A | * | 10/2002 | ............. G06Q 30/02 |

(Continued)

OTHER PUBLICATIONS

Albadvi, Amir, and Mohammad Shahbazi. "A hybrid recommendation technique based on product category attributes." Expert Systems with Applications 36.9 (2009): 11480-11488. (Year: 2009).*
(Continued)

*Primary Examiner* — Matthew E Zimmerman
(74) *Attorney, Agent, or Firm* — Lee & Hayes, P.C.

(57) ABSTRACT

Techniques for evaluating ability of multiple vendors to meet one or more requirements may include receiving information regarding items to be acquired (e.g., enterprise requirements, item requirements, relative importance data, etc.) and items available for purchase (e.g., data regarding items and their capabilities/characteristics available from multiple different vendors), ranking the vendors, and presenting a graphical user interface (GUI) including a slider usable to evaluate performance level verses total cost of acquiring items from individual vendors. Based on user input changing a position of the slider, the system may be configured to automatically update the GUI to display changes to the ranking of the plurality of vendors based on receiving the user input changing the position of the slider control.

22 Claims, 32 Drawing Sheets

Related U.S. Application Data continuation of application No. 15/162,956, filed on May 24, 2016, now abandoned.

(51) Int. Cl.
*G06F 16/335* (2019.01)
*G06Q 30/0601* (2023.01)
*G06Q 30/08* (2012.01)

(56) References Cited

U.S. PATENT DOCUMENTS

| | | | |
|---|---|---|---|
| 7,330,826 B1* | 2/2008 | Porat | G06Q 40/04 705/37 |
| 8,519,824 B1 | 8/2013 | Rankin et al. | |
| 8,615,441 B1 | 12/2013 | Fuss et al. | |
| 9,058,364 B2* | 6/2015 | Haveliwala | G06F 16/9535 |
| 9,569,419 B1 | 2/2017 | Rice | |
| 2001/0049615 A1 | 12/2001 | Wong et al. | |
| 2001/0051913 A1* | 12/2001 | Vashistha | G06Q 40/04 705/37 |
| 2003/0065562 A1 | 4/2003 | Matsui et al. | |
| 2003/0167224 A1 | 9/2003 | Periwal | |
| 2004/0199455 A1 | 10/2004 | Saliba | |
| 2005/0086291 A1 | 4/2005 | Jadanovski et al. | |
| 2006/0089898 A1 | 4/2006 | Durkin et al. | |
| 2007/0083437 A1 | 4/2007 | Hamor | |
| 2007/0130059 A1* | 6/2007 | Lee | G06Q 30/08 705/37 |
| 2007/0282940 A1 | 12/2007 | Sakurai | |
| 2008/0015876 A1 | 1/2008 | Harasimowicz et al. | |
| 2008/0015889 A1 | 1/2008 | Fenster | |
| 2009/0063304 A1 | 3/2009 | Meggs | |
| 2009/0158170 A1 | 6/2009 | Narayanan et al. | |
| 2009/0182592 A1* | 7/2009 | Ballaro | G06Q 50/163 705/26.81 |
| 2010/0063835 A1 | 3/2010 | Kenedy et al. | |
| 2010/0121752 A1* | 5/2010 | Banigan | G06Q 40/04 705/37 |
| 2010/0169955 A1 | 7/2010 | Happonen et al. | |
| 2010/0318435 A1 | 12/2010 | Ramanathan et al. | |
| 2011/0029405 A1* | 2/2011 | Cronin | G06Q 30/08 707/748 |
| 2011/0106850 A1* | 5/2011 | Li | G06F 16/335 707/E17.014 |
| 2012/0036455 A1 | 2/2012 | Holt et al. | |
| 2013/0024313 A1 | 1/2013 | Dayal et al. | |
| 2013/0238471 A1 | 9/2013 | Maraz et al. | |
| 2014/0129391 A1 | 5/2014 | Kreuels et al. | |
| 2016/0342692 A1* | 11/2016 | Bennett | G06F 16/9535 |
| 2017/0345090 A1 | 11/2017 | Criddle | |
| 2018/0137562 A1 | 5/2018 | Criddle | |

FOREIGN PATENT DOCUMENTS

| | | | |
|---|---|---|---|
| NZ | 519176 A * | 11/2004 | G06Q 30/08 |
| WO | WO-2016027172 A1 * | 2/2016 | G06F 16/24578 |

OTHER PUBLICATIONS

Office Action for U.S. Appl. No. 15/870,124, mailed on Mar. 31, 2021, Criddle, "Processing for Requirement Requests", 16 pages.
Office action for U.S. Appl. No. 15/162,956, mailed on Mar. 13, 2017, Criddle, "Processing for Requirement Requests", 40 pages.
Office action for U.S. Appl. No. 15/162,956, mailed on Sep. 1, 2016, Criddle, "Processing for Requirement Requests", 28 pages.
Office action for U.S. Appl. No. 15/162,956, mailed on Sep. 12, 2017, Criddle, "Processing for Requirement Requests", 40 pages.

* cited by examiner

Project - 1

○ 1: PROJECT SETUP    ○ 2: MANAGE REQ'S    ○ 3: MANAGE VENDORS    ○ 4: REPORTS    ○ 5: AWARD

Project Setup

◎ INFORMATION    ◎ LOCATIONS    ◎ TEAM MEMBERS    ◎ ENTERPRISE REQUIREMENTS    ◎ ADMINISTRATION

Project Name
Project-1

Project Description
This description will be visible to all users who participate in this project, including vendor users Normal ◆ B I U ⌘ ▦

*Insert text here*

[ SAVE CHANGES ]

Project Files
Add relevant files and documents to the project Vendors will be required to e-sign for these documents.

DRAG AND DROP FILES HERE

FIG. 9

ENTERPRISE REQUIREMENTS

Technical
System Component Type
Electrocardiograph — 1802

Interfacing
Interface Options
Selections:
Local Area Network (LAN)  [802.11x Wireless (WLAN)] — 1804    Importance Value: [3]

Wireless
Encryption: WEP, WPA, WPA2 (Personal and Enterprise)
✓ Requested    Importance Value: [2]

Authentication: PAP, MS-CHAPv2, 802.1xEAP with TLS/TTLS/LEAP/PEAP/FAST
✓ Requested    Importance Value: [2]

FIPS 140-2 Compliance
✗ Rejected    Importance Value: [1]

Device Hardware
Size (Inches)
ⓘ This Characteristic Option is excluded from evaluation.    Importance Value: [0]

FIG. 18

VENDORCOST BREAKDOWN

| | Vendor 1 | Vendor3 | Vendor2 |
|---|---|---|---|
| Total Project Price: | $543,000 | $901,000 | $880,000 |
| Enterprise Requirements Amount: | $52,000 | $110,000 | $54,000 |
| LOCATION LOCATION 1 | Vendor 1 $87,200 | Vendor3 $126,000 | Vendor2 $122,000 |
| LOCATION LOCATION 2 | Vendor 1 $80,600 | Vendor3 $80,000 | Vendor2 $110,000 |
| LOCATION LOCATION 3 | Vendor 1 $99,700 | Vendor3 $175,000 | Vendor2 $297,500 |
| LOCATION LOCATION 4 | Vendor 1 $71,000 | Vendor3 $89,000 | Vendor2 $90,500 |

FIG. 20B

VENDOR COST BREAKDOWN

| | Vendor 1 | Vendor 3 | Vendor 2 |
|---|---|---|---|
| Total Project Price: | $543,000 | $901,000 | $880,000 |
| Total Lifecycle Cost Over 10 Years ▾ | $625,000 | $606,650 | $640,800 |

VENDOR 1  VENDOR 3  VENDOR 2

Recurring Costs ← 2018

| Name | Frequency | Cost |
|---|---|---|
| Software Support | Annually | $15,000 |
| Education | Annually | $15,000 |
| Warranty | Annually | $25,000 |

Episodic Costs ← 2020

| Name | Frequency | Cost |
|---|---|---|
| Software Updates | Every 3 Years | $20,000 |
| Network Evaluation Services | Every 3 Years | $5,000 |

FIG. 20C

METHOD, MEDIUM, AND SYSTEM FOR CATEGORY COMPOSITION AND WEIGHTING SELECTION

CROSS REFERENCE TO RELATED APPLICATIONS

This is a continuation-in-part application which claims priority to commonly assigned, co-pending U.S. patent application Ser. No. 15/870,124, filed Jan. 12, 2018, which is a continuation of U.S. patent application Ser. No. 15/162,956, filed May 24, 2016, both of which are incorporated herein by reference in their entireties.

BACKGROUND

Businesses that rely on technology routinely order new equipment and services. The process of ordering the equipment and services often involves filling out a request for proposal (RFP), a request for information (RFI), and/or a request for a quotation (RFQ). These RFP's, RFI's, and RFQ's are used to receive bids from a plurality of vendors interested in providing the equipment or services to the businesses. Filling out these requests can be time consuming as well as confusing. Different departments of a business may have separate requirements, and thus, need different types of equipment. It can be difficult to compare the cost and performance of equipment or services offered by one vendor relative to equipment or services offered by other vendors. Additionally, individuals that work for the vendors or "bidders" typically have some sort of a relationship with individuals that work for the businesses, or "requestors." These relationships can interfere with the bidding process and the requestor does not always necessarily get the best price available. For example, the requestor may just purchase equipment or services from a bidder that they have purchased from before.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 9 illustrates an example interface to enable a user associated with an acquisition service to setup a new project.

FIG. 18 illustrates an example interface displaying enterprise requirements associated with a report.

FIG. 20A-20C illustrate example interfaces displaying a cost breakdown for a plurality of entities.

DETAILED DESCRIPTION

Figure 1A:
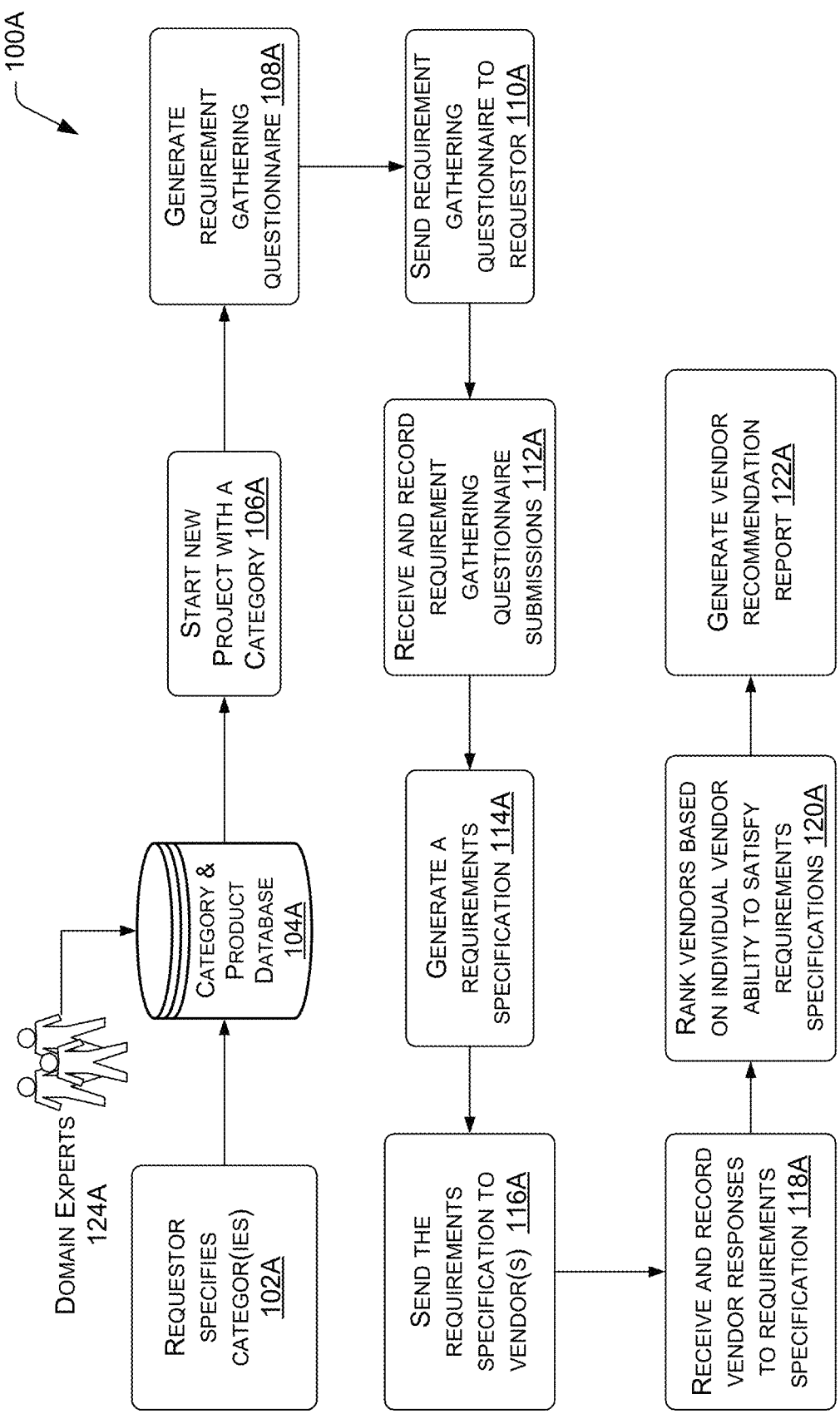
FIG. 1A illustrates an example process to enable a requestor to generate an entity recommendation report.

As discussed above, current techniques used by businesses for ordering new equipment or services is inefficient, inaccurate, and/or biased. For example, most hospitals have many different departments (e.g., emergency department, cardiology, intensive care unit, pediatric department, neurology, oncology, gynecology, maternity, etc.). Every department may need different types of equipment to operate. This equipment may vary in networking capabilities, security options, licensing options, interfacing capabilities, remote access capabilities, etc. Receiving and organizing all of the requirement needs for each department can be time consuming and redundant. Additionally, with the state of technology always evolving and progressing, often times hospitals do not know about new equipment or new functionality of the equipment. In fact, some businesses may simply file an RFP from a previous year. This can result in an inaccurate budget proposal which may cause financial harm to a business. Furthermore, quite often representatives from a bidder may have a relationship with a representative from a requestor due to a previous transaction. This may result in the requestor purchasing items from the bidder due to their relationship as opposed to purchasing items based on the requirements of the requestor that the bidder is able to fulfill, as well as the bidder's price.

This disclosure describes an acquisition service platform to enable requestors to select entities (e.g., vendors, sellers, merchants, service providers, etc.) for fulfilling requirements of the requestors for items. The acquisition platform may provide tools to enable requestors to specify requirements regarding items that are needed by the requestors. Items may include equipment, services, etc. The acquisition platform may provide tools to enable entities to view requirements of requestors regarding items and to specify an ability to fulfill those requirements. Further, the acquisition service platform may provide tools to rank vendors or other entities for fulfillment of requirements and provide the ranking to requestors and other parties. Moreover, the acquisition service platform may provide other tools.

In one illustration, the acquisition service platform may provide an interface to enable a requestor, such as a business, organization, individual, etc., to specify requirements for items the requestor in interested in acquiring. For example, the interface may enable individuals associated with different departments of a business to specify their own specific requirements regarding equipment they use or equipment that seek to use. Once the requirements are received from the requestor, the acquisition service platform may create a request for an entity.

The acquisition service platform may provide an interface to enable a vendor to indicate an ability to fulfill requirements set forth by a requestor regarding a request. For example, the interface may display to the vendor a list of the requirements determined by the requestor, and provide an option to indicate if they are able to fulfill the requirement in full, partially full, or not at all. Through the interface, the vendor may also specify a cost for providing such item to the requestor (e.g., a bid on for purchasing an item). In many instances, multiple vendors may provide information regarding their ability to fulfill requirements set forth by a requestor and/or a cost for providing an item.

Upon receiving information from vendors, the acquisition service platform may rank vendors according to an ability of the vendors to fulfill requirements, costs for acquiring items from the vendors, etc. For example, a vendor that is able to fulfill more requirements and/or offers a lower overall cost for items may rank higher than another vendor that is able to fulfill less requirements and/or offers a higher overall cost for items. In some instances, the requirements and/or costs may be weighted. The ranking may be provided to the requestor. The requestor may select a vendor to actually fulfill the requirements. In some instances, the acquisition service platform may send a communication to the selected vendor indicating an interest of the requestor in acquiring items from the vendor (e.g., indicating that a bid from the vendor has been selected). Further, in some instances, a communication may be sent to vendors that were not selected indicating that the vendors were not selected.

This brief introduction is provided for the reader's convenience and is not intended to limit the scope of the claims. Furthermore, the techniques described in detail below may be implemented in a number of ways and in a number of contexts. Example implementations and contexts are provided with reference to the following figures, as described below in more detail. However, the following implementations and contexts are but some of many.

Various embodiments of the present disclosure include systems, methods, and non-transitory computer-readable media of a social networking system.

In some examples, a system may comprise one or more processors and one or more memory devices storing instructions that, when executed by the one or more processors, cause the system to perform operations including receiving vendor data for a plurality of vendors, the vendor data including information about a requested item for purchase. The operations may further include ranking the plurality of vendors based at least in party on a performance level and a total cost of acquiring the requested item. The operations may further include causing a graphical user interface (GUI) to be displayed at a computing device, the GUI comprising a table including the ranking of the plurality of vendors and a slider control that is slidable along a length of a bar, wherein the slider control includes multiple different positions, and each position of the multiple different positions is associated with a different weighting of the performance level relative to the total cost of acquiring the requested item. The operations may further include receiving a user input changing a position of the slider control and causing the GUI to dynamically display changes to the ranking of the plurality of vendors based at least in part on receiving the user input changing the position of the slider control.

In some examples, the ranking of the plurality of vendors may comprise inputting the vendor data and a requirements specification to a machine learned model trained to rank vendors based on the extent of their ability to meet individual requirements of the requirements specification. The system may further be configured to receive, from the machine learned model, an output including the ranking of the plurality of vendors.

In some examples, the GUI may further comprise a bar graph comprising an x-axis representing the plurality of vendors and a y-axis representing a score, the score based at least in part on the performance level and the total cost of acquiring the requested item. In some examples, the system may be further configured to perform operations including causing the GUI to update the bar graph based at least in part on the change in the position of the slider control.

In some examples, the GUI may further comprise a table associated with a vendor cost breakdown of the total cost of acquiring the item from individual vendors of the plurality of vendors. In some examples, the system may be further configured to perform operations including receiving user input selecting a cost icon associated with the table. The operations may further include displaying, via the GUI, the table including the total cost of acquiring the item and a total lifecycle cost over a period of time, the total lifecycle cost based at least in part on at least one of recuring costs and episodic costs.

In some examples, the GUI may further comprise a total project cost icon. In some examples, the system may be further configured to perform operations including receiving user input selecting the total project cost icon. The operations may further include displaying, via the GUI, a total project cost for acquiring items associated with a project.

In some examples, the GUI may further comprise a total project lifecycle cost icon. In some examples, the system may be further configured to perform operations including receiving user input selecting the total project lifecycle cost icon and displaying, for individual vendors of the plurality of vendors and via the GUI, recurring costs and episodic costs of acquiring items associated with the project. The operations may further include receiving user input changing a period of time associated with the total project lifecycle cost and displaying, via the GUI, changes to the total project lifecycle cost based at least in part on the user input changing the period of time.

In some examples, the GUI may further comprise vendor performance data indicating with a degree to which individual vendors of the plurality of vendors meet one or more enterprise requirements. In some examples, the GUI may further comprise a vendor performance table representing the degree to which the individual vendors of the plurality of vendors meet the one or more enterprise requirements as a percentage. In some examples, the vendor performance table may comprise a first column including vendors that are qualified based at least in part on the percentage meeting or exceeding a first threshold percentage. In some examples, the vendor performance table may comprise a second column including vendors that are partially qualified based at least in part on the percentage being less than the first threshold and meeting or exceeding a second threshold. In some examples, the vendor performance table may comprise a third column including vendors that are disqualified based at least in part on the percentage being less than the second threshold.

In some examples, a system (e.g., an acquisition service system) may comprise one or more processors and one or more memory devices storing instructions that, when executed by the one or more processors, cause the system to perform operations including causing a GUI to be displayed on a computing device, the GUI comprising a plurality of sections associated with a plurality of requirement categories. In some examples, the plurality of requirement categories may include a first section associated with a setup of a matter, a second section associated with a set of requirements for acquiring one or more items, a third section associated with vendor data, a fourth section associated with one or more reports, a fifth section associated with one or more awards. In some examples, the operations may further include receiving user input under the first section and providing an indication of a level of progress associated with completing the requirements of the first section (i.e., a "stage gating" process that the system implements to ensure that the required information is completed before the sales process moves to the next step). The operations may further include determining that the level of progress associated with the first section falls short of a first threshold. In some examples, the operations may include restricting access to at least one of the second section, the third section, the fourth section, or the fifth section based at least in part on the level of progress associated with the first section falling short of the first threshold and sending a notification to a user to complete the first section.

In some examples, the system may be further configured to perform operations including receiving additional input under the first section and determining that, based on the additional input, the level of progress associated with the first section meets or exceeds the first threshold. The operations may further include providing access to the second section based at least in part on the level of progress associated with the first section meeting or exceeding the first threshold.

In some examples, the system may be further configured to perform operations including determining at least one of a first amount of time that has elapsed since the matter was set up or a second amount of time remaining until the matter is to be completed. The operations may further include determining, based at least in part on at least one of the first amount of time or the second amount of time, an action to perform and performing the action. In some examples, the action comprises at least one of sending a reminder to a first user from whom the input was received, sending a reminder to a second user different than the first user, applying a default action to complete the first action, granting a permission to the first user or another user to complete the first section, or reassigning responsibility for completion of the first section to a different user.

In some examples, the first section is associated with multiple subsections, each of the multiple subsections is associated with a progress indicator indicating a level of progress. In some examples, the multiple subsections comprise a first subsection associated with a matter description, a second subsection associated with one or more locations associated with the matter, a third subsection associated with assigning a user to the matter, a fourth subsection associated with enterprise requirements, and a fifth subsection associated with administration of the project.

In some examples, the system may be further configured to perform operations including receiving user input selecting the second subsection associated with the one or more locations and receiving user input adding at least one location to the matter. The operations may further include determining that the user has met or exceeded a second threshold level of requirements associated with the second subsection and providing access to the third subsection based at least in part on the level of progress associated with the second subsection meeting or exceeding the second threshold level of requirements associated with the second subsection.

In some examples, a computer implemented method may include causing presentation of an interface including an entry portion to enable a user to start a project for acquiring items. The method may further include receiving user input specifying a set of enterprise requirements associated with the project, the enterprise requirements applying to all locations and departments associated with the project. The method may further include receiving user input specifying a set of item requirements, the set of item requirements identifying a plurality of items to be acquired. The method may further include receiving user input specifying a relative importance of individual items of the plurality of items. The method may further include receiving vendor data from a plurality of vendors indicating which of the enterprise requirements and which item requirements of the set of item requirements the respective vendors are able to fulfill. The method may still further include ranking the vendors based at least in part on vendor data, the enterprise requirements, the set of item requirements, and relative importance of individual items of the plurality of items. The method may further include causing presentation of the ranking of the vendors.

In some examples, the ranking of the vendors may comprise disqualifying vendors that fail to meet one or more of the enterprise requirements to obtain a qualified set of vendors. In some examples, ranking the qualified set of vendors is based on a number of item requirements of the set of item requirements that individual vendors of the qualified set of vendors is able to meet, relative importance of individual items of the plurality of items, and a cost of acquiring the items.

In some examples, causing the presentation of the ranking of the vendors comprises outputting a table including a performance level and a total cost of acquiring the set of items and causing presentation of a slider control that is slidable along a length of a bar, wherein the slider control includes multiple different positions, and each position of the multiple different positions is associated with a different weighting of a performance level relative to a total cost of acquiring the items.

In some examples, the computer-implemented method further includes providing a bar graph associated with a slider control, the bar graph including an x-axis representing the qualified set of vendors and a y-axis representing a score which is based at least in part on the performance level and the costs of acquiring the items. The method may further include receiving user input changing the position of the slider control and causing the bar graph to update the score associated with individual vendors of the qualified set of vendors based on the change in position of the slider control.

In some examples, the computer-implemented method further includes providing an indication of a cost breakdown associated with individual vendors of the qualified set of vendors, the cost breakdown including a life cycle cost over a period of time, the life cycle cost taking into account at least one of a recurring cost or an episodic cost of the items.

In some examples, the computer implemented method further includes determining a plurality of item requirements that comply with the enterprise requirements, based at least in part on receiving the set of enterprise requirements associated with the project, and causing presentation of a list of item requirements from which the set of item requirements are selectable. In some examples, the acquisition service requires input of the set of enterprise requirements associated with the project prior to providing an interface usable to receive the set of item requirements.

Example Overview

FIG. 1A illustrates an example process 100A to enable a requestor to generate an entity recommendation report ranking and/or recommending which entity or entities from among multiple available entities is best able to meet various performance and/or cost requirements. As discussed above, existing acquisition techniques are time consuming, labor intensive, and may not result in selection of the best, highest performing (e.g., able to supply the most products or services meeting specified requirements), and/or lowest costs entity to supply products or services to meet the requestor's needs. The process 100A provides an example of a process that may be used to simplify and streamline an acquisition process, and may result in selection of a better, higher performing entity to supply one or more products or services for a project and/or at a lower price than was achievable using prior acquisition processes or services.

Referring back to FIG. 1A, at 102A, a user, customer, or other requestor may start an acquisition process, project, or other matter by specifying one or more categories of products or services in which they are interested. The specified categories may be at any level of specificity (e.g., medical equipment, durable medical equipment, medical devices, defibrillators, etc.). In some examples, the category may include one or more sub-categories (e.g., stationary defibrillators, portable defibrillators, adult defibrillators, infant defibrillators, etc.). The categories by the requestor define a scope of the project.

At 104A, the acquisition service may obtain information about products and/or services that may be applicable to the matter based on the categories enumerated by the requestor. For instance, the product acquisition service may conduct product research, engage domain experts, and/or scrape data from one or more web sites or product catalogs to compile a collection of products or services that may be applicable to the categories specified by the requestor. The acquisition service may organize the information into a taxonomy or other hierarchical structure, and store the information in one or more databases (e.g., in category and product database 104A, requestor data store 130B, entity data store 132B, and/or data processing data store 134B). Take for example a hypothetical in which a requestor desires to purchase products for a security system and service for a new physical location. The acquisition service may collect vendor data from relevant vendors about the devices and services each vendor provides which are necessary to create a security system. The acquisition service may collect the vendor data at least in part by sending, receiving, recording, and storing data available from each vendor that provides security system products or services. The acquisition service may analyze security system product information offered by each vendor in order to create an organized structure, taxonomy, or other hierarchy for the particular category of products/services. The organized structure enables the acquisition service to compile a complete picture of all products and services that may be of interest to the requestor and how they relate to one another in terms of features, capabilities, costs, performance, and/or other characteristics. Additional details of how product information may be organized and/or stored is described below with reference to FIG. 1B and elsewhere.

At 106A, the acquisition service may receive a request to generate a new project associated with the categories of products or services the requestor may want to purchase or otherwise acquire (e.g., medical equipment, security system and service, etc.). In some examples, the requestor may log in to an acquisition software platform provided by the acquisition service and may use the software platform to generate the new project relating to the specified categories.

At 108A, the acquisition service may use the previously generated hierarchy for the particular category of products/services specified by the requestor to generate a requirement gathering questionnaire to be sent to a purchaser/requestor. For example, the requirement gathering questionnaire may be populated with a series of questions to further refine the scope of products or services the requestor is interested in acquiring. In some examples, the requirements gathering questionnaire may be generated automatically by the acquisition service based on filling a questionnaire template with data from the previously generated hierarchy for the particular category of products/services. In some examples, the requirements gathering questionnaire may be generated automatically by inputting the previously generated hierarchy for the particular category of products/services into a machine learned model trained to generated requirements gathering questionnaires. Regardless of how it is generated, the requirements gathering questionnaire may include a series of questions that solicit input from the requestor regarding the subcategories, features, sub-features, performance requirements, and other characteristics of products and services associated with the categories specified by the requestor for the project. Additionally, in some examples, the requirements gathering questionnaire may solicit input regarding a relative importance of one or more of the characteristics of the products or services. That is, the requestor may specify how important it is that a product include a particular feature or features.

At 110A, the acquisition service 104B may send the requirements gathering questionnaire to the requestor. The requirements gathering questionnaire may include device and service requirements relating to every aspect of a product category data and the product/service. For example, in the case of the security system example described above, a requestor may want to install a security system and, based on the requirements gathering questionnaire, a purchaser/requestor may specify what security device features (e.g., power requirements, networking requirements, audio features, video features, and the like) they would like the security system to have.

At 112A, the acquisition service may receive and record the requestor's responses to the requirement gathering questionnaire.

At 114A, the acquisition service may use the requestor's responses to the requirements gathering questionnaire to generate a requirements specification that defines the requestor's requirements for the project. The requirements specification can be sent to multiple different entities (e.g., vendors), which may be the same, different, a subset of, a superset of, or may overlap with the group of vendors used to generate the requirements gathering questionnaire).

In some examples, the acquisition service may pre-rank the entities (prior to receiving entity responses to the requirements specification) and provide a preliminary recommendation report to a requestor based on the data in the category and product database 104A.

At 116A, the acquisition service 104B may send the requirements specification to one or more entities (e.g., vendors) to enable them to provide information relating to their products (e.g., product details, product categories, product types, etc.) and/or to declare the extent to which their products meet the requirements specification. The entities may respond to the requirements specification by indicating the extent/degree to which their product or service offerings meet the requirements specification (e.g., meets, partially meets, does not meet, etc.), which features are met and which are not, and/or which products/services meet each requirement of the requirements specification. In some examples, a product may meet some but not all (e.g., two out of three) of the features specified by the requirements specification, in which case, the entity may receive a score for that product proportionate to the number of points available for the product (e.g., ⅔ of the available points in the indicated example). In some examples, the vendors may also add or suggest other requirements that their products or services provide, but which were not included on the requirements specification. In that case, the acquisition service may use these other requirements as feedback to supplement or refine the requirements specification and/or future requirements gathering questionnaires.

Figure 1B:
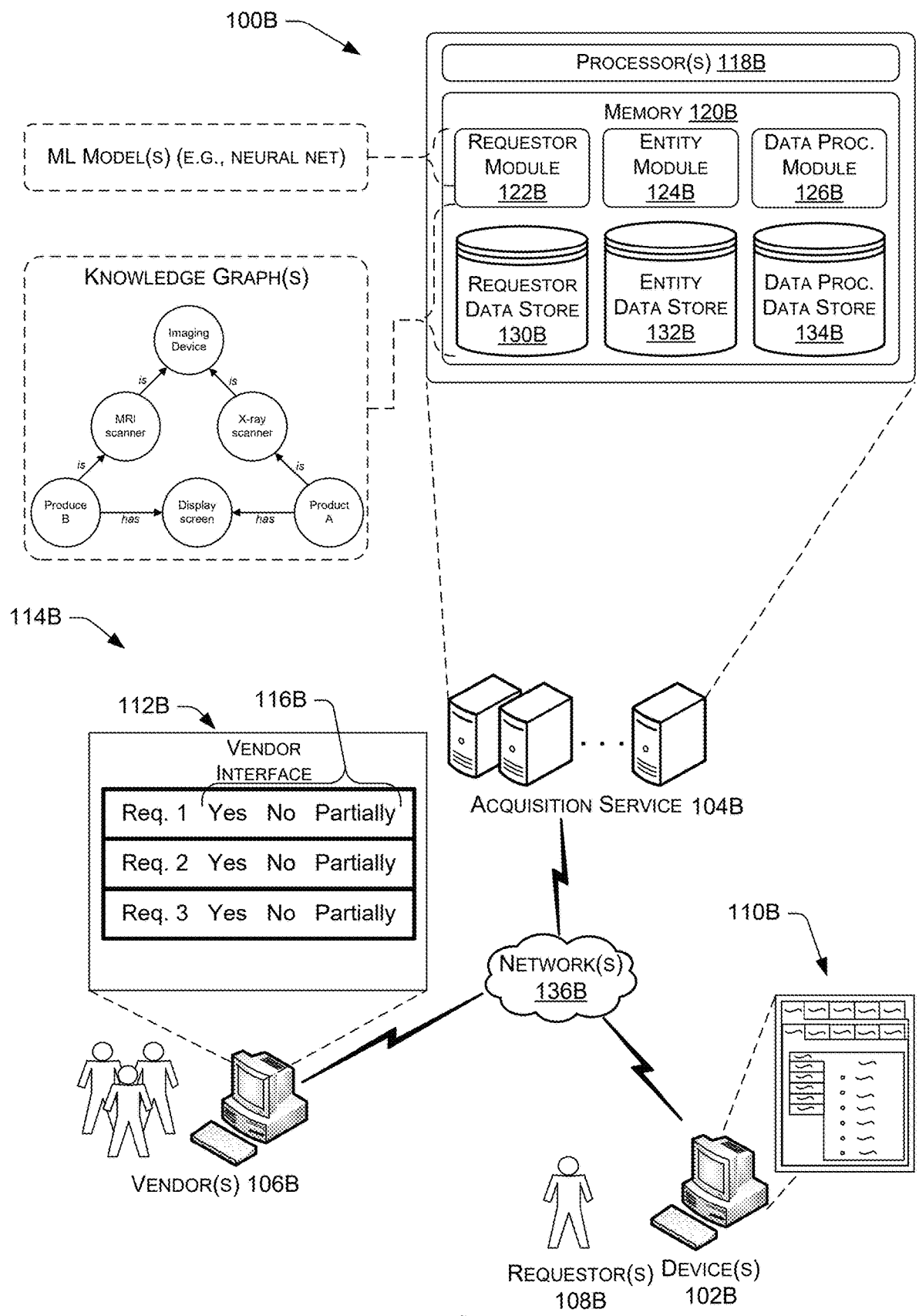
FIG. 1B illustrates an example architecture in which techniques described herein may be implemented.

At 118A, the acquisition service may receive, record, and store entity responses to the requirements specifications in a database (e.g., in the entity data store 132B described in relation to FIG. 1B). In some examples, the acquisition service may generate, based at least in part on the recorded responses regarding a product/service, additional or more specific product/service requirements. The acquisition service may extract data received from entity responses and compare, calculate, and/or score each entity's ability to satisfy the product/service requirements in the requirements specification. The acquisition service may generate reports based at least in part on extracted data received from entity responses.

At 120A, the acquisition service 104 may rank entities based at least in part on their ability to satisfy the product/service requirements listed in the requirements specification. In some examples, the entities may be ranked predictively based on previously stored data in the category and product data base and/or based on entity input received at operation 118A in response to the requirements specifications.

At 122A, the acquisition service may generate an entity recommendation report providing recommendations of one or more entities to supply the products and/or services for the project. The entity recommendation report may be configurable based at least in part on the relative performance of the entities (e.g., which entities were able to meet the most requirements and/or the most important requirements), cost (e.g., total cost including recurring or periodic costs), and/or other factors.

Example Architecture

FIG. 1B illustrates an example architecture 100B in which techniques described herein may be implemented. The architecture 100B includes one or more devices 102BB (hereinafter "the device 102B") configured to communicate with an acquisition service 104B and/or one or more vendors 106B (hereinafter "vendor 106B") to facilitate an acquisition. A vendor may be any entity that supplies items or services. In some instances, a vendor may be referred to as a merchant or seller. Vendors include manufacturers, distributors, etc. As used herein, the term "vendor" is an example of an entity and the techniques described herein are applicable to other types of entities as well. As illustrated, the vendor 106B may be associated with a computing device. The device 102B may enable a requestor 108B to fill out a request through an interface 110B that is presented on device 102B. A requestor may include an individual, such as any individual associated with a company, organization, entity, and so on. For example, a requestor may include IT people, business individuals, other employees (e.g., doctors, nurses, etc.), and so on. Through interface 110B the requestor 108B may login to an account, create an account, create a new request, access unfinished requests, access completed requests, access inactive requests, and so on. When the requestor 108B accesses unfinished requests or creates a new request, interface 110B may provide the requestor 108B with options to select requirements for a request, such as a Request for Information (RFI), Request for Proposal (RFP), or a Request for Quotation (RFQ). Once the request is filled out, the requirements may be presented to the vendor 106B on a vendor interface 112B. The vendor interface 112B may enable the vendor 106B to indicate whether or not they are able to fulfill the requirements determined by the requestor 108B as well as provide a bid price for items and other information. For example, as illustrated in FIG. 1B, the vendor interface 112B may provide a requirement 114B ("Req. 1") and options 116B to indicate an ability to fulfill the requirement 114B. Once the vendor 106B has provided information, that information is processed by the acquisition service 104B and vendors are ranked based on their ability to fulfill the requirements, their bid price, and/or any other information. The ranking may then be displayed on the interface 110B for the requestor 108B. The acquisition service 104B may then receive a selection from the requestor 108B indicating a vendor from which they would like to purchase items. An item may comprise a tangible item (e.g., equipment, devices, etc.) or a service. An acquisition of an item may include purchasing the item, renting the item, borrowing the item, and so on.

As noted above, in many instances a request may be associated with one or more requirements for acquiring items. For example, a hospital may be interested in purchasing new equipment including computers, servers, beds, medical devices (e.g., defibrillators, heart monitors, etc.), and so on. Here, the hospital may specify a set of requirements in a request. The requirements may specify the types of computers, servers, beds, medical devices, and so on that the hospital may require to run its business. In particular, in this example, the hospital may specify that 100 touch screen tablet computers are needed that have a particular processing speed, 10 servers are needed that satisfy particular security measures, 50 new heart monitors are needed that have particular features, and so on. In another example, a business may specify requirements for a laundry service, such as how many pieces of clothing will be picked-up, how often cleanings will be needed, how quickly clothing needs to be returned, and so on.

The device 102B and/or the computing device associated with the vendor 106B may comprise a laptop computer, a desktop computer, a smart phone, an electronic reader device, a mobile handset, a personal digital assistant (PDA), a portable navigation device, a portable gaming device, a tablet computer, a watch, a portable media player, and the like. In some instances, the device 102B and/or the computing device associated with the vendor 106B may be referred to as a mobile device, indicating that the device 102B and/or the computing device associated with the vendor 106B is portable. In some instances, a mobile device includes any of the examples listed above except for the desktop computer.

The device 102B and/or the computing device associated with the vendor 106B may be equipped with one or more processors and memory, one or more interfaces (e.g., a communication interface(s) (network interface(s)), an input/output interface(s), etc.), one or more displays, one or more sensors, etc. The one or more processors may include a central processing unit (CPU), graphics processing unit (GPU), a microprocessor, and so on. The one or more displays may include a Liquid-crystal Display (LCD), a Light-emitting Diode (LED) display, an organic LED display, a plasma display, an electronic paper display, or any other type of technology. The one or more sensors may include a proximity sensor that detects a proximity of objects to the device, an infrared (IR)/thermal sensor, a Wi-Fi® sensor, a Bluetooth® sensor, a camera, a microphone, an accelerometer, a compass, a gyroscope, a magnetometer, a Global Positioning System (GPS), a depth sensor, an olfactory sensor (e.g., for smell), or other sensor. The memory may include a client application (e.g., module) configured to interface with an individual (e.g., the requestor 108B, the vendor 106B, etc.) and perform other functionality. For instance, the client application may output an interface (e.g., the interface 110B, the vendor interface 112B, etc.) to receive input from an individual, provide information, and perform a variety of other operations. The client application may operate in cooperation with the acquisition service 104B. In some instances, the client application comprises a browser, application (e.g., desktop application, mobile application, etc.), and so on. The device 102B and/or the computing device associated with the vendor 106B may be associated with an input/output device, such as a keyboard, mouse, trackpad, monitor, speaker, printer, and so on.

The acquisition service 104B may include one or more computing devices, such as one or more desktop computers, laptop computers, servers, and the like. The one or more computing devices may be configured in a cluster, data center, cloud computing environment, or a combination thereof. In one example, the one or more computing devices provide cloud computing resources, including computational resources, storage resources, and the like, that operate remotely to the device 102B and/or the vendor 106B.

The one or more computing devices of the acquisition service 104B may include one or more processors 118B and memory 120B. Although not illustrated, the one or more computing devices of the acquisition service 104B may include one or more interfaces (e.g., a communication interface(s) (network interface(s)), an input/output interface(s), etc.). The memory 120B may include software functionality configured as one or more "modules." The term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.) to execute the described functions. As illustrated in FIG. 1B, the memory 120B includes a requestor module 122B, an entity module 124B, and a data processing module 126B.

The requestor module 122B may generally manage requests made by the requestor 108B. The requestor module 122B may provide the interface 110B to the requestor 108B (e.g., including a list of selectable requirements regarding items available for purchase), receive selection of one or more of the requirements from the requestor 108B via the interface 110B, generate a request for the vendor 106B based on the selection of the one or more requirements from the requestor 108B, and so on. The requestor module 122B may also allow the requestor 108B to indicate a degree of importance for one or more of the selectable requirements relative to other selectable requirements. This degree of importance (or relative importance) may be indicated using a selectable scale (e.g., 1-10, high/medium/low, etc.) that is next to the selectable requirement on the interface, using a text input field, and so on. The requestor module 122B may also save and maintain unfinished requests or inactive requests that the requestor 108B can access at a later point in time. These saved requests may be stored in a requestor data store 130B.

The requestor module 122B may also maintain information regarding items available for purchase (e.g., a library of items that are available for purchase). This information may have been collected from vendors (e.g., from websites associated with the vendors, by calling vendors, etc.). The information may be provided by the requestor module 122B to the requestor 108B so that the requestor 108B can make a request based on what is currently available in the marketplace. For instance, the requestor module 122B may provide the requestor 108B with information that indicates which vendors are providing what items and/or specific details of the items (e.g., technical details of equipment that is available).

The vendor module 120B may generally manage information provided to the vendor 106B and/or information received from the vendor 106B. For example, the vendor module 120B may provide information regarding requests received from the requestor 108B to the vendor 106B via the vendor interface 112B. This information may include the requirements indicated by the requestor 108B and/or options (e.g., graphical elements) that allow the vendor 106B to indicate whether or not they are able to fulfill such requirements, a price for fulfilling a particular requirement, and so on. Additionally, or alternatively, the vendor interface 112B may allow the vendor 106B to provide a written explanation regarding their capability of fulfillment.

The data processing module 126B may process the information received by the requestor 108B and/or the information received by the vendor 106B and generate a ranking of vendors based on that information. For instance, the data processing module 126B may take into account the requirements indicated by the requestor 108B, the degree of importance of those requirements as indicated by the requestor 108B, the indications from the vendors of their capability to fulfill the requirements of the requestor 108B, and/or the bid price received form the vendors to generate a ranked list of the vendors. In some instances, the degree of importance on requirements may be used to weight the requirements for the ranking (e.g., rank a vendor higher than another vendor, when the vendor is able to fulfill a requirement that is associated with a relatively high degree of importance and the other vendor is not able to fulfill the same requirement). Further, in some instances the ranking includes a multifactor approach that weights pricing and/or requirements differently. A ranked list of vendors may be provided to the requestor 108B along with a variety of information. A few examples of the types of information that may be provided to the requestor 108B include:

The name of the vendors.

The percent of requirements that each vendor can fulfill (e.g., vendor A can satisfy 90% of the requirements).

An indication of pass, partially pass, or fail, for each vendor based on the percent of requirements that the respective vendor can fulfill.

A bid price provided by each vendor (e.g., a total bid price, a price per item, a price to fulfill a particular requirement, etc.).

An overall indication of the vendor's ability to fulfill the requirements and/or an indication for individual requirements.

In some examples, one or more of the requestor module 122B, the entity module 124B, and/or the data processing module 126B may be implemented in whole or in part by a machine learned model (ML model), such as a neural network, or otherwise using machine learning techniques such as those described later in this application.

As illustrated in FIG. 1B, the acquisition service 104B may include the data stores 130B-134B. The requestor data store 130B may store request data received from the device 102B (e.g., data regarding requests RFIs, RFPs, RFQs, etc.). The request data may be collected overtime from a plurality of devices as requestors of those devices make requests through the plurality of devices. Some example request data may include:

The name of the project, health system, facility name, or category type.

Networking requirements, such as requirements for hard wired networking requirements, wireless networking requirements, telemetry requirements, etc.

Server requirements, such as requirements for virtual servers, physical servers, requestor provided servers, or vendor provided servers.

Security requirements, such as what types of security a requestor requires for networking services, storage services, etc.

Licensing requirements, such as requirements related to licenses of items, individual license options, unlimited sharing of data between department's options, or lifetime software upgrade options.

Interfacing requirements, such as requirements for interface capabilities between devices.

Remote access requirements, such as a requirements regarding a type of data being accessed and/or an amount of storage needed.

Etc.

In some instances, the requestor data store 130B may save unfinished requests or inactive requests that may be accessed by the requestor 108B. An unfinished request may be a request in which all of options are not completed by a requestor (e.g., a requestor has not yet identified requirements for the IT department, but has identified requirements for the emergency room department). An inactive request may be a request in which some requirements are specified, such as in a case where a list of vendors have been ranked and provided to the requestor 108B, but the request has not yet been fulfilled (e.g., perhaps for financial reasons, timing, etc.).

In some instances, the request data includes account information. The account information may include information about a financial account of the requestor from which to pull funds when an acquisition is processed. The account information may also include other types of information that the requestor has registered with the acquisition service 104B, such as login information and so on.

The entity data store 132B may store vendor information of vendors that have registered with the acquisition service 104B and/or otherwise provided information to the acquisition service 104B or another service. The vendor information may include the name of the vendor, the location of the vendor, the types of items that the vendor provides (e.g., offers for acquisition), and/or specific details about the items the vendor provides. Further, the vendor data may include information regarding fulfillment of requests, such as information indication an ability of a vendor to fulfill a request from a requestor.

In some examples, any or all of the databases described herein (e.g., requestor data store 130B, entity data store 132B, data processing data store 134B, etc.) may be organized as a centralized database, cloud database, a distributed database, NoSQL database, a document store database, an operational database, a relational database, or the like. In some examples, a NoSQL database may be used that stores data in a format other than a relational table or is not modeled around a Relational Database Management System (RDBMS) or Structured Query Language (SQL). For example, a NoSQL database may include Document Store (e.g., MongoDB), Key-Value (e.g., Redis, Memcached), Graph-Network (e.g., Neo4j, FlockDB), Column Oriented (e.g., Apache Cassandra), Hierarchical (e.g., PostGIS), Object Oriented (e.g., GemStone/S, ObjectDB, Versant), Triple Stores (e.g., AllegroGraph, Apache Jena, BlazeGraph, MarkLogic, 3Store), and the like.

In some examples, any of the databases described herein (e.g., requestor data store 130B, entity data store 132B, data processing data store 134B, etc.) may be organized as a knowledge graph, which uses a graph-structured data model or topology to store interlinked descriptions of entities (e.g., products, items, services, features, requirements, people, entities, departments, events, etc.) along with semantics underlying the used terminology. In some examples, nodes in the knowledge graph may represent entities while the edges or links connecting the nodes may represent dependencies, hierarchies, or other relationships between the nodes in the graphs. By organizing the database in the form of a knowledge graph, the system may be capable of performing more accurate and/or complex recommendations based on the stored data, or learning new insights not readily apparent to a human user using conventional acquisition techniques.

In some examples, the database(s) may organize product information based at least in part on the product category or product type. The acquisition service 104B may generate questionnaires based at least in part from product category data and the product/service type. For example, the acquisition service 104B may generate requirement gathering questionnaires to be sent to a purchaser or requestor in order to generate a requirements specification including a set of requirements associated with products or services that the purchaser/requestor desires to acquire. The acquisition service 104B may additionally or alternatively generate a requirements specification, based at least in part on purchaser/requester responses to the requirements gathering questionnaires. The requirements specification may be sent to one or more vendors to enable them to provide information relating to their products (e.g., product details, product categories, product types, etc.) and/or to declare the extent to which their products meet the requirements specification. The acquisition service 104B may record and store received from vendors. The acquisition service 104B may generate, based at least in part on the recorded responses regarding a product/service, additional or more specific product/service requirements. The acquisition service 104B may extract data received from vendor responses and compare, calculate, and score a vendor's ability to satisfy all product/service requirements in the requirements specification. The acquisition service 104B may generate reports based at least in part on extracted data received from vendor responses.

The acquisition service 104B may generate and store questionnaires, requirements specifications, and/or vendor responses in one or more databases (e.g., requestor data store 130B, entity data store 132B, and/or data processing data store 134B). In some examples, the acquisition service 104B may generate product/vendor recommendation reports based at least in part on requirement specifications and vendor responses.

For example, and not by way of limitation, the acquisition service 104B may receive a request to generate a new project with a category of products relating to a security system and service for a new physical location. The acquisition service 104B may collect vendor data from relevant vendors about the devices and services each vendor provides which are necessary to create a security system. The acquisition service 104B may collect the vendor data at least in part by sending, receiving, recording, and storing data available from each vendor. The acquisition service 104B may analyze security system product information offered by each vendor in order to create an organized structure, taxonomy, or database for the particular category of products/services. The organized structure enables the acquisition service 104B to compare a vast number of product and service features across multiple vendors. The acquisition service 104B may generate a new category of device and service requirements relating to every aspect of a security system. The acquisition service 104B may use the information obtained from the vendor(s) to generate a requirements gathering questionnaire to be sent to a purchaser/requestor, which includes device and service requirements relating to every aspect of a security system that the purchaser/requestor may want to install. Based on the requirements gathering questionnaire, a purchaser/requestor may specify what security device features (e.g., power requirements, networking requirements, and the like) they would like to acquire for a given project. The purchaser/requestor's response to the requirements gathering questionnaire can be used by the acquisition service 104B to generate a requirements specification that can be sent to multiple different vendors (which may be the same, different, a subset of, a superset of, or may overlap with the group of vendors used to generate the requirements gathering questionnaire). The vendors may respond to the requirements specification by indicating the extent/degree to which their product or service offerings meet the requirements specification (e.g., meets, partially meets, does not meet, etc.) and/or which products/services meet each requirement of the requirements specification. In some examples, the vendors may also add or suggest other requirements that their products or services provide, but which were not included on the requirements specification. In that case, the acquisition service 104B may use these other requirements as feedback to supplement or refine the requirements specification and/or future requirements gathering questionnaires.

The memory 120B (as well as all other memory described herein) may include computer storage media (e.g., computer-readable storage media). Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include communication media, such as modulated data signals and carrier waves. As such, computer storage media is limited to non-transitory media.

The architecture 100B may also include one or more networks 136 to enable the device 102B, the acquisition service 104B, and/or the vendor 106B to communicate with each other. The one or more networks 136 may include any one or combination of multiple different types of networks, such as cellular networks, wireless networks, Local Area Networks (LANs), Wide Area Networks (WANs), and the Internet.

Example Interfaces

FIGS. 2-5 illustrate example interfaces that may be presented to a requestor or to a vendor to facilitate the requesting techniques discussed herein. The interfaces may be displayed through a browser, an application (e.g., a client application), and so forth.

Figure 2A:
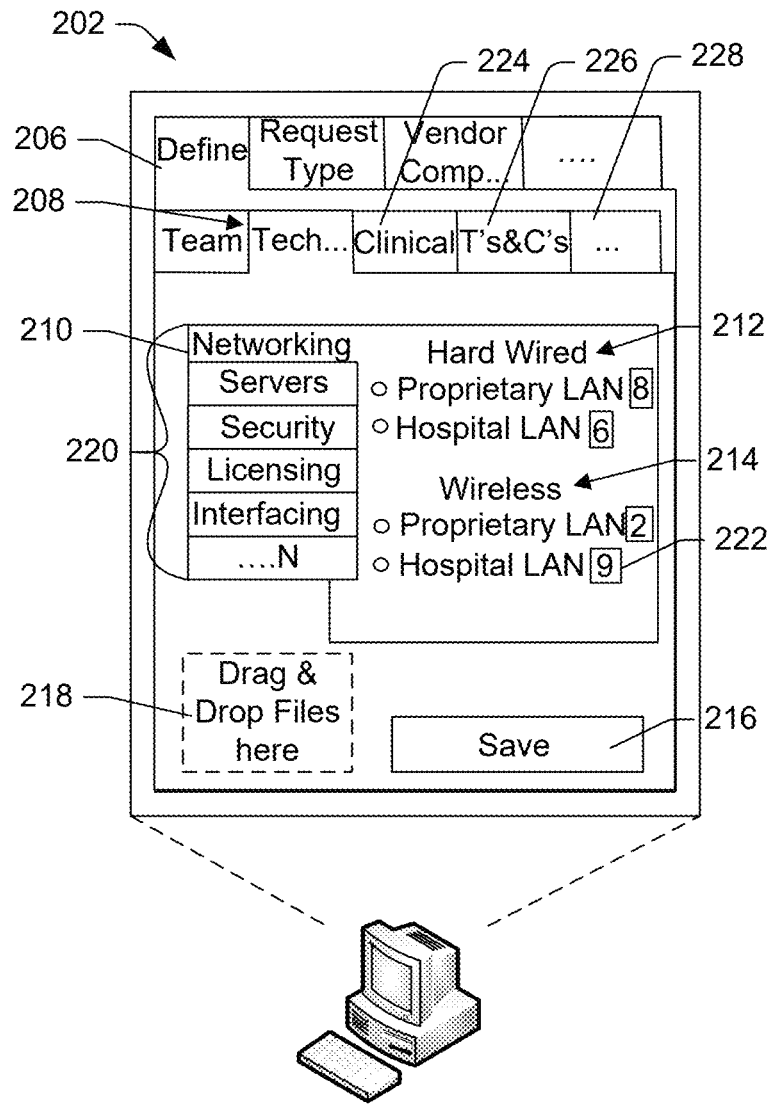
FIG. 2A-2C illustrate example interfaces that may be presented to enable a requestor to define requirements for a request.

FIG. 2A illustrates interface 202 that may be presented to enable a requestor to specify requirements in a request. In this example, requirement options are presented when a define tab 206 (and a technology tab 208 under the define tab 206) is selected. Although the requirement options may be presented in other tabs. Under the technology tab 208, the requestor is provided with a plurality of requirement options to select requirements for a request. For instance, in the example used in FIG. 2A, these requirement options may pertain to networking, servers, security, licensing interfacing, or any number of requirements (e.g., remote access, test environments, project management, etc.). These requirement options may be presented as tabs, as illustrated by a networking tab 210. When a requestor selects one of the requirement tabs, a list of selectable requirement options may be presented to the user. In FIG. 2A, the requestor has selected the networking tab 210, and may select hard wired requirements 212, wireless requirements 214, etc. Additionally, or alternatively, a requestor may drag and drop files with requirement option information into a drag & drop file box 218 to specify requirements for a request.

Once requirements on the networking tab 210 have been filled out, the requestor may select the save button 216. The interface 202 may then provide an indication to the requestor if all (or more than a threshold number) of the requirement options on the networking tab 210 were specified. For instance, the networking tab 210 may then turn green if available requirement options are specified. Alternatively, if partially filled out (e.g., more than one threshold and less than another), the networking tab 210 may turn yellow. Further, if not filled out (e.g., less than a threshold, no options are selected, etc.), the networking tab 210 may be red. Tabs in the interface 202 may be red before they have been selected or filled out. The requestor may select (e.g., click) on any one of a plurality of tabs 220 to specify requirements in a similar fashion as done with respect to the networking tab 210. Each tab may have a different set of requirement options, such as requirement options that are associated with different categories. Further, a level of completeness of each tab may be indicated (e.g., with red, yellow, and green colors).

In some instances, a requirement option may be presented with an option to specify a degree of importance. As illustrated, an input field 222 may be located next to a requirement option so that an individual may specify a degree of importance (e.g., a weight factor) for that requirement. Although other types of graphical elements may be used, such as a drop down menu.

As illustrated, the interface 202 includes other tabs within the define tab 206. For example, the define tab 206 may also include a clinical tab 224 with selectable requirement options regarding types of monitors, number of monitors, size of monitors, and any other functionality regarding monitors. Further, the define tab 206 may include a terms and conditions tab 226 in which a requestor may specify requirements regarding terms and conditions of a purchase. These terms and conditions may be uploaded (e.g., using a drag and drop operation). The define tab 206 may also include any number of tabs, illustrated with element 228. Other tabs may include a service and support tab, an education tab, or a legal tab, which may include selectable requirement options regarding their respective subject matter. The user may click on any tab within the define tab 206 to specify requirements for items (e.g., equipment) desired for purchase. The tabs 208, 224, 226, 228, and/or any other tab may indicate a level of completeness of requirement options associated with the tab, in a similar manner (or different manner) as that discussed above (e.g., showing different colors for different levels of completeness).

In some instances, individuals may be given access to different tabs. For example, each of the tabs 208, 224, 226, and 228 may be associated with a different category or department within an organization (e.g., a company). Different individuals may then be given access to different tabs. For instance, in a hospital setting, the intensive care unit, coronary care unit, emergency department, pre-operative unit, post-operative unit, post-anesthesia care unit, labor and delivery unit, neonatal intensive care unit, and any other unit may independently fill out a section of any tab to indicate their requirements for items. In particular, an individual that works in the intensive care unit may be given access to an intensive care tab to specify requirements for the intensive care unit (e.g., specify equipment needed by that unit). In another example, an individual that works in the IT department may be given access to specify requirements related to the IT department. The access ability of individuals may be determined by an access level granted to each individual. Furthermore, the requirements that the individual is allowed to specify may be indicated by the interface 110B. For example, requirements that the individual is allowed to specify may be highlighted.

Figure 2B:
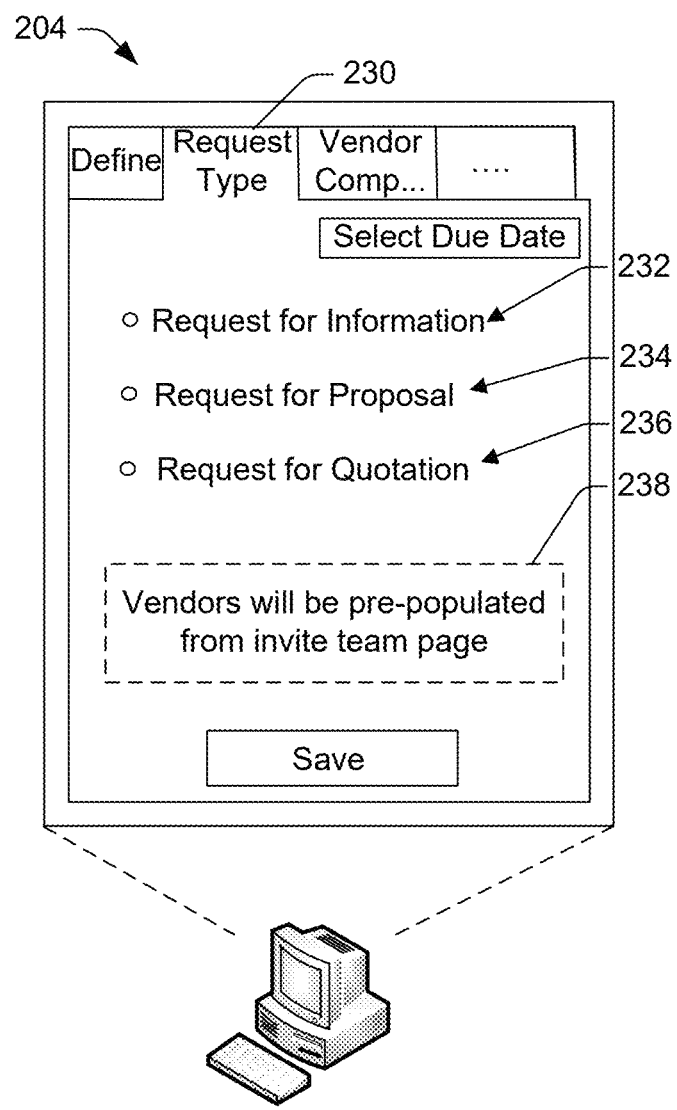

FIG. 2B illustrates interface 204 that may enable a requestor to specify a type of request to send to a vendor. This may be performed under a request type tab 230. The requestor may be enabled to indicate that the request is (i) a request for information by selecting the request for information option 232, (ii) a request for proposal by selecting the request for proposal option 234, or (iii) a request for quotation by selecting the request for quotation option 236. Additionally, the requestor may specify (e.g., invite) a vendor to receive a request, such as through a box 238 (which may show any vendors that may have been previously invited to receive a request). The requestor may be given the option to set a due date for the request as well as the option to save information selectable on the request type tab 230. Once saved, as described above, the tab may turn green, yellow, or remain red depending on the level of completeness of the tab.

Figure 2C:
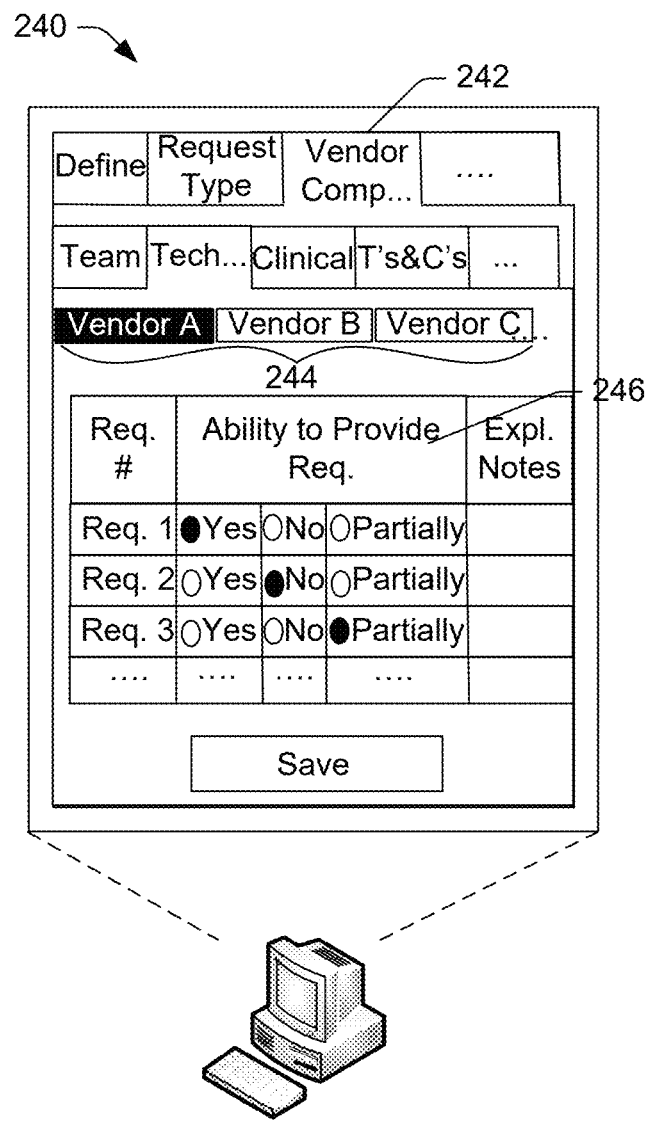

FIG. 2C illustrates interface 240 that may enable a requestor to compare the ability of vendors to fulfill requirements indicated by the requestor. For instance, under a vendor comparison tab 242, a requestor may select from any one of vendors 244 and the interface 240 will present a table, such as table 246, that displays a list of the requirements specified by the requestor, information indicating an ability of a selected vendor to fulfill the requirements, explanatory notes provided by the vendor, and so on. This may allow the requestor to select an appropriate vendor to fulfill a purchase request.

Figure 3:
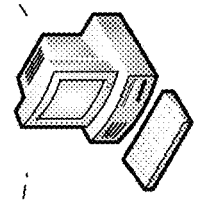
FIG. 3 illustrates an example interface that may be presented to a vendor to enable the vendor to indicate an ability to fulfill a request.

FIG. 3 illustrates an interface 302 that may enable a vendor to indicate whether they are able to fulfill a set of requirements specified by the requestor. For instance, once a requestor has specified which requirements they need for items, those requirements may be sent to multiple vendors. The vendors may view the requirements as shown in table 304 on the interface 302. The requirements may be displayed as a list as shown in list 306. The vendor may be asked to indicate if they are able to fulfill the requirement in full, partially full, or not at all, as shown by indication markers 308, 310, and 312, respectively. Additionally, the vendor may be presented an opportunity to provide an explanatory note for each requirement, as shown by box 314. These notes may provide details regarding fulfillment of a requirement, such as a reason why requirements cannot be fulfilled, details regarding an item that can be provided by a vendor to fulfill a requirement, and so on. Once each vendor has filled out their requirement fulfillment page, then that information can be provided to the acquisition service 104B to be sent to the requestor. For example, the information provided by the vendors may be provided to the requestor via the interface 240.

Figure 4:
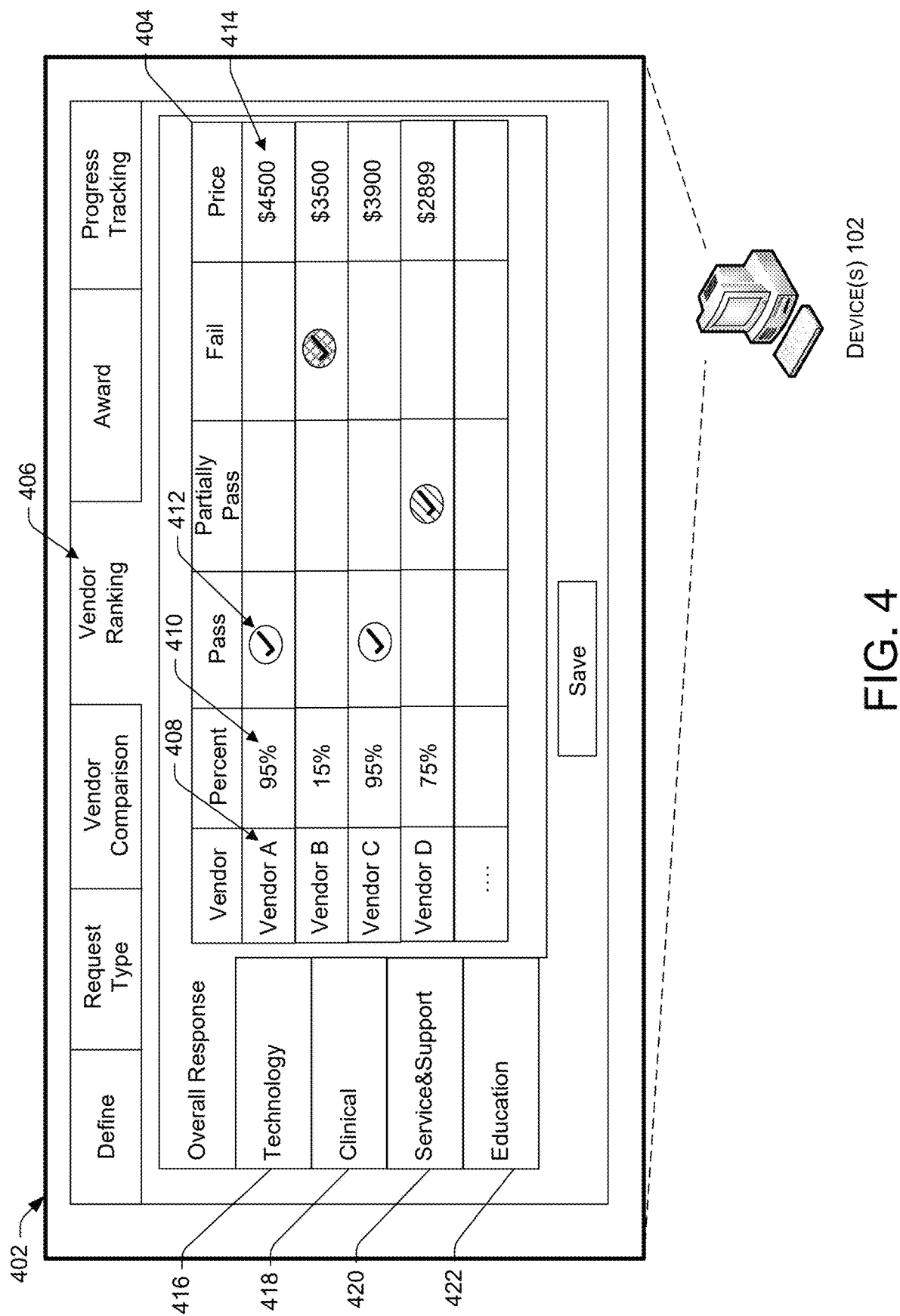
FIG. 4 illustrates an example interface that may be presented to display a ranking of a plurality of vendors.

FIG. 4 illustrates an interface 402 that may enable a requestor to view a ranking of vendors based on the vendors' abilities to fulfill requirements indicated by the requestor. For example, the data processing module 126B may rank the vendors based on their ability to fulfill requirements, a bid price provided by the vendors, and/or a degree of importance (e.g., as indicated by the requestor). For instance, if Vendor A can fulfill more requirements than Vendor B, but Vendor A cannot fulfill any requirements with a high degree of importance, and Vendor B can fulfill requirements with a high degree of importance, Vendor B may be ranked higher than Vendor A. As shown in the interface 402, the ranking of the vendors may be provided via a table 404 under a vendor ranking tab 406. The vendors in the table 404 may or may not be listed in order based on their ranking. The requestor may be presented an overall response rank. As shown, the table 404 may present a percentage of fulfillment (e.g., vendor A—95%, vendor B—15%, etc.), ability ranking (pass, partially pass, or fail), and an overall price regarding each vendor. The percentage may indicate what percent of the requirements that the vendor is able to fulfill. The price may indicate the bid price provided by the vendor to fulfill requirements set forth by the requestor (e.g., a bid at which items are being offered for acquisition). The ability ranking markers indicate a level of fulfillment of requirements (e.g., a pass may be associated with fulfillment of a first threshold number of requirements, a partial pass may be associated with fulfillment of a second threshold number of requirements that is less than the first threshold number, and a fail may be associated with less than the second threshold number of requirements). The pass, partially passed, and fail markers may be color coded. For instance, a green indicator may represent passed, a yellow indicator may represent partially passed, and a red indicator may represent fail. In this example, Vendor A (408) has a 95% requirement fulfillment percentage 410, and is associated with a pass, shown by an indicator 412, with a bid price of $4,500, shown by a bid price 414.

Further, the interface 402 includes tabs 416-422 which provide the ability to view the vendors rank and ability to fulfill specific requirements (e.g., requirement of particular categories). For instance, if the requestor clicked on a technology tab 416 the requestor would be provided with a list of the requirements that the requestor previously specified regarding technology, as well as an indication for each vendor detailing an ability of the vendor to fulfill the requirements for technology.

Figure 5:
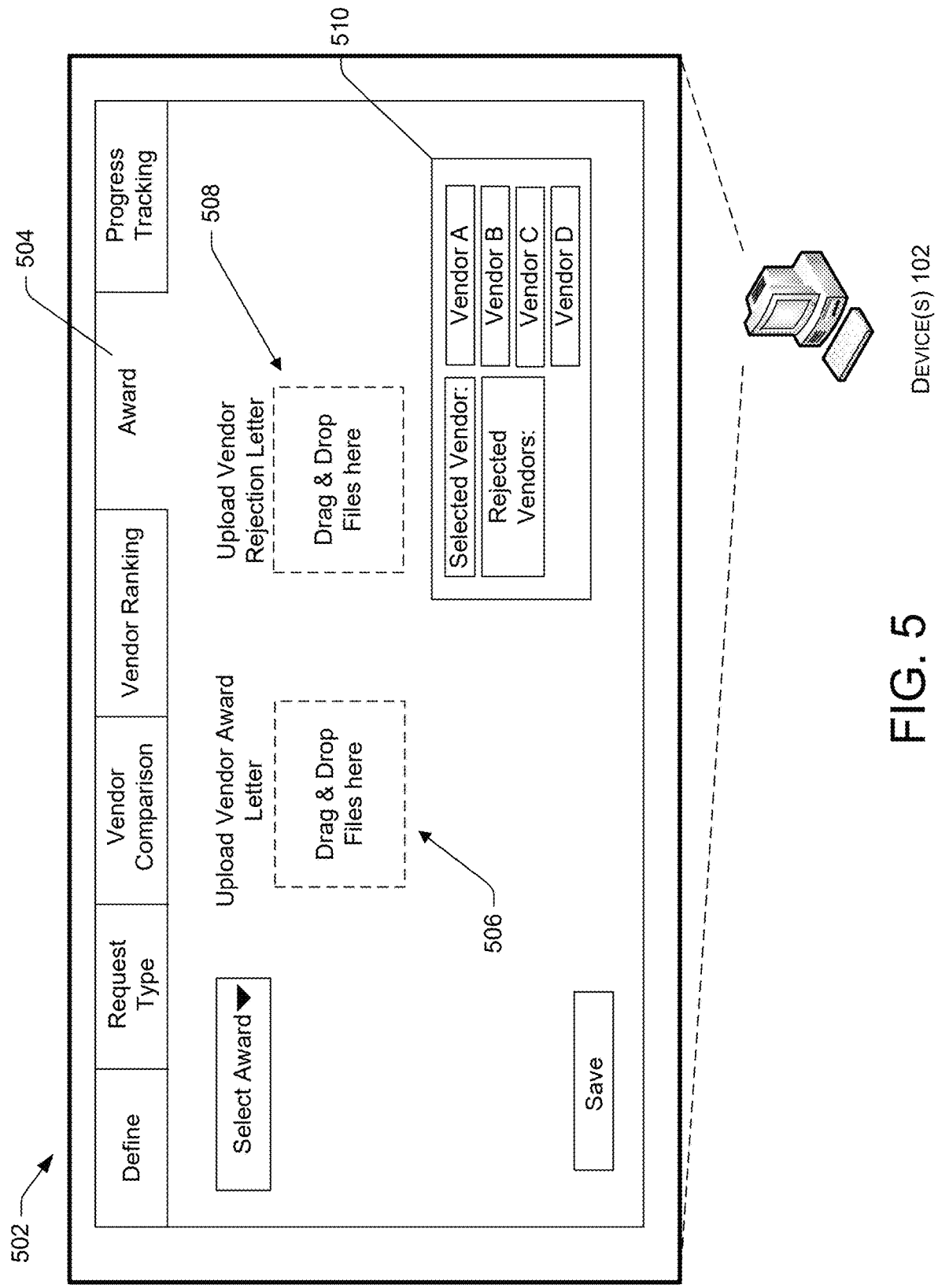
FIG. 5 illustrates an example interface that may be presented to a requestor to enable the requestor to select a vendor for purchasing items.

FIG. 5 illustrates an interface 502 that enables a requestor to select a vendor in which to award a purchase. The interface 502 may be presented under an award tab 504 and may include drag and drop boxes 506 and 508 for uploading a vendor award letter or vendor rejection letter, respectively. Additionally, there may be a table 510 that displays a list of the selected vendor and rejected vendors. Although a single vendor is shown as a selected vendor, in some instances multiple vendors may be selected for a final stage. For example, vendors that are able to satisfy a threshold number of requirements may be selected for further communications with a requestor (e.g., to get into further details regarding bids).

Although not illustrated in FIGS. 2-5, in some instances a progress tracking tab may be presented to enable a requestor to view the progress of a purchase (e.g., due dates, dates submitted), ask questions of vendors, and the like. For example, the progress tracking tab may display to a requestor a date that a vendor award letter was sent as well as an indication of when the items that the vendor is providing are expected to arrive.

Figure 6:
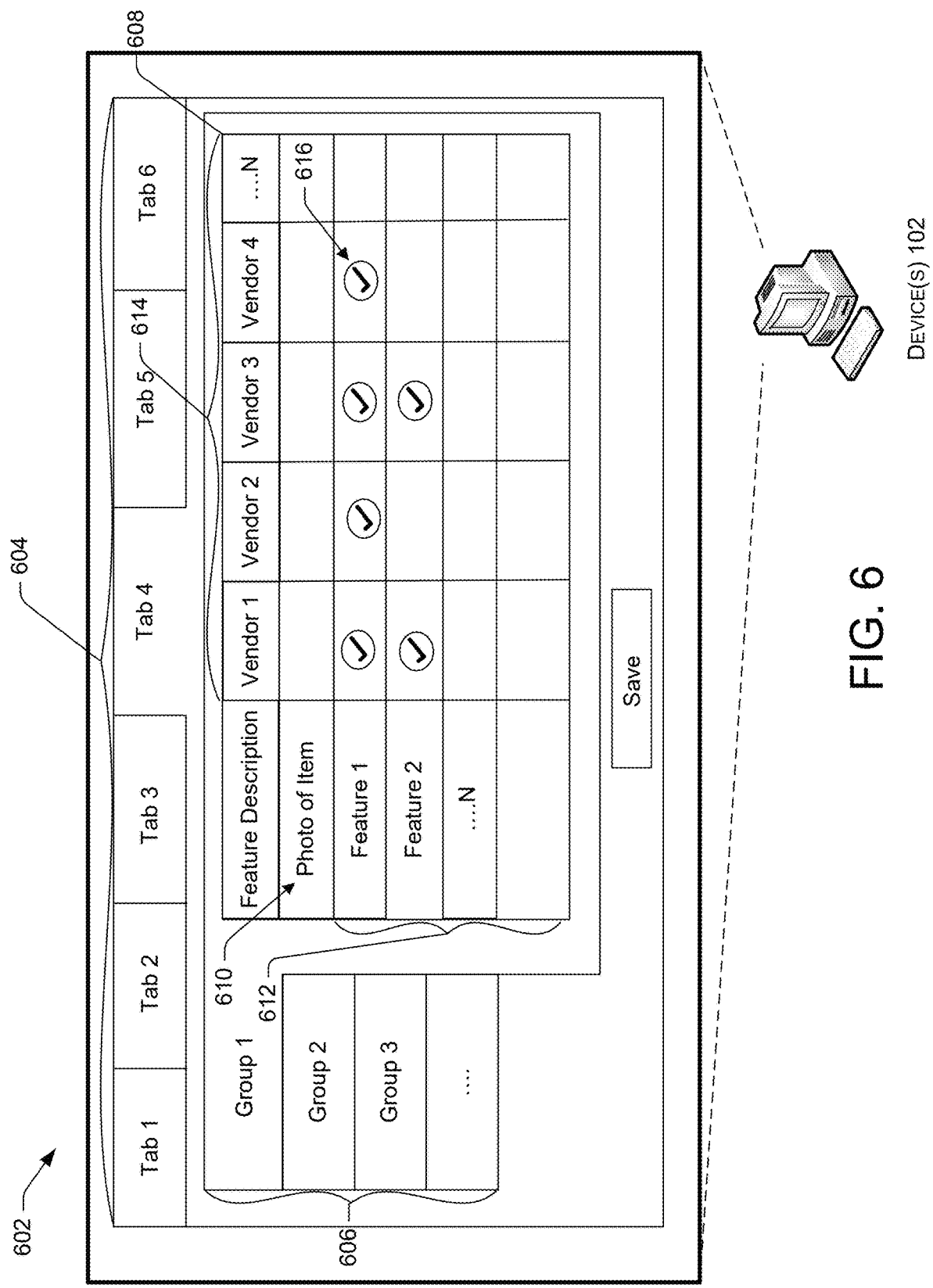
FIG. 6 illustrates an example interface displaying a vendor library.

FIG. 6 illustrates an interface 602 that enables a requestor to view a vendor library. The vendor library provides an opportunity for a requestor to learn about items available for purchase and which vendors are offering those items for purchase. The information on the interface 602 may be provided to the acquisition service 104B from vendors. The information in the vendor library may be accessible via a series of tabs, such as tabs 604 and tabs 606. In some instances, the tabs 604 may correspond to a define tab, a request type tab, a vendor comparison tab, a vendor ranking tab, an award tab, and/or a progress tracking tab, similar to those discussed above in FIGS. 2-5. In this case, the selected tab ("Tab 4") may be a vendor library tab. The tabs 606 may allow the requestor to access information regarding different items available for purchase (e.g., different categories of items). For instance, the tabs 606 may include information regarding telemetry items, large monitor items (e.g., computer monitors), compact monitor items, transport items, telemetry transmitters, telemetry systems, disclosure systems, and/or remote access systems. As an example, Group 1 may be large monitor items, Group 2 may be compact monitor items, and Group 3 may be telemetry transmitters. The table 608 may present information that is specific to an item 610. For example, the table 608 may display features 612 associated with the item 610, a list of a plurality of vendors 614, and an indication(s) 616 specifying which vendors are able to provide the features 612 for the item 610. As an example, if Group 1 in the tabs 606 related to large monitors, the table 608 may indicate (i) features specific to large monitors that are available for purchase, (ii) which vendors offer large monitors for acquisition, and/or (iii) which vendors offer which features for the large monitors.

Although the example of FIG. 6 discusses providing information regarding a vendor library to a requestor, in some instances such information may not be made available to the requestor. Rather, the information for the vendor library may be maintained by the acquisition service 104B to generate interfaces that more generally describe features that are available, such as the interface 202 of FIG. 2A.

Figure 7:
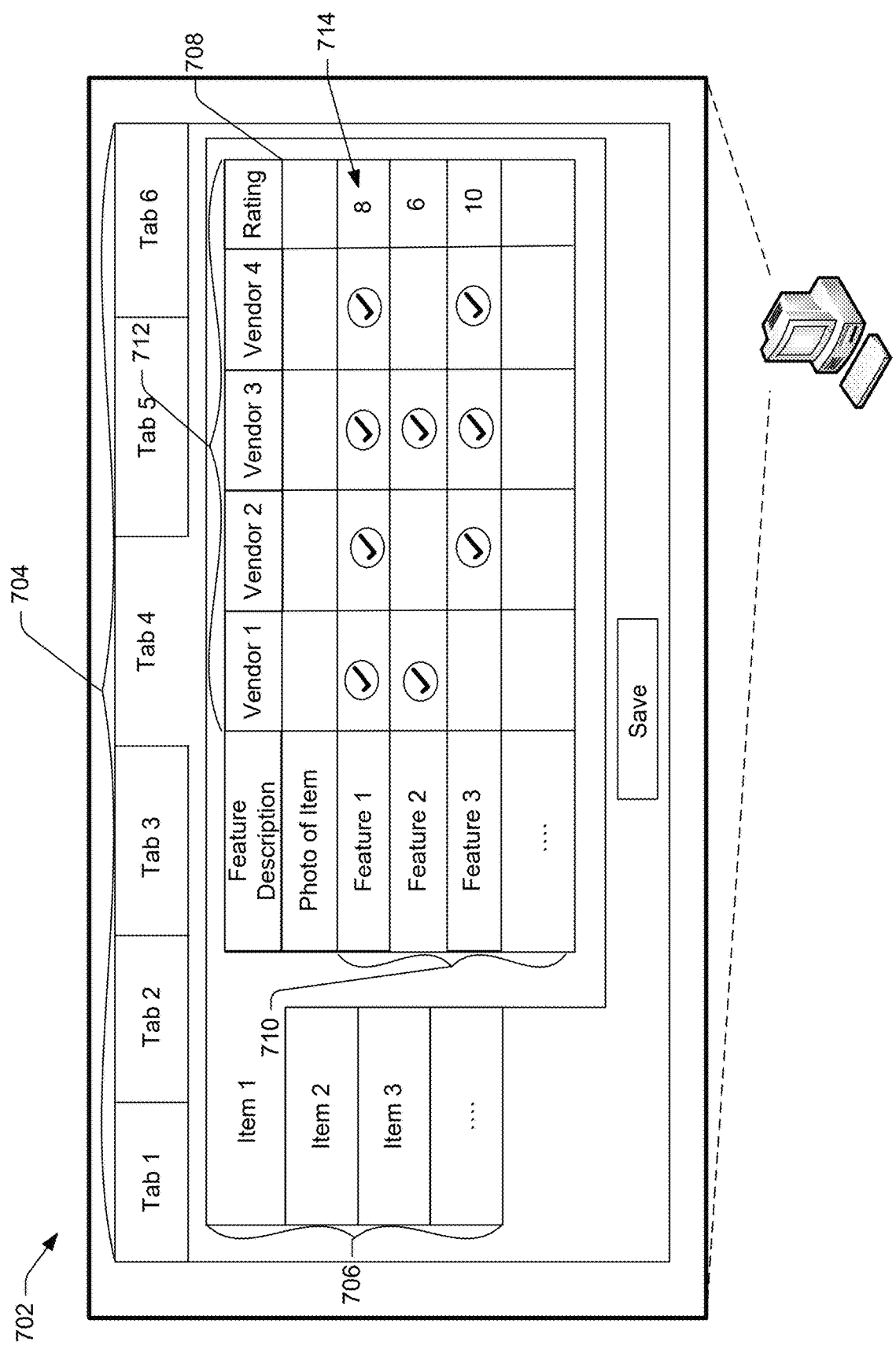
FIG. 7 illustrates an example interface to enable users associated with an acquisition service to enter and/or organize information regarding items available for purchase.

FIG. 7 illustrates an example interface 702 to enable users associated with the acquisition service 104B to enter and/or organize information regarding items available for purchase. In this example, users associated with the acquisition service 104B may submit information regarding items that are offered by vendors. Thereafter, the acquisition service 104B may use the information to generate various interfaces for requestors, vendors, and so on. For example, the information gathered through the interface 702 may be used by the acquisition service 104B to provide the interface 202 to a requestor to specify requirements in a request items. In another example, the information gathered through the interface 702 may be used to provide the interface 602 to a requestor to view a vendor library.

As illustrated in FIG. 7, the interface 702 may have a plurality of tabs 704 that correspond to a plurality of category of items available for purchase from a plurality of vendors. Within an individual tab, there may be additional tabs, such as tabs 706, which correspond to specific items within the category of item tabs. For instance, within a monitor tab (e.g., "Tab 4"), the more specific items may include large monitors, compact monitors, transport monitors, and the like. When an individual item is selected, table 708 may present a plurality of features 710 that correspond to the individual item. An individual associated with the acquisition service 104B may be enabled to enter information into the table 708 that indicates which vendors of the plurality of vendors 712 provide an item with the indicated features. Additionally, the individual associated with the acquisition service 104B may provide a rating for each item and/or feature indicating a level of importance for each item and/or feature, such as rating 714. Alternatively, or additionally, these ratings may be determined by the acquisition service 104B, such as by populating the ratings based on ratings received from a plurality of requestors in the past. For instance, if a certain feature is always rated relatively high by requestors filling out a request, then that feature may automatically be rated relatively high in the interface 702. Furthermore, there may be an option on the interface 702 to add a row or column in the table 708 in order to add an additional feature or add an additional vendor. In some cases, a cell containing information regarding a certain feature may be expandable in order to enable the addition of more detailed data. For instance, when the information regarding a certain feature is too large to fit within a cell of the table 708, the cell can be expanded to add the additional information, and then be retracted so that the information cannot be viewed unless the feature is interacted with (e.g. clicked on, hovered over, etc.).

Figure 8:
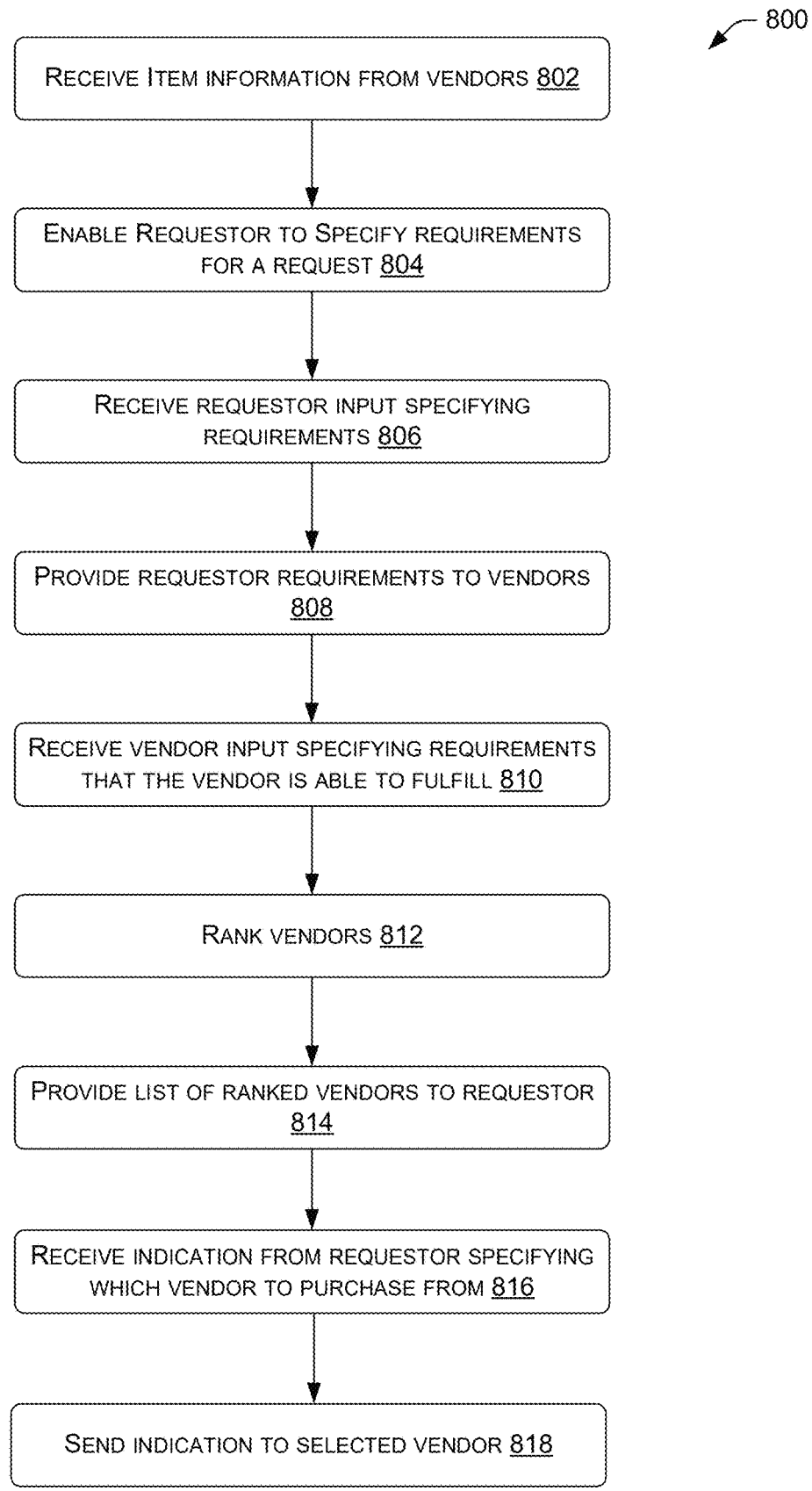
FIG. 8 illustrates an example process to enable a requestor to select a vendor for fulfilling requirements of the requestor for items.

FIG. 8 illustrates example process 800 for employing the techniques described herein. For ease of illustration the process 800 is described as being performed in the architecture 100B of FIG. 1. For example, one or more of the individual operations of the process 800 may be performed by the device 102B, the computing device associated with the vendor 106B, and/or acquisition service 104B. However, the process 800 may be performed in other architectures. Moreover, the architecture 100B may be used to perform other processes.

The process 800 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the individual operations may be omitted.

FIG. 8 illustrates the example process 800 to enable a requestor to select a vendor for fulfilling requirements of the requestor for items. In this example, the process 800 is described as being performed by the acquisition service 104B.

At 802, the acquisition service 104B may receive item information from a vendor regarding details of items available for acquisition (e.g., specifications of equipment available for purchase). For instance, the vendor 106B may inform the acquisition service 104B that they have telemetry devices, large monitor devices, compact monitor devices, transport monitor devices, telemetry transmitter devices, telemetry systems, remote access systems, and the like available for purchase. Each of these items may have different specifications that the vendor 106B may provide to the acquisition service 104B. To illustrate, the item information or the features available for telemetry devices may include, device name, waveform views, bad lead indicators, remote print buttons, pacemaker detection, pacemaker rejection, dimensions, weight, display size, color display, ECG display, waterproof, defibrillation detection, battery type, battery life, charge time, battery status indicator, bands available, hot swap channel repair, supported sensors, diagnostic 12 lead, arrhythmia analysis QT and ST segment analysis, real-time waveform on transmitter, audible alarms, and the like. As another illustration, the specification information or the features available for the monitoring devise may include, device name, multi-parameter modules, additional module support, screen size, touchscreen, bedside PC, trends at bedside, $3^{rd}$ party device integration, configurable alarms, configurable views, modes (adult, pediatric, and neonate), patient data transfer, remote access of patient data, barcoding, release date, projected end-of-life, ECG, respirations, dual SPO2, NIBP, Temperature, invasive pressure, cardiac output, ETCO2, EEG, hemodynamic calculations, drug dose calculations, and the like. The information received from the vendor 106B may be stored in the entity data store 132B. Alternatively, or additionally, operation 802 may include receiving information from other sources, such as from individuals associated with the acquisition service 104B (e.g., through the interface 702), from vendors' websites (e.g., automatically scrapping websites), etc.

At 804, the acquisition service 104B may enable the requestor to specify requirements for a request. For example, the acquisition service 104B may provide an interface (e.g., the interface 110B) via the device 102B with options to specify requirements for acquiring items. In one example, this may include displaying the interface 202 of FIG. 2A. In some instances, the options that are provided are based on items and features of the items that are available from vendors (e.g., based on the item information received at 802). In some instances, this information is received through the interface 702. Further, in some instances various tabs may be presented via the interface to enable requirements to be specified for various categories of items/features. For instance, the interface may provide a networking tab, server tab, security tab, interfacing tab, remote access tab, test environment tab, project management tab, and so on. Additionally, in some instances the interface may provide the requestor 108B with access to a vendor library, which displays details (e.g., features, specifications, etc.) regarding items that are available from vendors and which vendors can supply which items.

At 806, the acquisition service 104B may receive requestor input specifying requirements for acquiring items (e.g., requirements of the requestor 108B for items). For instance, through the device 102B and the interface 202, the requestor 108B may indicate which items and/or features of items they are interested in purchasing. As one example, the requestor 108B may indicate what features they would like included, without necessarily specifying which item they would like to purchase. Additionally, or alternatively, for each requirement, the requestor may indicate a degree of importance. For instance, when indicating networking requirements, as shown in FIG. 2A, if having a proprietary LAN hard wired network is important to a requestor, the requestor may give that requirement an "8" (on a scale of 1-10, with 10 being the most important). Whereas, if a proprietary LAN wireless network is not important, the requestor may give that requirement a "2."

At 808, the acquisition service 104B may provide requirements received from a requestor to vendors. For example, the acquisition service 104B may provide an interface (e.g., the interface 302 of FIG. 3) to a vendor to enable the vendor to specify an ability to fulfill requirements.

At 810, the acquisition service may receive input from a vendor(s) specifying which requirements the vendor(s) is able to fulfill. For instance, the interface 302 may be provided to the vendor 106B. The vendor 106B can then specify if they can fulfill the requirement, they cannot fulfill the requirement, or if they can partially fulfill the requirement. Additionally, or alternatively, the vendors 106B may be provided with a section to provide an explanatory note. Further, the vendor 106B may specify a price at which requirements may be fulfilled (e.g., a bid price at which items are offered that satisfy the requirements).

At 812, the acquisition service 106B may rank vendors based on their ability to fulfill the requirements, a degree of importance of requirements (e.g., as indicated by a requestor, set by the acquisition service 104B, learned overtime, etc.), and/or the bid price received from the vendors.

At 814, the acquisition service 104B may provide a list of the ranked vendors to a requestor. As one example, the list may include, as shown in FIG. 4, an overall response section listing each vendor, each vendor's percent of the requirements they are able to fulfill, a pass, partially pass, or fail indication, and/or the bid price provided by the vendor. Additionally, or alternatively, other information may be displayed regarding individual requirements and/or an indication of which vendors are able to fulfill those requirements.

At 816, the acquisition service 104B may receive an indication from a requestor specifying which vendor the requestor would like to purchase items from. As one example, a vendor may select a vendor and upload a vendor award letter to be sent to the vendor. In some instances, the requestor may additionally, or alternatively, upload a vendor rejection letter to be sent to a vendor that has not been selected.

At 818, the acquisition service 104B may send an indication to a selected vendor (e.g., a device associated with the selected vendor) indicating an intent of a requestor to acquire items from the selected vendor.

FIG. 9 illustrates an example interface 900 to enable a user associated with an acquisition service to setup a new project. In this example, the interface 900 presents multiple tabs, sections, or subsections 906 that are each associated with an indicator (e.g., 902, 904) indicating a level of completeness or progress. For example, the indicator 902 and/or 904 may be associated with a specific color, an icon, image, etc. indicating a level or progress of completion associated with a particular section. In some examples, the interface 900 may present a progress indicator that indicates a level of completion associated with completing the entire project or all of the sections.

Under the project setup tab, a user is presented with a number of requirements a user may be required to complete before the user may access the next tab, section, or subsection. For example, a user may need to provide a project name, a project type, a project category, a project description, and/or add at least one project file before the user may access the next tab, section, or subsection. In this particular example, the next subsection is a "location" tab. In some examples, a user may need to provide a threshold level of information before the user may access the next tab, section, or subsection. For example, and not by way of limitation, a user may only need to enter a project name before a user may access the locations tab. The interface 900 may then provide an indication to the user if all (or more than a threshold number) of the requirements or information on the project setup tab were specified. For example, the indicator 904 may turn green if all required or available requirements or information has been specified or provided. Alternatively, if a user only partially completes the requirements (e.g., more than a first threshold and less than a second threshold), the indicator 904 may turn yellow. Further, if no information has been provided (e.g., no options are selected) the indicator 904 may be red. In some examples, the multiple tabs, sections, or subsections 906 may be associated with red indicators before they have been selected or filled out. In some examples, a user may not be allowed to select (e.g., click) or access one of the multiple tabs, sections, or subsections 906 unless all prior tabs, sections, or subsections have been filled out to an extent (e.g., more than a first threshold). However, in some examples, prior tabs, sections, or subsections may need only be partially completed (e.g., more than the first threshold and less than a second threshold).

In some examples, a user's access to one or more of the multiple tabs, sections, or subsections may be based at least in part on the user's status, title, access level, and/or privacy setting. For example, a project owner may access any part of the Project Setup tab or subsections while performing the project setup activity. In some examples, the number of requirements a user may be required to complete may be based at least in part on the user's status, title, access level, and/or privacy setting. In some examples, a user's access to one or more multiple tabs, sections, or subjections may be based at least in part on a user completing one or more requirements associated with only a portion of the multiple tabs, sections, or subjections. For example, in some instances a user may not be permitted to access a tab, section, or subsection associated with managing vendors or vendor reports until a user has completed or partially completed requirements associated with a tab, section, or subsection associated with enterprise requirements.

Figure 10:
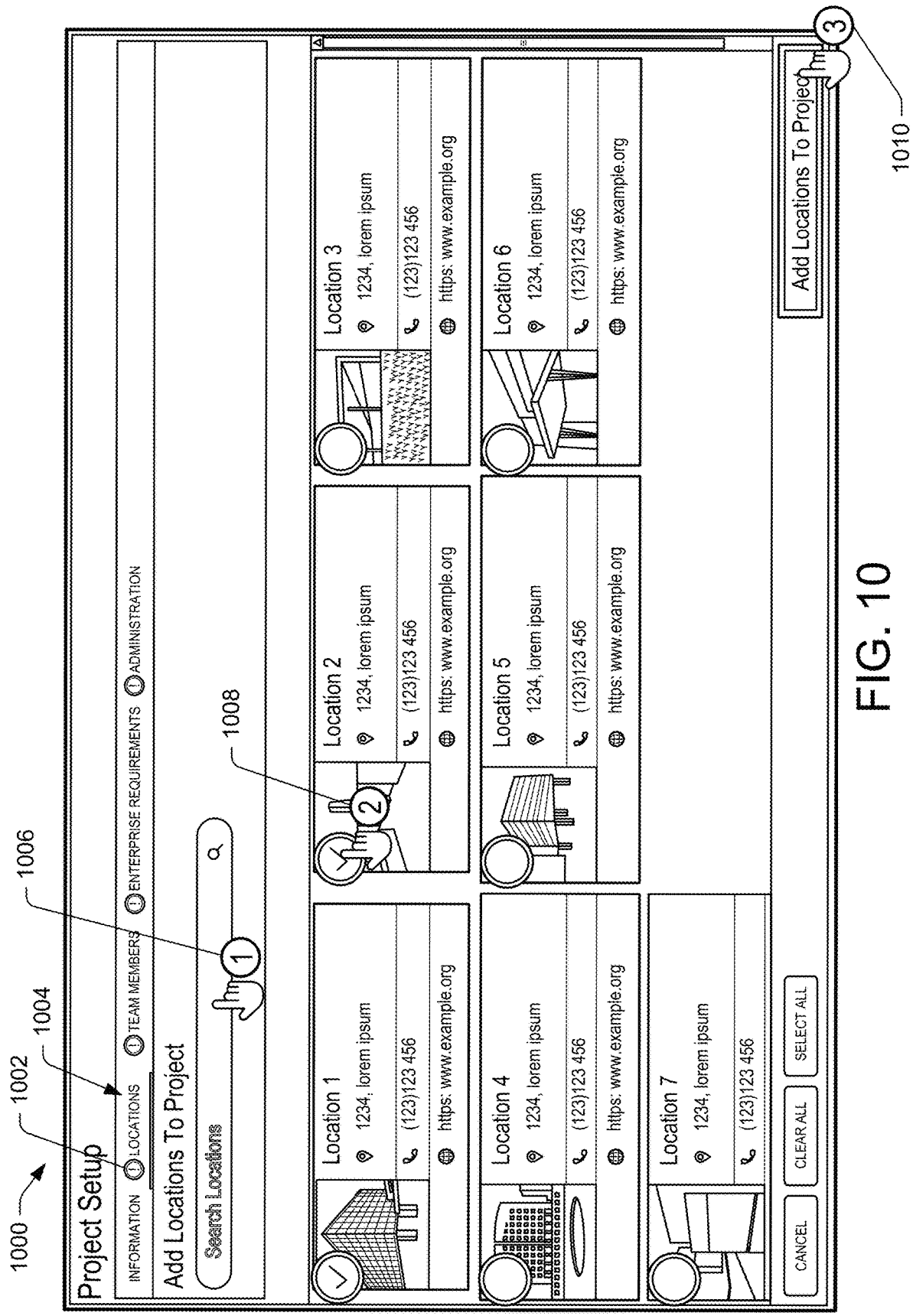
FIG. 10 illustrates an example interface to enable a user associated with an acquisition service to add one or more locations to a project.

FIG. 10 illustrates an example interface 1000 to enable a user associated with an acquisition service to add one or more locations to a project. In some examples, a project may have just a single location, while in other examples, a project may include multiple locations (e.g., multiple different offices in a multi-office organization). In some examples, the acquisition service may restrict access to the locations tab 1004 until the user (or another user) has completed a threshold level of requirements associated with one or more prior tabs, sections, or subsections. The location tab 1004 may be associated with an indicator 1002 that may provide an indication to the user if all (or more than a threshold number) of the requirements on the locations tab 1004 are specified.

The example interface 1000 enables a user to search for locations 1006 to add to a project. In some examples, the user may search for a location by name, address, phone number, or the like. In some examples, information associated with a location may include a picture of the location, an address, a phone number, a link to a website, or the like. The user may select any number of locations 1008 to add to a project. In the particular example, a user has selected both location 1 and location 2 to be added to the project. The indicator 1002 may change (e.g., go from red, to yellow, to green) depending on the number of requirements associated with the location tab 1004 a user has completed. For example, the indicator 1002 may be red when no locations have been added to a project. The indicator 1002 may turn yellow when one location has been added to the project and the one added location may be missing one or more of an address, a phone number, or any other required information (e.g., more than a first threshold level of requirements but less than a second threshold level of requirements). The indicator 1002 may turn green when at least one location has been added and the one location includes one or more of the required information such as a title, description, an address, a phone number (e.g., more than a second threshold level of requirements).

Figure 11A:
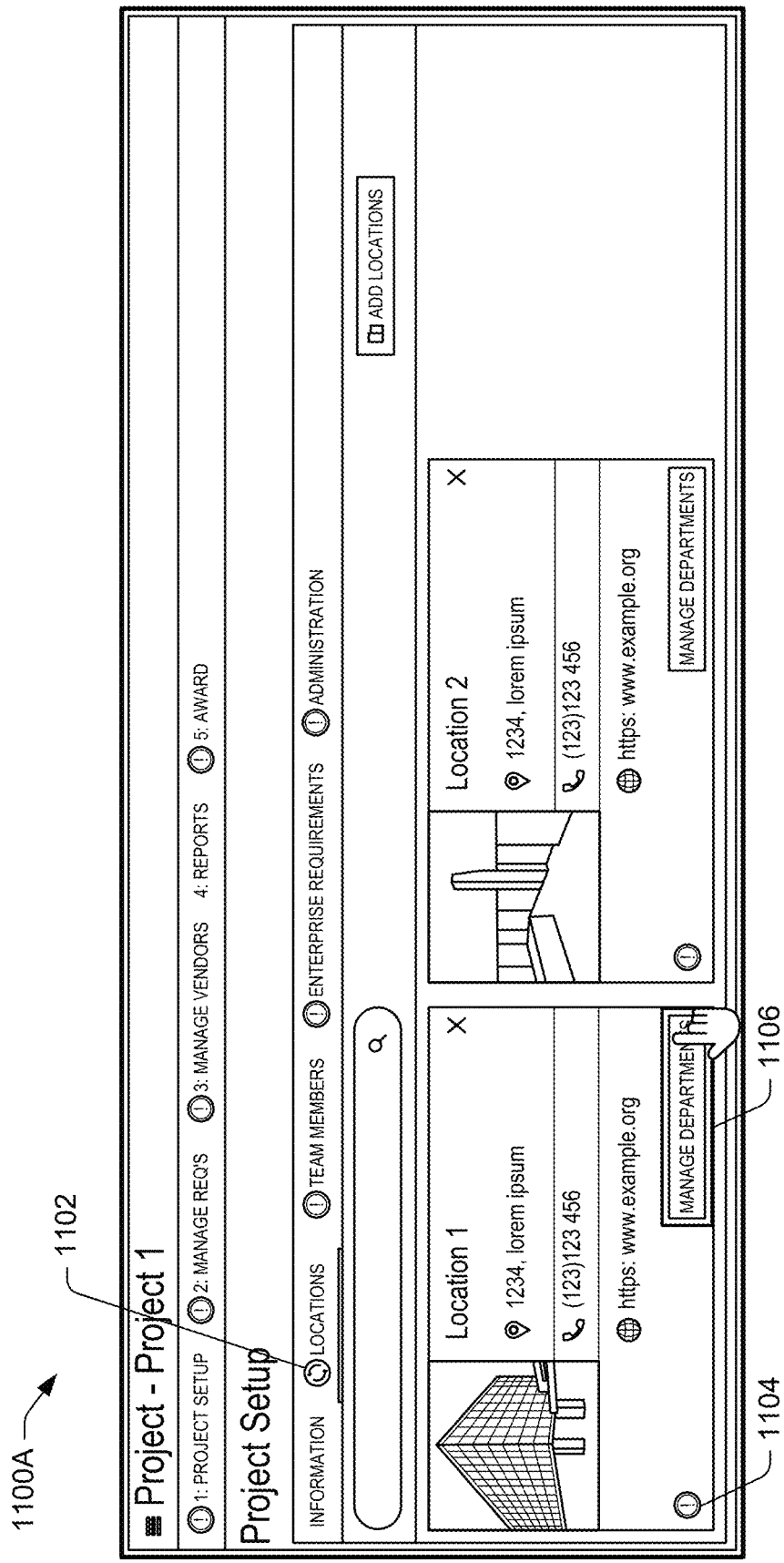
FIG. 11A-11B illustrate example interfaces that enable a user to add and manage one or more departments associated with a location.
Figure 11B:
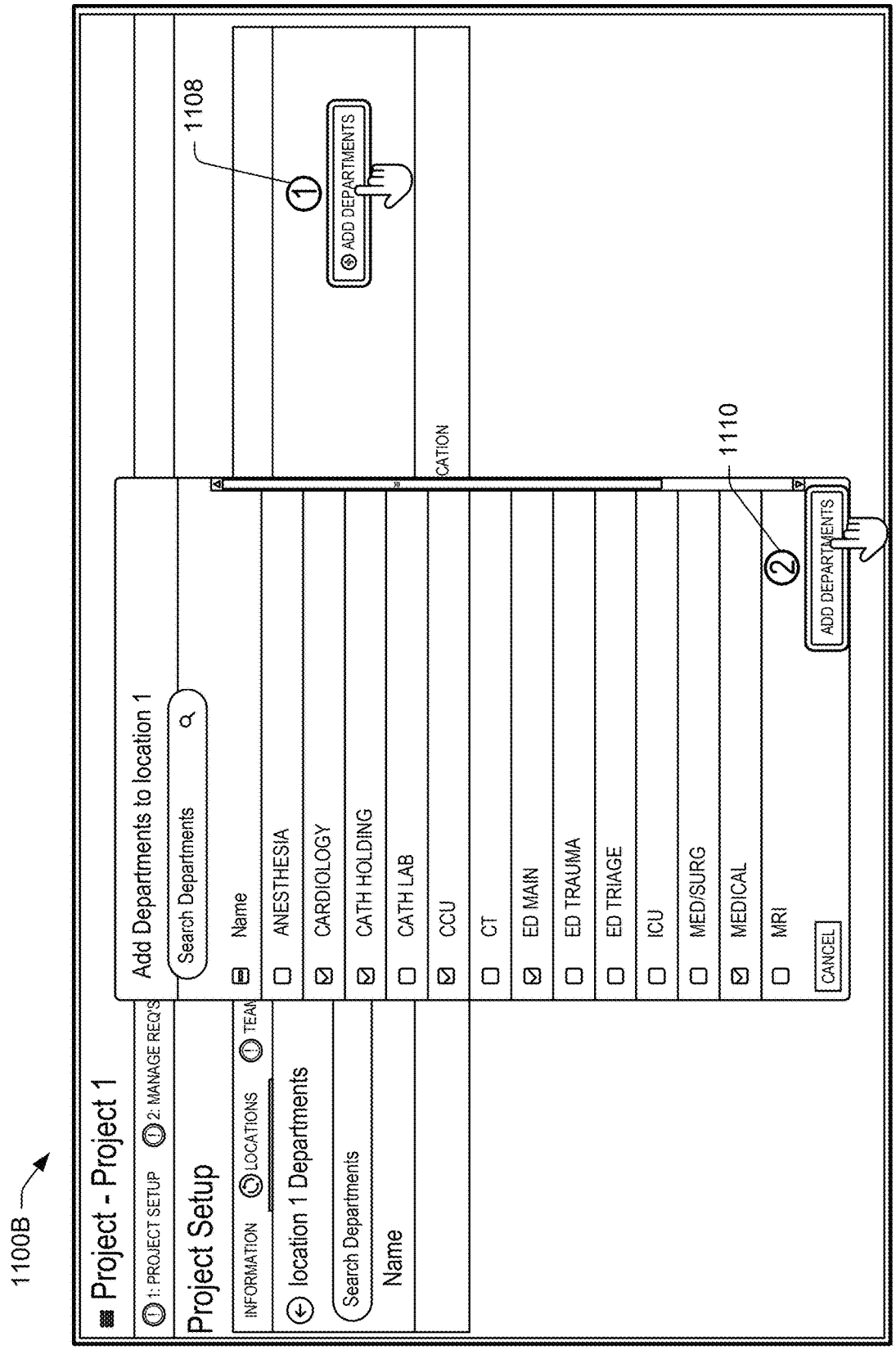

FIGS. 11A-11B illustrate example interfaces 1100A-1100B that enable a user to add and manage one or more departments associated with a location. This may be performed under the location tab 1102. Each of the selected locations may be associated with an indicator 1104 indicating whether a user has added one or more departments to the particular location. For example, if a user has not added a single department to a location, the indicator 1104 may be red.

FIG. 11B illustrates an example interface 1100B that may enable a user to add one or more departments to a location. For example, a user may first select element 1108 to add one or more departments to location 1. In response to a user selecting element 1108, the acquisition service 104B may cause a list of departments to be presented to the user via interface 1100B. The acquisition service 104B may receive, from the user, an indication of selection of one or more departments or a portion of the listed departments for association with the location. A user may select element 1110 to add one or more departments to associate with the location.

Figure 12A:
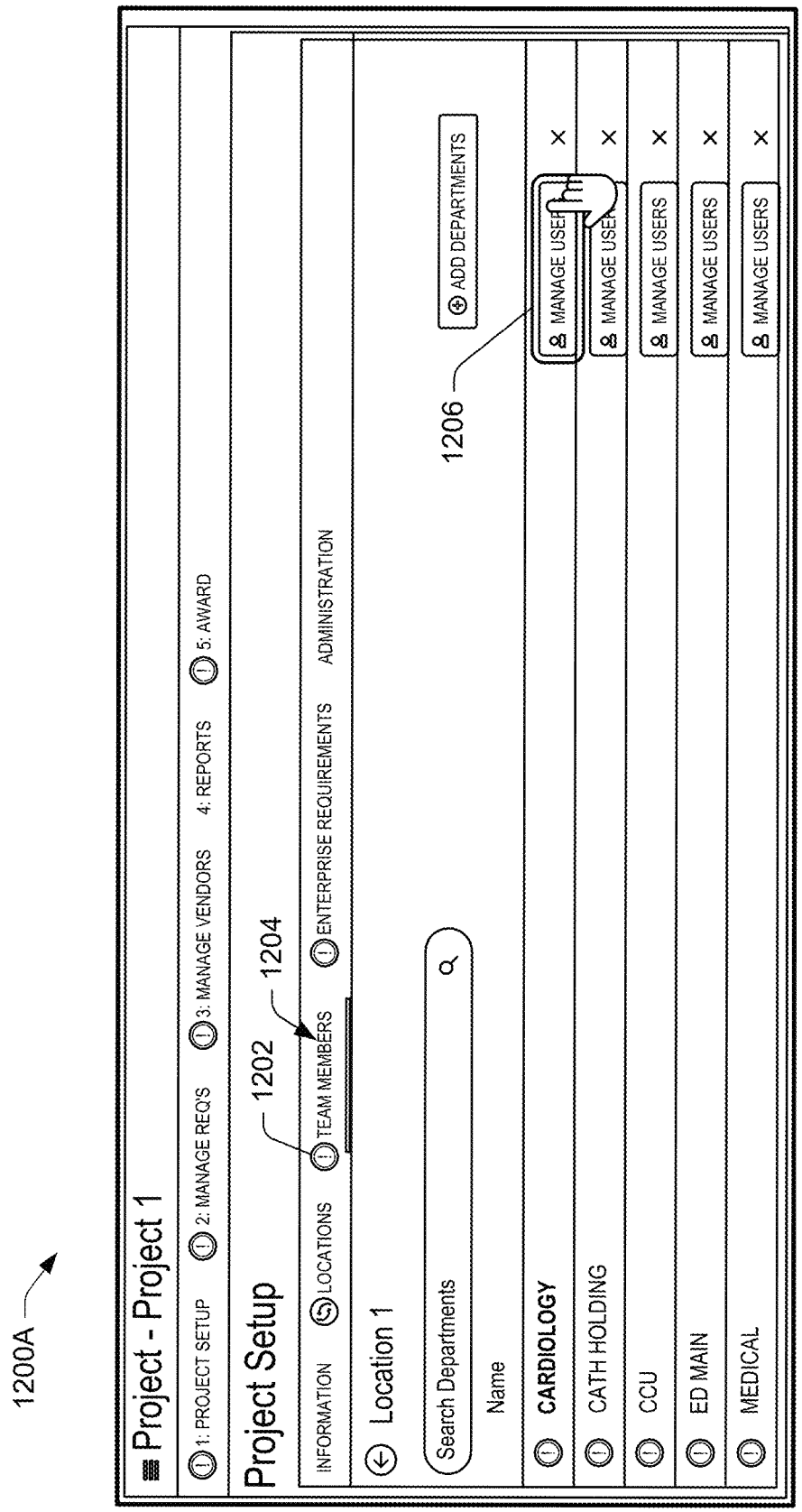
FIG. 12A-12B illustrate example interfaces that enable a user to assign and manage one or more users to a department.
Figure 12B:
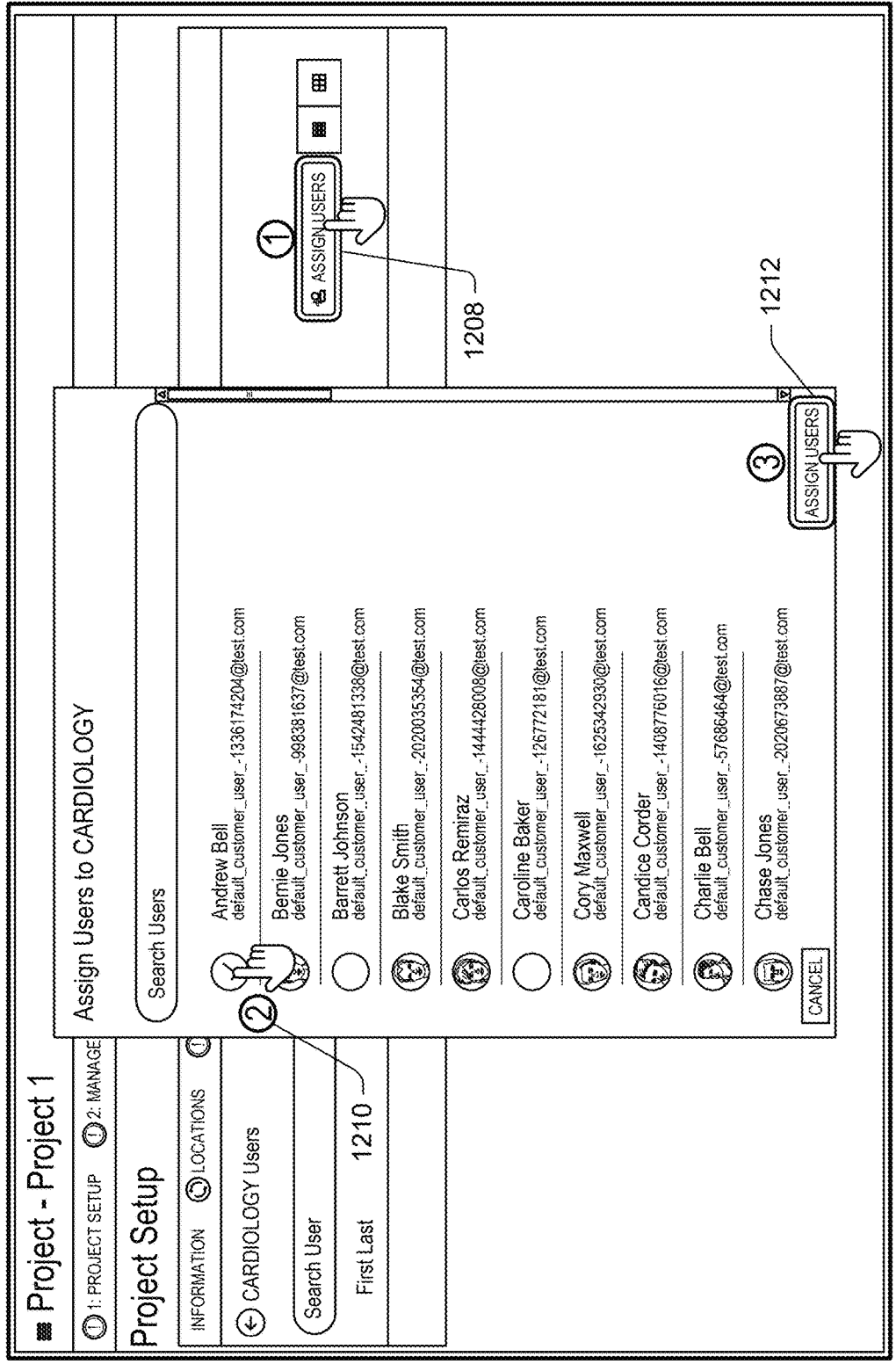

FIGS. 12A-12B illustrate example interfaces 1200A-1200B that can be presented by the acquisition service to enable a user to assign and manage one or more users to a department. The team members tab 1204 may enable a user to assign one or more users to a department. The team members tab 1204 may be associated with an indicator 1202 that indicates whether a user has competed a threshold number of requirements associated with the team members tab 1204.

FIG. 12A illustrates an example interface 1200A that may enable a user to manage users associated with a particular department at a particular location. In this particular example, a user may select element 1206 to manage users for the cardiology department associated with location 1. In some examples, individual departments may be associated with an indicator (not shown) indicating whether a user has assigned at least one user (or a threshold number of users) to a department. In some examples, a user may select element 1206 to add or assign users to a department. In some examples, the acquisition service 104B may present user interface 1200B (shown in FIG. 12B) in response to the user selecting element 1206 in FIG. 12A.

FIG. 12B illustrates an example interface 1200B that enables a user to assign one or more users to a department. For example, a user may select element 1208 to assign one or more other users to a department (e.g., a cardiology department). In response to receiving the user input, the acquisition service 104B may cause a list of users to be presented to the user via interface 1200B. The user may search for users (e.g., by name, email address, phone number, or the like) and/or may select individual users 1210 from a list of users and proceed to assign 1212 the selected users to the department. In some examples, the acquisition service 104B will automatically send each of the assigned users a notification (e.g., an email, text message, or the like) informing each of the users that they have been assigned to a project. In some examples, individual users may be assigned certain tasks that must be completed (e.g., selection of products or services for a particular location, department, etc.) before the process can proceed to the next stage. In that case, the acquisition service may limit or prevent access to subsequent and/or dependent sections of the project interface until assigned tasks are completed.

Figure 13:
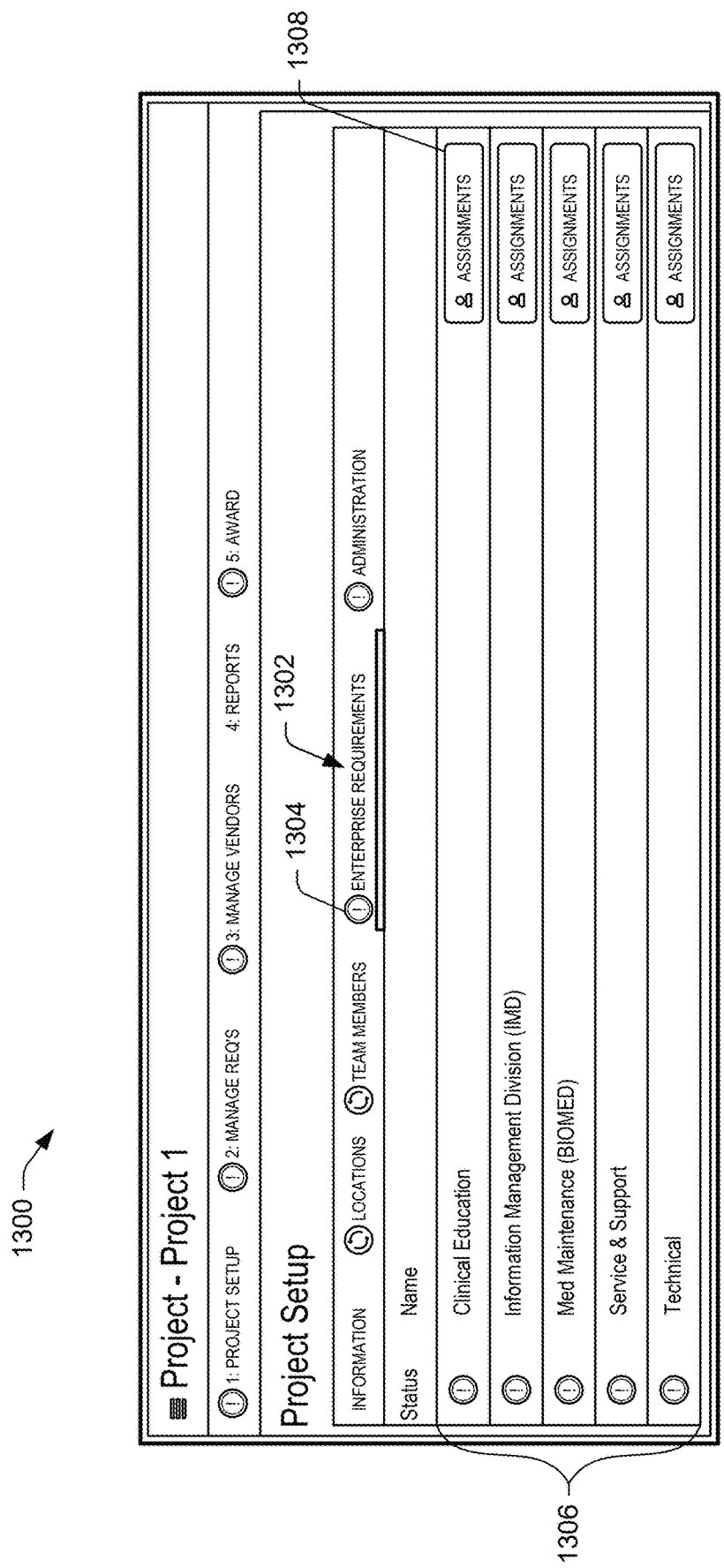
FIG. 13 illustrates an example interface that enables a user to manage enterprise requirements.

FIG. 13 illustrates an example interface 1300 that enables a user to manage enterprise requirements. This may be performed under an enterprise requirements tab 1302. Enterprise requirements 1306 may include requirements that are applicable to more than one location or to all locations associated with a company or business. For example, enterprise requirements 1306 may be features such as clinical education, information management division, medical maintenance, service & support, technical, or the like. Enterprise requirements may differ across businesses, industries, firms, ventures, or the like.

In some examples, the enterprise requirements tab 1302 is associated with an enterprise requirements indicator 1304 that indicates whether a user has competed a threshold number of requirements associated with the enterprise requirements tab 1304. For example, the acquisition service 104B may prevent a user from accessing the next tab or certain tabs (e.g., the administration tab, reports tab, and/or reward tab) until a user has assigned at least 1 person to complete one or more of the enterprise requirements 1306.

In some examples, the interface 1300 enables a user to assign one or more users to provide information related to an enterprise requirement. In the particular example, a user may select element 1308 associated with the clinical education enterprise requirement and assign one or more users to enter information related to this enterprise requirement. In some examples, the acquisition service 104B may send an automatic notification (e.g., an email) to each of the individuals assigned. In some examples, the acquisition service 104B may give the one or more assigned users access to information associated with the enterprise requirement they were specifically assigned. For example, the one or more users assigned to the clinical education enterprise requirement may only be given access to enter or change information related to the clinical enterprise requirements.

Figure 14A:
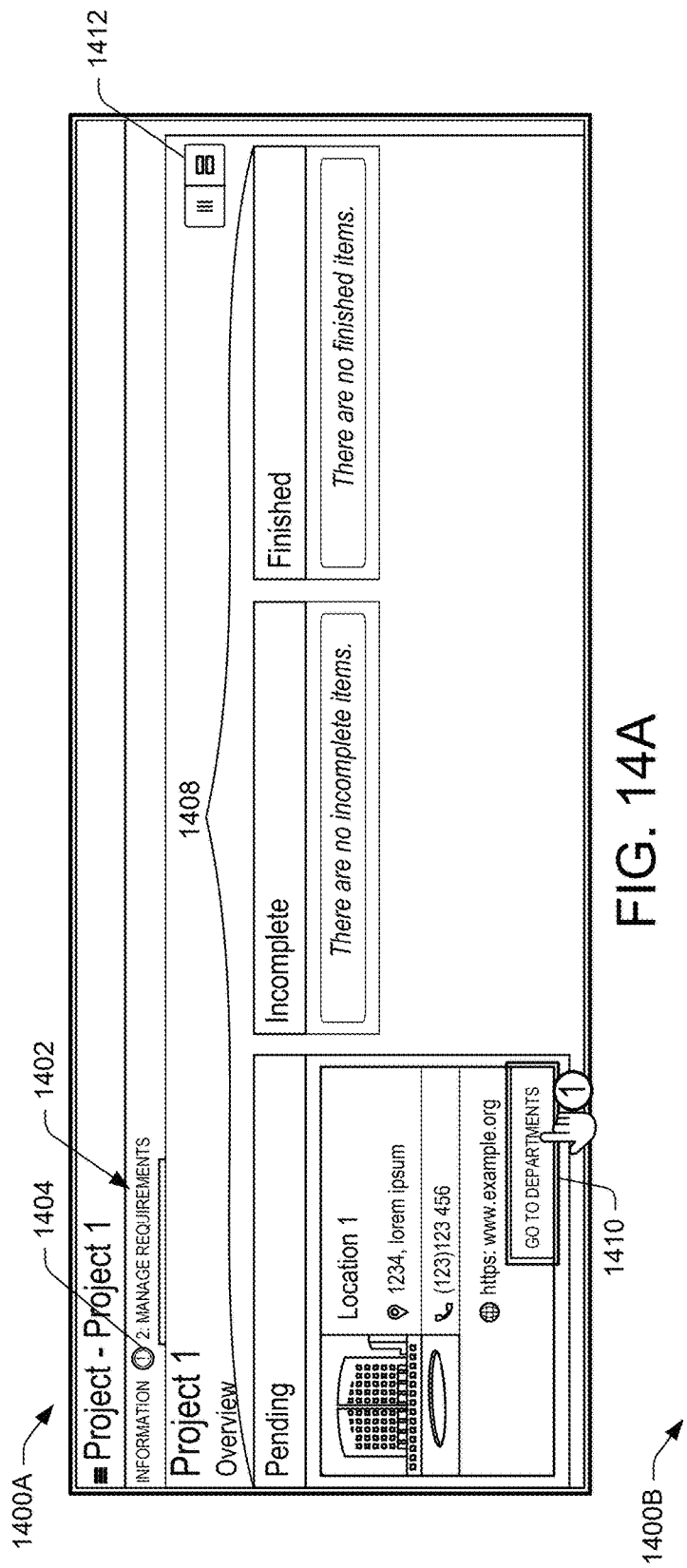
FIG. 14A-14B illustrate example interfaces that enable a requestor to view pending, incomplete, and finished tasks associated with a project.
Figure 14B:
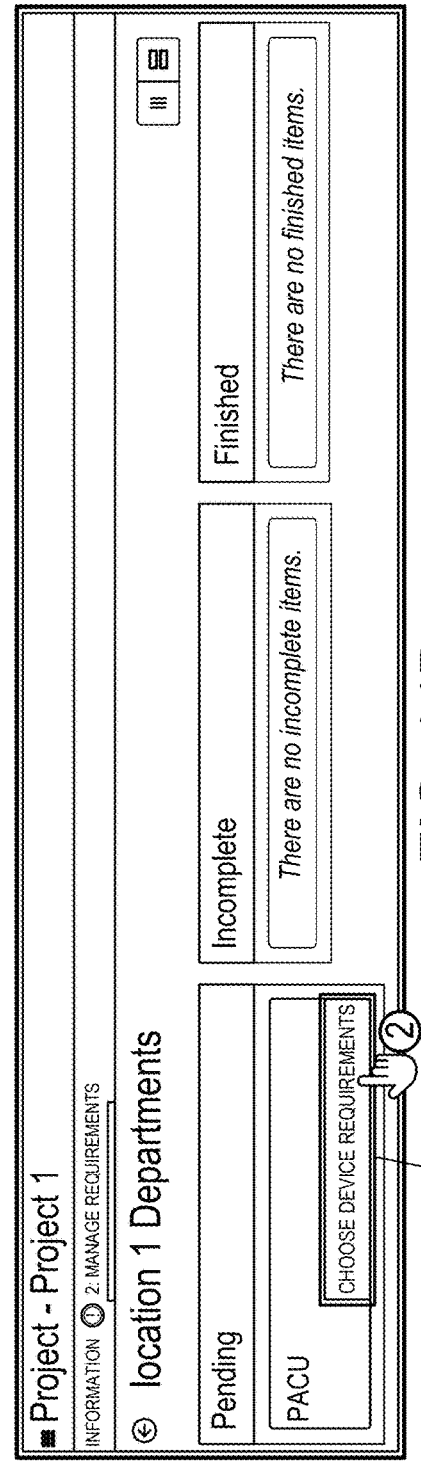

FIGS. 14A-14B illustrate example interfaces 1400A-1400B that enable a requestor to view pending, incomplete, and/or finished tasks associated with a project. In the particular example, interfaces 1400A-1400B may be presented to a user that was assigned to choose device requirements for the Post-Anesthesia Care Unit (PACU) department associated with Location 1. For example, interfaces 1400A-1400B present a user with only an information tab and a manage requirements tab 1402 based at least in part on the level of access granted to the user. The information tab may provide a user with relevant information regarding the project.

FIG. 14A illustrates an example interface 1400A to enable a user associated with the acquisition service 104B to view a project's progress by location. For example, interface 1400A may present a user with one or more locations that are organized into different groups 1408 based on a level of progress or level of completion. For example, locations may be organized based on whether or not they are associated with pending, incomplete, or finished tasks. A task may require selecting one or more device requirements, verifying requirements entered by another user, answering another user's questions regarding an item requirement, or the like. A user may select element 1412 to organize the pending, incomplete, and finished groups 1408 into either columns or rows. For example, a location shown beneath a pending column may have tasks that have not been started. A location shown beneath the incomplete column may have one or more tasks that have been started, but not completed (e.g., satisfying a first threshold of completion, but not a second threshold of completion). A location shown beneath the finished column may have tasks that have all been completed or tasks that no longer require any user input.

In some examples, the manage requirements tab 1402 is associated with an indicator 1404 that indicates whether a user has competed a threshold number of requirements associated with the manage requirements tab. For example, the indicator 1404 may be red when there are one or more locations under the pending column. In some examples, each location may be associated with an element 1410 that enables a user to view one or more departments associated with the location (e.g., Location 1). In some examples, each location may be associated with an image, an address, a phone number, a link to a website, or the like.

FIG. 1400B illustrates an example interface 1400B to enable a user to view pending, incomplete, and finished tasks associated with a department. The acquisition service 104B may limit what information is presented to a user based at least in part on a user's level of access or based on one or more tasks assigned to a user. In the particular example, the acquisition service 104B presents a user with access to only one department (i.e., the PACU department) at a particular location (i.e., Location 1). Interface 1400B may present a user with one or more departments that are organized by a level of progress or completion. For example, departments may be organized based on whether or not they are associated with pending, incomplete, or finished tasks. A task may include selecting one or more device requirements, verifying requirements entered by another user, answering another user's questions regarding an item requirement, and the like. In this particular example, the PACU department is associated with a pending task (e.g., choose device requirements). A user may select element 1414 to access, view, and/or add device requirements.

Figure 15A:
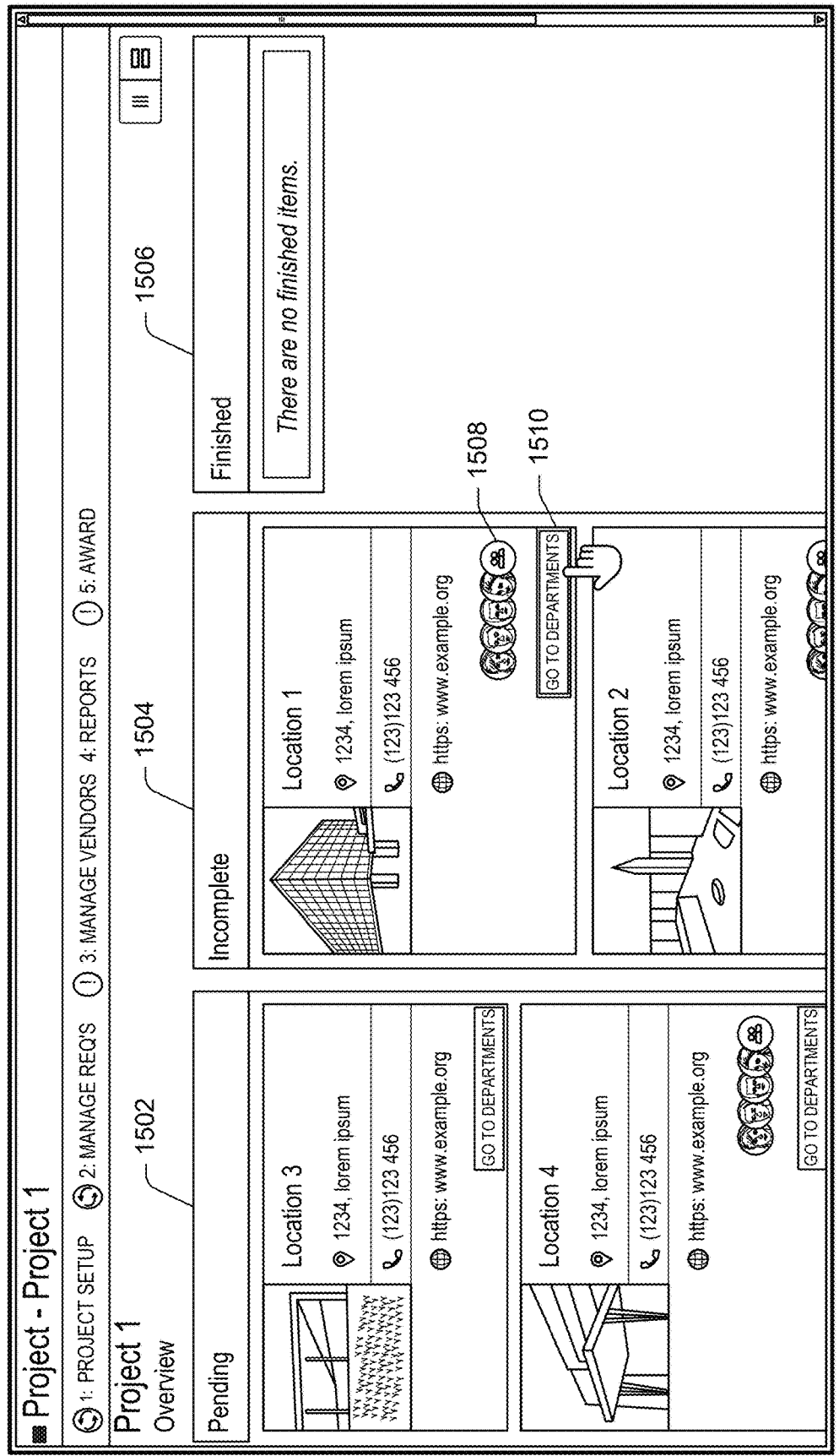
FIG. 15A-15B illustrate example interfaces that display locations and departments that have pending, incomplete, and finished tasks associated with the acquisition service.
Figure 15B:
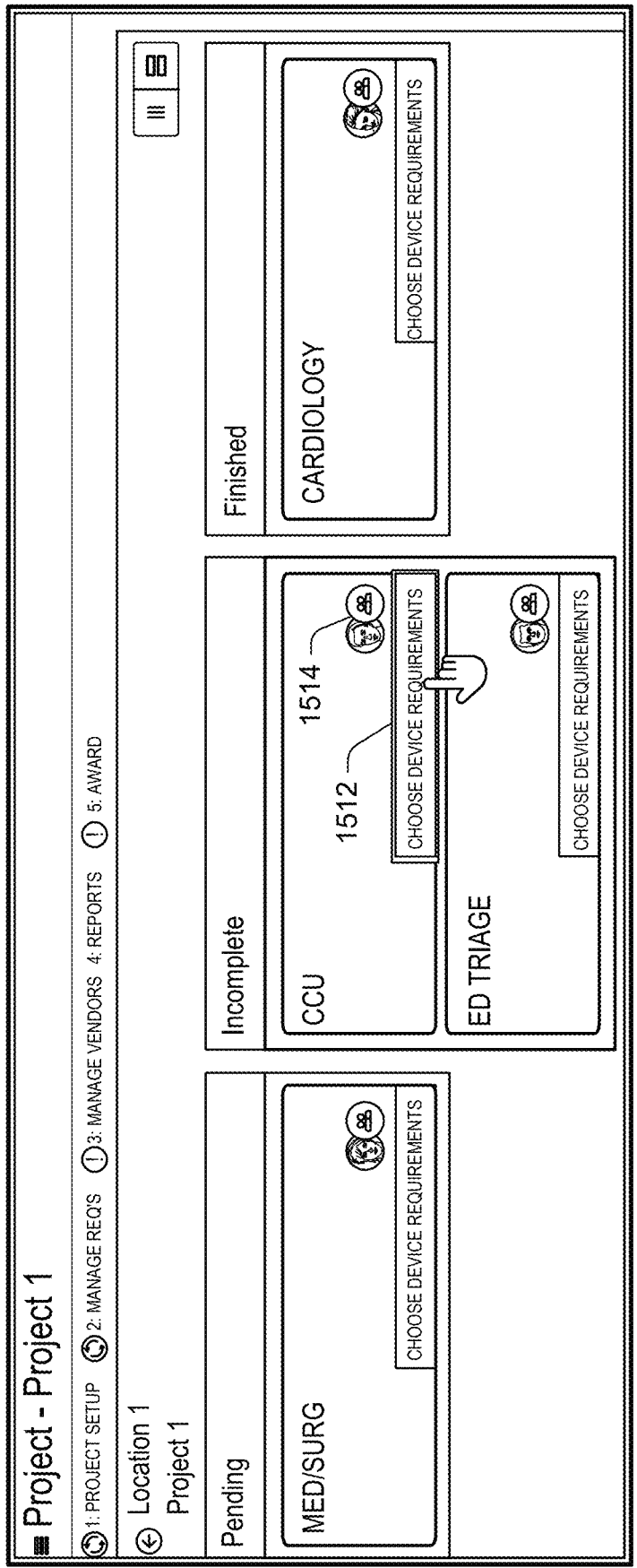

FIGS. 15A-15B illustrate example interfaces 1500A-1500B that display locations and departments that have pending, incomplete, and finished tasks associated with the acquisition service 104B. In some examples, each of the locations is associated with an image, an address, a phone number, a website, images and/or thumbnails of one or more users 1508 assigned to the location.

FIG. 15A illustrates an example interface 1500A to enable a user to view one or more locations organized based at least in part on a level of progress, level of completion, or number of completed tasks. In some examples, the locations are organized into three groups based at least in part on a level of progress. For example, the locations may be organized into three groups that have pending tasks 1502, incomplete tasks 1504, or finished tasks 1506. In some examples, the acquisition service 104B determines a level of progress associated with each location and organizes the locations based on the level of progress meeting certain thresholds. In this particular example, location 3 and location 4 are associated with the pending tasks 1502 column or group based at least in part location 3 and location 4 not meeting a first threshold level of progress or completion. In this particular example, location 1 and location 2 are associated with the incomplete tasks 1504 column or group based at least in part on location 1 and location 2 not meeting a second threshold level of progress or completion (e.g., some tasks have been reviewed or started, but are not complete yet). In this particular example, there are not locations associated with the finished tasks 1506 or column.

As illustrated in FIG. 15A, the interface 1500A may enable a user to select visual element 1510 to manage one or more departments associated with a location. In response to a user selecting visual element 1510, the acquisition service 104B may present interface 1500B.

FIG. 15B illustrates an example interface 1500B to enable a user to view pending, incomplete, or finished tasks for one or more departments associated with a location. The one or more departments may be organized based at least in part on a level of progress or a number of completed tasks. For example, the departments may be organized into three groups that have pending, incomplete, or finished tasks. In some examples, the departments may be organized in another manner, such as by task start dates, due dates, a number of people assigned to a department, or the like. In some examples, each of the departments is associated with one or more icons or thumbnails of users 1514 assigned to that particular department. In some examples, a user may select the icon or thumbnail to view information about the assigned user(s) and/or to quickly send a message to a user assigned to the department. A user may select element 1512 to access device requirements for a particular department.

Figure 16:
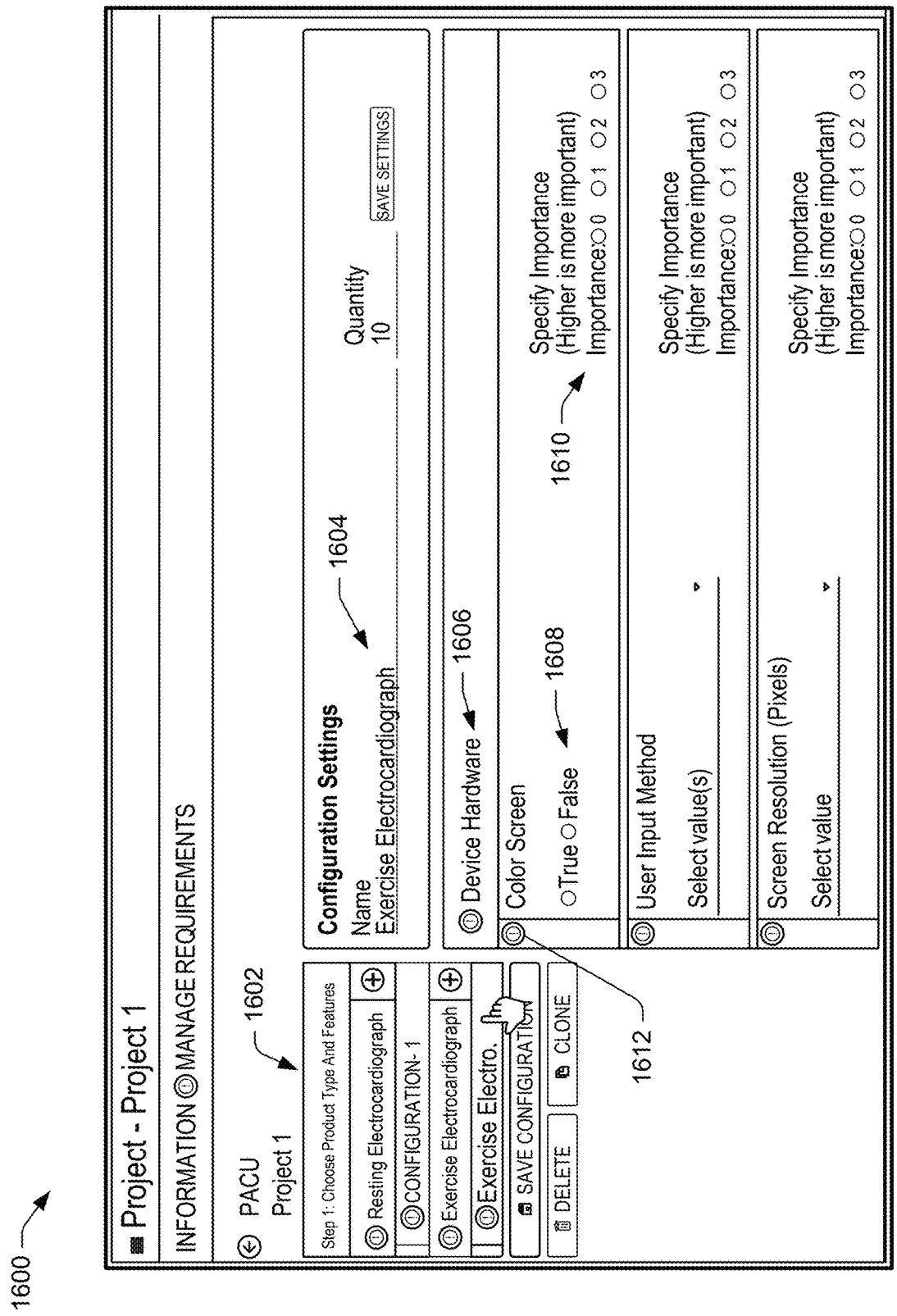
FIG. 16 illustrates an example interface that may be presented to enable a requestor to define requirements.

FIG. 16 illustrates an example interface 1600 that may be presented to enable a requestor to define requirements. A user associated with the acquisition service 104B may be enabled, at operation 1602, to enter information that indicates what product type and product features the user may want to purchase for a project. The acquisition service 104B may provide a user with a plurality of requirement options associated with the selected product/service type. A product/service type may be a group of products or services that serve a common purpose. For example, computer storage media may be considered a product type that includes phase change memory, static random-access memory, dynamic random-access memory, read-only memory, electrically erasable programmable read-only memory, flash memory or other memory technology, compact disk read-only memory, and the like. In some examples, the plurality of requirement options provided to a user is based at least in part on vendor information obtained from one or more vendors (e.g., by researching vendor product offerings, by scraping or crawling vendor websites or product catalogs using an automated web crawler, by receiving responses from vendors to one or more requirement specification questionnaires, by vendors inputting product/service information directly into the acquisition service 104B or another service, combinations of these techniques, or the like).

In some examples, a user associated with the acquisition service 104B may, at operation 1604, enter a specific name for the selected product/service type and enter a quantity of items the user wants to purchase for a project. In some examples, the acquisition service 104B may organize the requirements into categories or groups based on type. For example, the interface 1600 may present device hardware requirements under a device hardware category 1606. The device hardware category may include requirements such as monitor options, color screen, user input method, a screen resolution, power supply, or the like. The acquisition service 104B may allow a user to indicate which item features or requirements the user wants to purchase 1608. The acquisition service 104B may also allow the user to indicate a degree of importance 1610 for one or more of the requirements relative to other requirements. This degree of importance 1610 (or relative importance) may be indicated using a scale (e.g., 1-10, high/medium/low, etc.) that is next to the requirement on the interface 1600.

In some examples, each of the requirements may be associated with an indicator, such as indicator 1612. The indicator 1612 may be associated with a specific color, icon, image, or the like. In some examples, the indicator 1612 may indicate that a user has or has not selected an option associated with a requirement. For example, the indicator 1612 may change (e.g., go from red to green) when a user selects one or more options associated with a requirement.

In some examples, the acquisition service 104B presents a user with device requirements based at least in part on data received from requirement gathering questionnaires for product/services types. The acquisition service 104B may store and manage product category data in a product database, such as any of the data base types described throughout this application.

Figure 17:
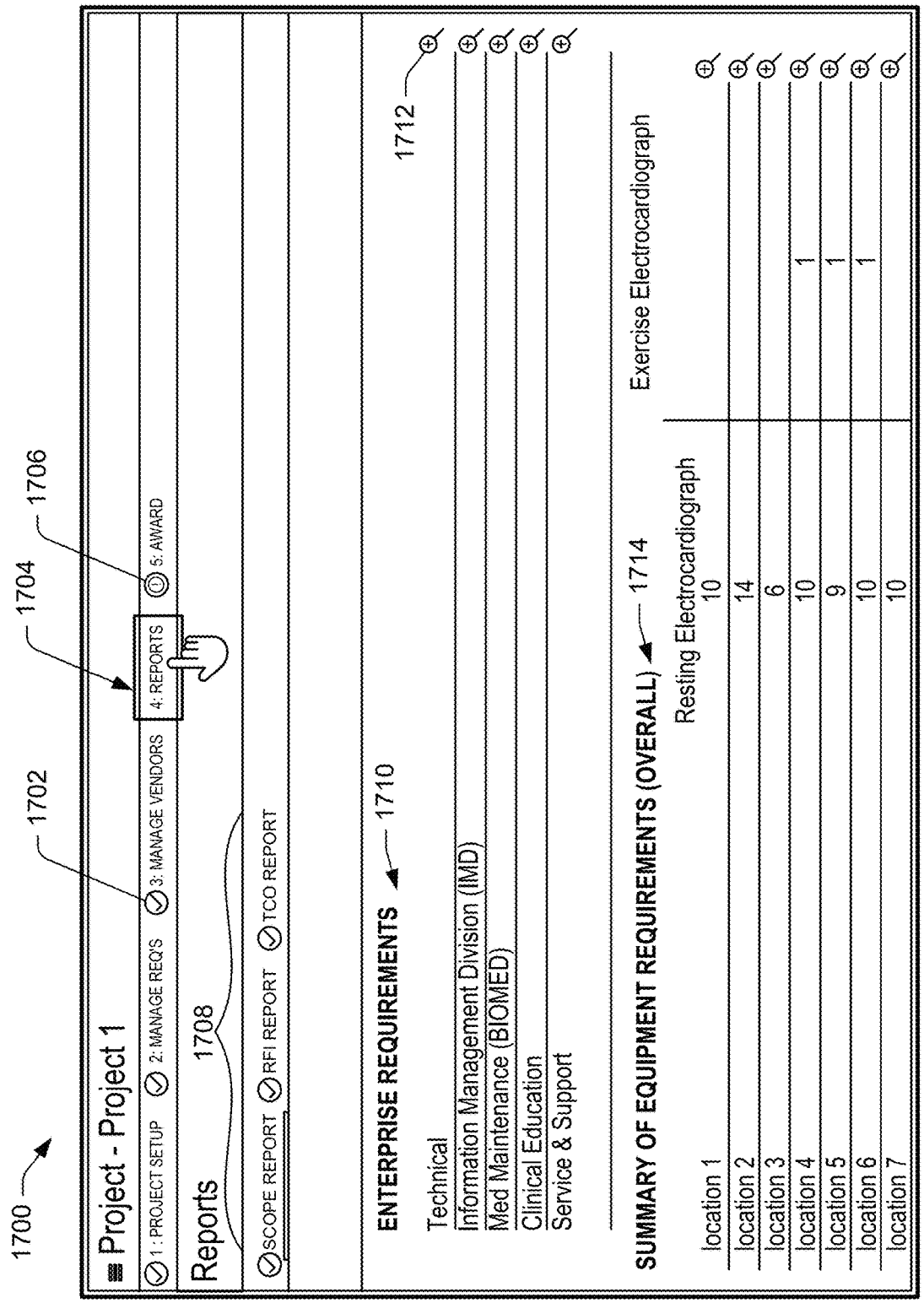
FIG. 17 illustrates an example interface displaying reports associated with a project.

FIG. 17 illustrates an example interface 1700 displaying reports associated with a project. A user may select (e.g., click on) any one of a plurality of report tabs 1708 to view information related to a project. For example, the plurality of report tabs 1708 may include a project scope report tab, a request for information (RFI) report tab, a total cost of ownership (TCO) report tab, a location/department cost breakdown report tab, and the like.

In some examples, a user may access the report tab 1704 after the user or other users have completed a threshold level of requirements associated with the prior tab (e.g., a manage vendors tab in the particular example). In some examples, one or more of the tabs is associated with an indicator (e.g., 1706) indicating whether or not a threshold level of requirements associated with that tab has been completed. In some examples, the prior tab may be associated with an indicator (e.g., 1702) indicating a threshold level of requirements has been completed. In some examples, the acquisition service 104B may prevent access to a subsequent tab (e.g., an award tab) until a minimum or threshold level of requirements associated with the reports tab 1704 has been completed. For example, a user may not access a subsequent tab until a user has acknowledged (via a user input) that the user has reviewed at least one report found in the reports tab 1704.

In some examples, the project scope report tab may present a user with a summary of enterprise requirements 1710 and a summary of device/service requirements 1714 associated with a project. The summary of enterprise requirements 1710 may include requirements that are applicable to multiple locations. For example, and not by way of limitation, enterprise requirements may include technical requirements associated with a project, information management requirements, maintenance requirements, education requirements, service and support requirements and the like. In some examples, each of the listed enterprise requirements is associated with an icon (e.g., 1712 associated with the technical enterprise requirement) that, when selected, provides a user with additional information regarding that particular enterprise requirement.

FIG. 18 illustrates an example interface 1800 displaying a summary of selected enterprise requirements associated with a report. For example, a user may select icon 1802 to view additional information regarding technical enterprise requirements. Technical enterprise requirements may include system component requirements, operating system requirements, technology components, and the like for a category or type of product. Each of the technical enterprise requirements may be associated with an icon (e.g., 1804) that, when selected, enables a user to view additional information. In some examples, the additional information may include an importance value a user has assigned to the particular enterprise requirement, whether a particular enterprise requirement was rejected or not available, or whether an enterprise requirement was excluded from evaluation.

For example, a user may select icon 1804 associated with system components for a device to view various system component types (e.g., interface options, wireless options, device hardware), importance values assigned to requirements or features related to each system component type (e.g., Encryption: WEP, WPA, WPA2 (Personal and Enterprise) was assigned an importance value of 2), and whether or not certain enterprise requirements were requested, not available, were rejected, or excluded from evaluation (e.g., a size requirement was excluded from consideration based at least in part on a user assigning the size requirement an importance value of 0).

Figure 19A:
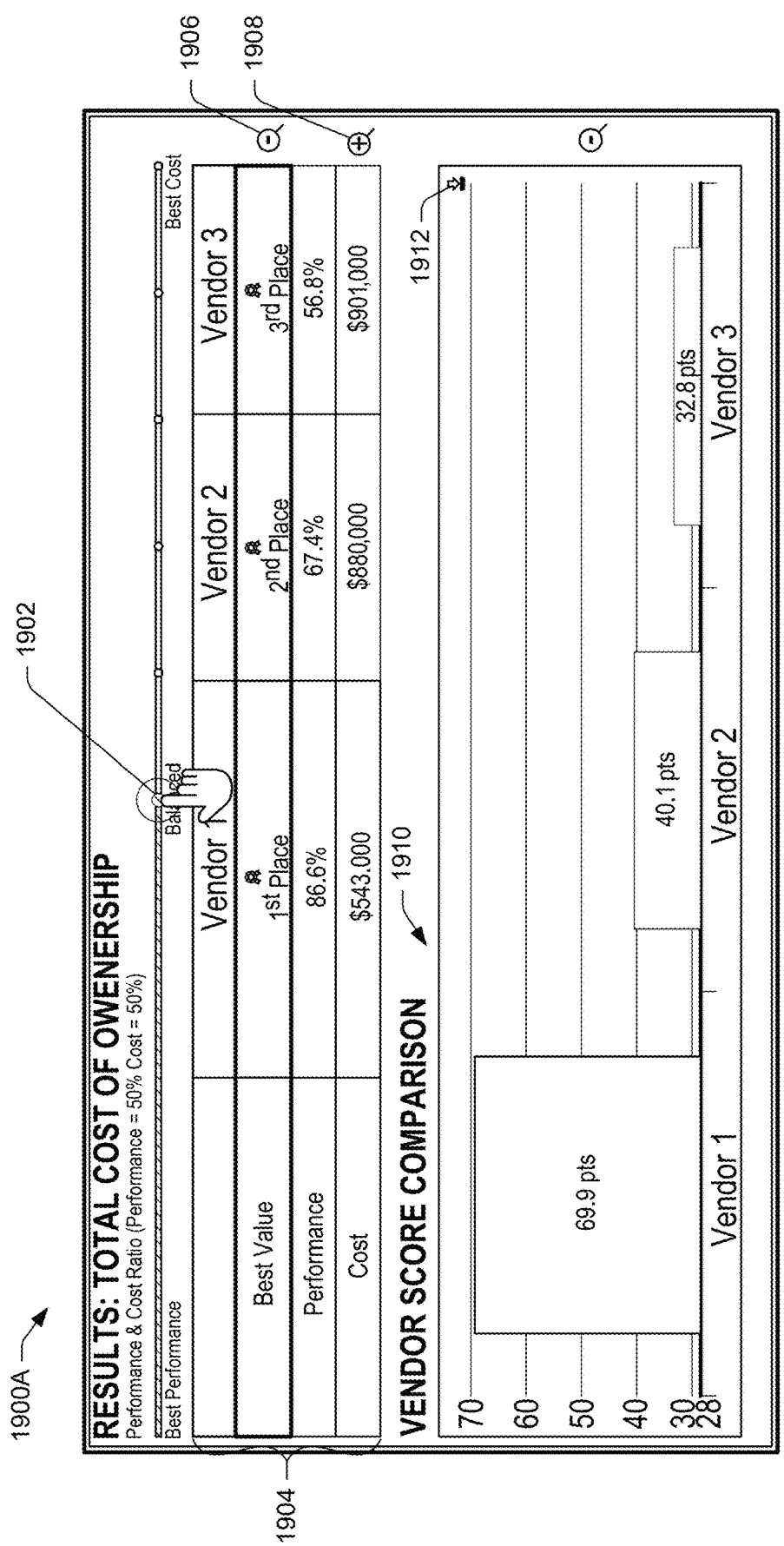
FIG. 19A-19B illustrate example interfaces that enable a requestor to view a ranking of entities' abilities to fulfil an acquisition request.
Figure 19B:
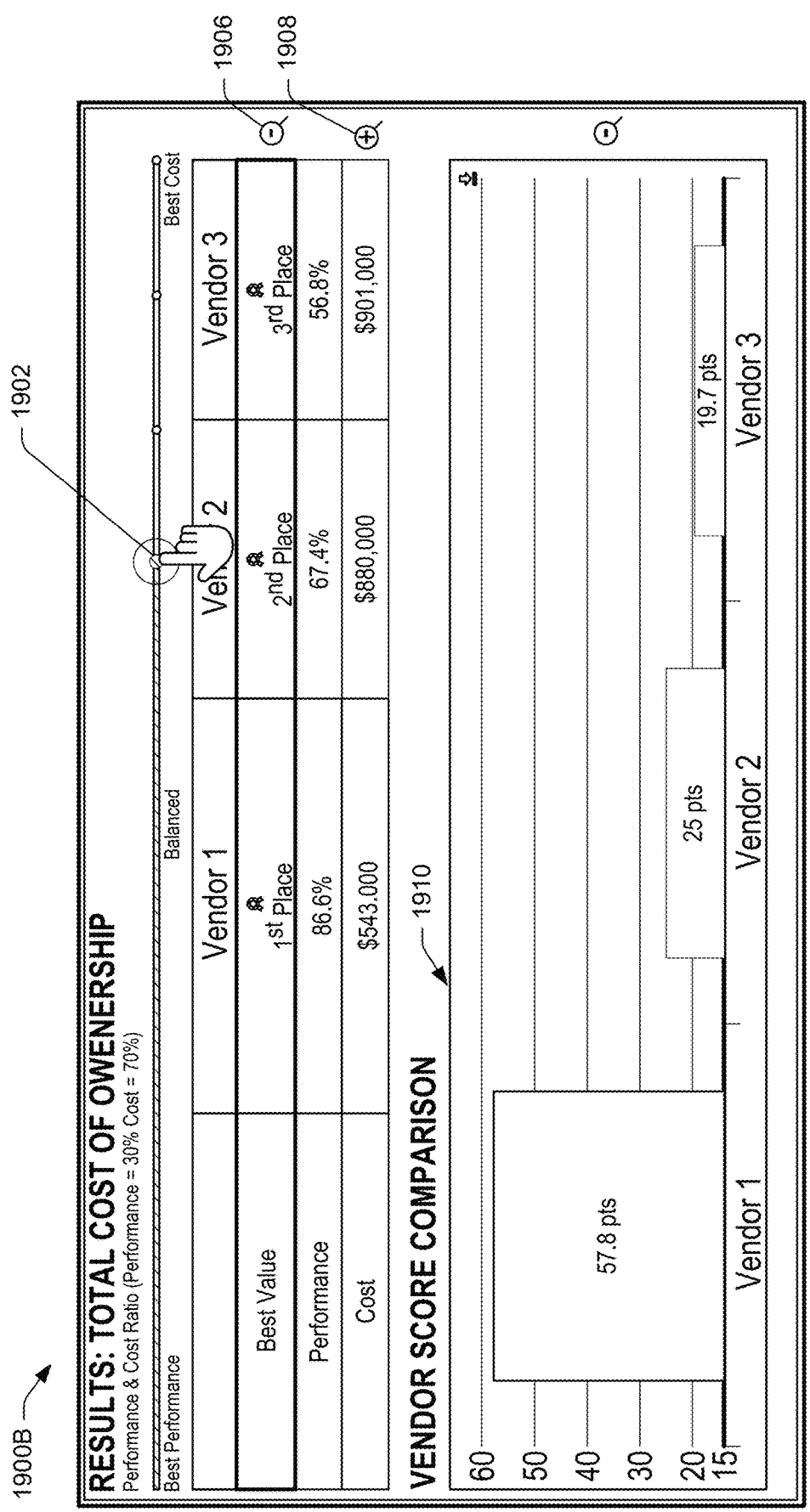

FIG. 19A-19B illustrate example interfaces 1990A-1900B that enable a requestor to view a ranking of the vendors' abilities to fulfil an acquisition request. In some examples, the ranking of vendors may be provided via a table 1904. The vendors in the table 1904 may or may not be listed in order based on the ranking. In some examples, the 1st place vendor may be considered to provide a requestor with the best value. In some examples, the best value associated with a vendor may depend at least in part on a performance of the vendor (i.e., how many of the requestor's requirements the vendor is able to fulfill), the total cost of the acquisition (or project), the recurring costs associated with the acquisition, the episodic costs associated with the acquisition, the amount of time it will take the vendor to complete the project, and/or combinations of any of these or other factors. In some examples, the table 1904 may include a best value row, a best performance row, and a best cost row. In some examples, the table 1904 may also include additional rows directed to additional information such as the percentage of enterprise requirements a vendor is able to fulfill.

In some examples, the data associated with the vendors' performance and cost may also be associated with a slider control 1902. The slider control 1902 is slidable along a length of a bar and includes multiple different positions. In some examples, the slider control 1902 may contain at least 3 different positions (e.g., a best performance position, a best cost position, and a balanced position between the two). In some examples, the slider control 1902 may contain anywhere from 3 to 100 positions along the slider control 1902. In some examples, the slider control 1902 may be continuously positionable at any position between the extents of the bar. In some examples, each of the positions along the slider control 1902 is associated with a ratio or a percentage. Each position along the slider control 1902 may be associated with a different ranking formula and/or a different weighting of criteria (e.g., cost, performance, timeliness, etc.). A user may provide input that adjusts a position of the slider control 1902. The acquisition service 104B may dynamically compute a new vendor score for each vendor from the existing vendor data based on the ranking formula and/or weighting associated with the current position of the slider control 1902, and update the ranking of the vendors accordingly. The vendor ranking may be based at least in part on this vendor score. In some examples, the vendor score may be based at least in part on an ability of each vendor to fulfill the set of requirements, a vendor's top scoring product(s) (i.e., best performing product) associated with each requirement, a vendor's least costly product(s) associated with each requirement, a vendor's ability to meet any absolute or enterprise requirements, or the like.

In some examples, the acquisition service 104B may rank vendors based at least in part on how many specified requirements (e.g., products, services, features, etc.) a vendor can satisfy or fulfill. For example, the acquisition service 104B may compare a requested product or product features against the same or similar product types to determine a product score. In some examples, the number of operations the acquisition service 104B performs may be the number of products multiplied by a number of requested requirements.

number of operations=products×requirements

Each of the evaluated products may be scored based on how well the product satisfies all of a requestor's requirements. In some examples, the acquisition service 104B may rank a product based at least in part on the product's score. In some examples, a vendor's score for each product is equal to the value of the vendor's top scoring product for the particular requirement. The vendors may be ranked based on their respective top scoring product(s).

In some examples, if a vendor offers multiple products that would meet a requestor's requirement, the system may be configured to select or recommend a lowest cost product that meets or exceeds the product requirement (e.g., to avoid recommending overqualified products). In some examples, if a vendor only offers products that are overqualified for a requestor's requirement, the system may prompt the requestor to adjust the requirement or may include a note in a final recommendation indicating to the requestor that the particular item is overqualified (i.e., exceeds the requestor's requirement in some way).

In some examples, the requestor may specify a requirement (e.g., feature) that is an absolute requirement that must be met in order for a vendor to be qualified to fulfill the project. By way of example and not limitation, absolute requirements may be based on minimum performance criteria for the products, compatibility (e.g., compatibility with wireless networking standards, etc.), legal or regulatory requirements imposed on the requestor (e.g., privacy requirements, environmental requirements, etc.), or other requirements that must be met in order for a vendor to be qualified to fulfill the project.

In some examples, the requestor may specify that they do not want a particular feature and/or product. For instance, the requestor may have had a bad experience with a particular product or feature in the past and may want to avoid the product or feature in the future. In that case, the system may be configured to ignore, disqualify, and/or down weight products that include the specified product or feature.

In some examples, the requestor may specify prerequisite conditions or express that a feature is dependent upon the existence of another feature. For instance, the requestor may specify that a requirement can be met in multiple different ways, such as using a touch screen or using a touchless interface, but that if a touch screen is used it must be capable of operation using gloves. In that case, the type of interface (e.g., touch screen or touchless) may be a first or primary requirement, and the system may allow the requestor to specify one or more second or dependent requirements (e.g., must be operable using gloves) associated with any or all of the first/primary requirements.

In one particular example, and not by way of limitation, the acquisition service 104B may consider the following data below and perform the following computations associated with a project:

The intersection of the vendor and the product type is the number of products the vendor has for that product type.

| | Product Type A | Product Type B | Product Type C | Product Type D |
|---|---|---|---|---|
| Vendor 1 | 5 | 3 | 7 | 2 |
| Vendor 2 | 7 | 6 | 5 | 1 |
| Vendor 3 | 3 | 4 | 3 | 0 |
| Total | 12 | 9 | 12 | 3 |

| Product Type | Number of Requirement Specifications | Number of Features |
|---|---|---|
| A | 8 | 40 |
| B | 7 | 52 |
| C | 9 | 30 |
| D | 2 | 74 |

$C(v,p,f,r) = (p \cdot (f \cdot 2) \cdot r) + v$ v=number of Vendors
p=number of Products in the Product Type
f=number of Features in the Product Type
r=number of Requirements Specifications for the Product Type Note: f is multiplied by 2 because we evaluate both the feature, and its importance value.

| Product Type A | $C(3, 12, 40, 8) = 7,683$ |
|---|---|
| Product Type B | $C(3, 9, 52, 7) = 6,555$ |
| Product Type C | $C(3, 12, 30, 9) = 6,483$ |
| Product Type D | $C(3, 3, 74, 2) = 891$ |
| Total Computations | 21,612 |

In some examples, the slider control 1902 is associated with a best performance on one end of the slider control 1902 and a best cost at the opposite end of the slider control 1902. In some examples, the slider control 1902 may take into account other factors such as the time it would take a vendor to fulfill the acquisition, a vendor's prior ratings or reviews, or the like. In the particular example, each of the different positions along the slider control 1902 is associated with a different weighting of a performance level relative to a total cost. For example, a requestor may value a lower cost over a vendor's performance score and may select a position on the slider control 1902 that is closer to the "best cost" end of the slider control 1902.

In some examples, the interfaces 1900A-1900B may be associated with interactive features that enable a user to manipulate, through any suitable input method, what data is made available and presentable through the user interface as well as how the data is visualized. For example, the cost row of the table may be associated with an icon 1908 that, when selected, displays more information about the cost of the project is broken down for each vendor. In some examples, the best value row of the table may be associated with an icon 1906 that, when selected, displays a graph 1910 that provides a user with additional data associated with the vendor ranking. In some examples, the graph may be a bar graph, a table, a line graph, a pie chart, a histogram, a dot graph, or the like. In the particular example, selecting icon 1906 presents a user with a bar graph 1910. In some examples, the bar graph 1910 may present names of the ranked vendors along the x-axis and a score associated with each vendor along the y-axis. In some examples, a score may be displayed on top of each bar associated with a vendor. In some examples, a user may download a copy of a report including the bar graph for future reference by selecting icon 1912. The bar graph 1910 may be dynamically updated when a user changes a position along the slider control 1902. For example, when a user changes the position of the slider control 1902, the acquisition service 104B may update each of the vendor scores based at least in part on the formula and/or weighting associated with the particular position along the slider control 1902.

Figure 20A:
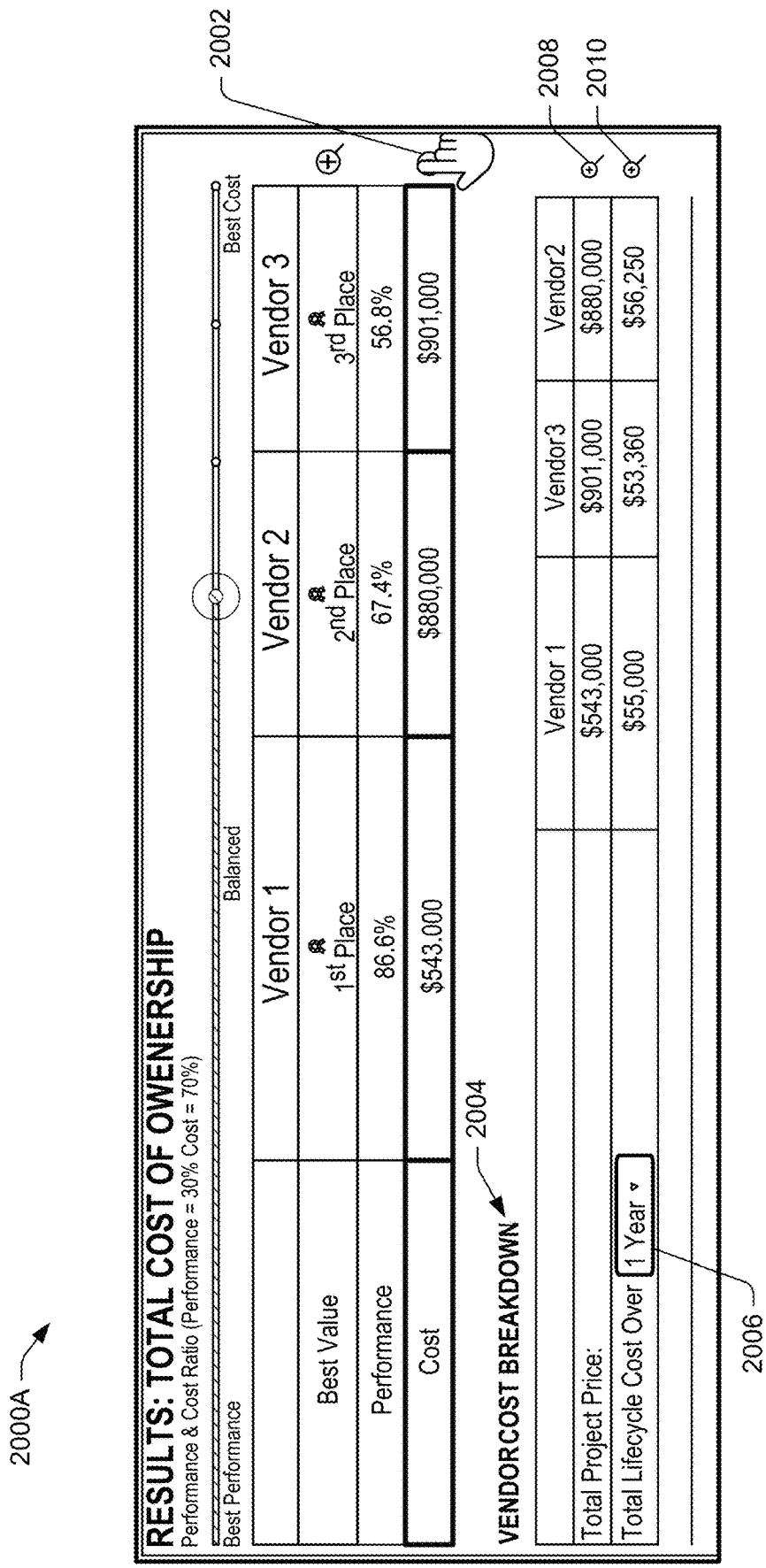

FIG. 20A-20C illustrate example interfaces 2000A-2000C displaying a cost breakdown for a plurality of vendors. In some examples, a user may select icon 1908 discussed in relation to FIG. 19A to view the cost breakdown table 2004. In the particular example, a user may select icon 2002 to view the cost breakdown table 2004. In some examples, the cost breakdown table 2004 may include a total cost for completing the project ("total project price") and a lifecycle cost over a period of time. In some examples, the cost breakdown table may include additional information, such as the cost of enterprise requirements. Enterprise requirements may be requirements that apply to more than one location or all locations (e.g., costs associated with servers, networking, security, licensing, or the like) for each of the ranked vendors.

In some examples, individual columns or rows of the vendor cost breakdown table 2004 may be associated with one or more icons or visual elements that, when selected, present additional data to a user. The same icon or visual element may be re-selected to minimize the amount of data presented. For example, the total project price icon 2008, when selected, may present additional information regarding the total cost of completing the project and the total lifecycle cost icon 2010, when selected, may present additional information regarding recurring costs and/or episodic costs.

FIG. 20B illustrates an example interface 2000B displaying additional information regarding a cost breakdown of the total project price. In some examples, a user may select the total project price icon 2008 to view additional information regarding the total project price. In some examples, the total project price may be based on a bid price provided by the vendor to fulfill requirements and so forth by the requestor (e.g., the bid at which items are being offered for acquisition). In some examples, the additional information may include the cost of the enterprise requirements 2012 and the cost of acquiring items at each location (e.g., location 1, location 2, location 3, etc.). The interface 2000B may present one or more icons that enables a user to adjust the scope of content, information, and/or data the user would like the interface to display.

For example, the enterprise requirements 2012 may be associated with an icon 2014, that when selected, enables a user to view additional information associated with the enterprise requirement costs. Enterprise requirements may be requirements that apply to more than one location or all locations (e.g., costs associated with servers, networking, security, licensing, or the like) for each of the ranked vendors. For example, the user interface 2000B may present the user with a cost breakdown of the technical costs (e.g., costs associated with networking, servers, security, licensing, interfacing, or the like), information management, maintenance, clinical education, service and support, or the like.

In some examples, each of the locations is associated with its own location icon (e.g., 2016) that, when selected, enables a user to view the particular costs of a project or acquisition associated with a particular location. For example, selecting icon 2016 may present a user with information regarding the cost of acquiring products or services at location 3.

FIG. 20C illustrates an example interface 2000C displaying additional information regarding a total lifecycle cost over a period of time. In some examples, a user may select the total lifecycle cost icon 2006 to view additional information regarding total lifecycle costs. In some examples, a user may change the time period associated with lifecycle costs (e.g., 1 year, 5 years, 10 years, etc.) In some examples, the life cycle costs may include recurring costs 2018 and/or episodic costs 2020 for each of the ranked vendors. Recurring costs may include costs that occur annually. For example, recurring costs can include costs associated with software support, education, warranty, or the like. Episodic costs may include costs that occur over a longer period (e.g., every 2 or 3 years) or are not scheduled to occur on a regular basis. For example, episodic costs may include costs associated with software updates, network evaluation services, phone calls to technical support, or the like.

Figure 21:
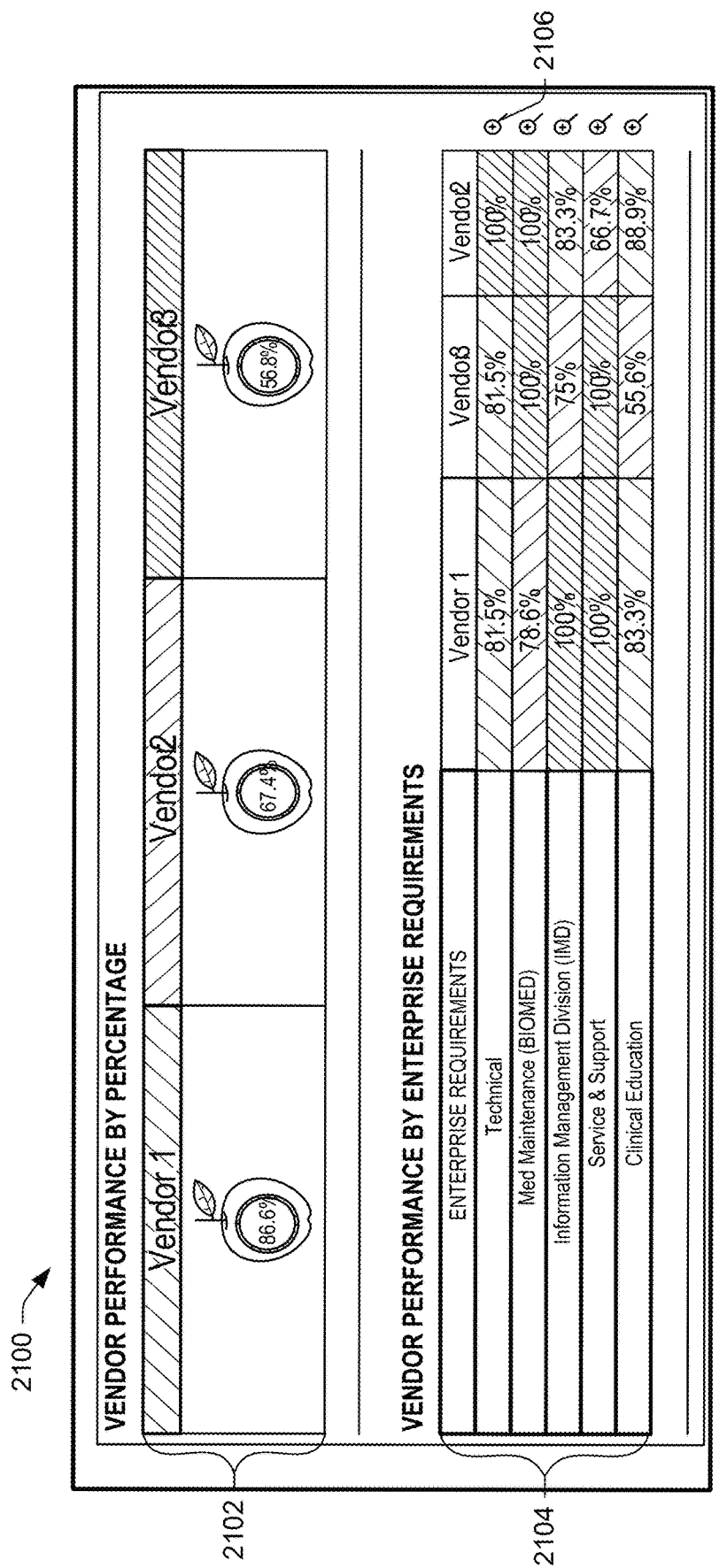
FIG. 21 illustrates an example interface displaying entity performance by percentage and entity performance by enterprise requirements.

FIG. 21 illustrates an example interface 2100 displaying vendor performance by percentage and vendor performance by enterprise requirements. In some examples, vendor performance may be based on a vendor's ability to fulfill requirements indicated by the requestor. For example, the data processing module 126B may rank the vendors based on their ability to fulfill requirements, a bid price provided by the vendors, and/or a degree of importance of individual features or products (e.g., as indicated by the requestor). For example, if Vendor 1 can fulfill more requirements than Vendor 2, but Vendor 1 cannot fulfill any requirements with a high degree of importance, and Vendor 2 can fulfill requirements with a high degree of importance, Vendor 2 may be ranked higher than Vendor 1 and have a higher performance. Vendor performance may be presented as a percentage of fulfillment of requirements (e.g., Vendor 1—86.6%, Vendor 2—67.4%, Vendor 3—56.8%, etc.).

A product may have any number of individual features associated with it. For example, a purchaser/requestor interested in purchasing a number of computers may be interested in features such as screen size, resolution, display features, hard drive, memory, graphics card, RAM, camera, and the like. A purchaser/requestor may assign an importance value to individual features of the product. In some examples, an importance value may range from 0-3, where 0 signifies that the individual feature has a very low degree of importance (or not important to the purchaser/requestor at all) and 3 signifies the individual feature has a high degree of importance. In some examples, the importance value may be any range of values (e.g., 1-100).

In some examples, interface 2100 may include a vendor performance table 2102 that presents a vendor's performance by percentage. In some examples, the vendor performance table 2102 may include a first column including vendors that are qualified based at least in part on the percentage meeting or exceeding a first threshold percentage, a second column including vendors that are partially qualified based at least in part on the percentage being less than the first threshold and meeting or seceding a second threshold, and a third column including vendors that are disqualified based at least in part on the percentage being less than the second threshold. In some examples, the interface 2100 may include a table 2104 that provides a vendor's ability to fulfill specified enterprise requirements. Enterprise requirements may be requirements that apply to more than one location or all locations of a business, practice, firm, enterprise, company, etc. (e.g., costs associated with servers, networking, security, licensing, or the like). Enterprise requirements may include server requirements, networking requirements, licensing requirements, other technical features, information management features, service and support features, or the like. In some examples, each of the listed enterprise requirements in the enterprise table 2104 may be associated with an icon (e.g., 2106) that, when selected, enables a user to view additional information about that particular enterprise requirement. For example, a user may select icon 2106 to view additional information regarding technical enterprise requirements (e.g., interfacing requirements, wireless requirements, and the like).

Figure 22:
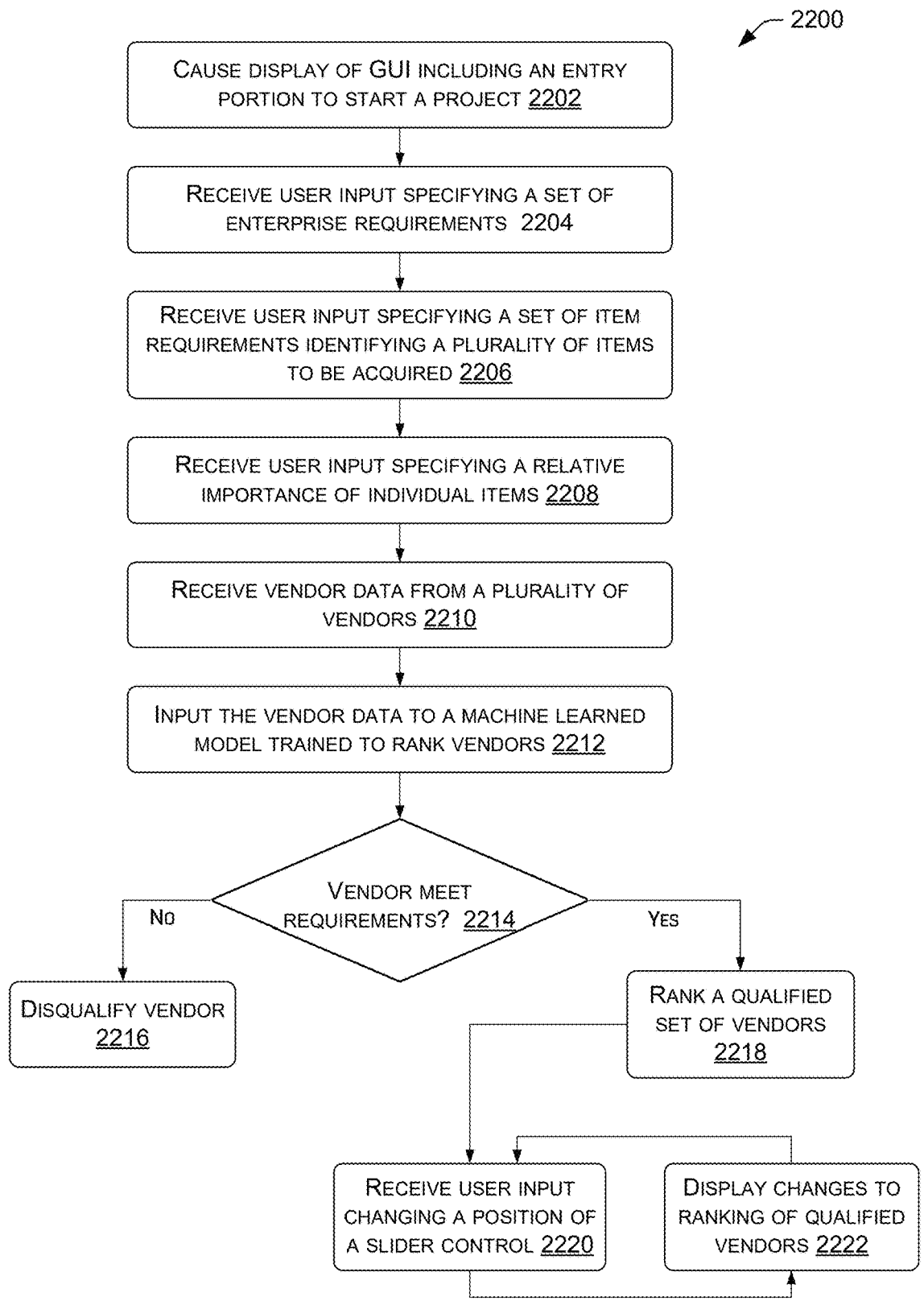
FIG. 22 illustrates an example process to enable a requestor to select an entity for fulfilling requirements of the requestor.

FIG. 22 illustrates an example process 2200 to enable a requestor to select a vendor for fulfilling requirements of the requestor. For ease of discussion, the process 2200 is described as being performed in the architecture 100B of FIG. 1B. For example, one or more of the individual operations of the process 2200 may be performed by the device 102B, the computing device associated with the vendor 106B, and/or acquisition service 104B. However, the process 2200 may be performed in other architectures. Moreover, the architecture 100B may be used to perform other processes.

The process 2200 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the individual operations may be omitted.

At 2202, the acquisition service 104B may cause a graphical user interface (GUI) to be displayed at a computing device, the GUI including an entry portion to start a project for acquiring items. In some examples, the GUI may present interface 900 as discussed in relation to FIG. 9.

At 2204, the acquisition service 104B may receive user input specifying a set of enterprise requirements associated with a project. Enterprise requirements are requirements that apply to more than one location or all locations. For example, a requestor may want features or requirements that are universal across multiple locations in order to facilitate uniformity. For example, enterprise requirements may relate to IT infrastructure, security, software compatibility, or the like.

At 2206, the acquisition service 104B may receive user input specifying a set of item requirements, the set of item requirements identifying a plurality of items to be acquired.

At 2208, the acquisition service 104B may receive user input specifying a relative importance of individual items of the plurality of items. The relative importance may be indicated using a selectable scale (e.g., 1-10, high/medium/low, etc.) that is next to a selectable requirement on the interface, using a text input field, and so on. The requestor module 122B may also save and maintain unfinished requests or inactive requests that the requestor 108B can access at a later point in time. These saved requests may be stored in a requestor data store 130B.

At 2210, the acquisition service 104B may receive vendor data for a plurality of vendors, the vendor data including information about a requested item for purchase. In some examples, the vendor data includes information indicating which of the enterprise requirements and which item requirements of the set of item requirements the respective vendors are able to fulfill. In some examples, the vendors may view the requirements as shown in table 304 on the interface 302. Individual vendors may indicate if they are able to fulfill the requirement in full, partially full, or not at all. Additionally, the vendor may be presented an opportunity to provide an explanatory note for each requirement. These notes may provide details regarding fulfillment of a requirement, such as a reason why requirements cannot be fulfilled, details regarding an item that can be provided by a vendor to fulfill a requirement, and so on.

At 2212, the acquisition service 104B may input the vendor data into a machine learned model trained to rank vendors based on the extent of their ability to meet individual requirements of the requirements specification. In some examples, the machine learned model may be trained to score a vendor's ability to meet individual requirements of the requirements specification.

At 2214, the acquisition service 104B may determine whether individual vendors meet a threshold level of requirements.

At 2216, the acquisition service 104B may disqualify vendors based at least in part on the vendors not meeting a threshold level of requirements, not satisfying one or more enterprise requirements, not meeting a minimum vendor score, and so forth. The vendors that are not disqualified at process 2216 may be considered qualified vendors.

At 2218, the acquisition service 104B may rank the qualified set of vendors. In some examples, the qualified set of vendors are ranked based at least in part on a number of item requirements that individual vendors of the qualified set of vendors can meet, relative importance of individual items of the plurality of items, a performance level, and/or a cost of acquiring the items. In some examples, the acquisition service 104B may cause a GUI to present a table including the ranking of the plurality of vendors and a slider control. The slider control may be slidable along a length of a bar and include multiple different positions. In some examples, each position of the multiple different positions may be associated with a different weighting of a performance level relative to a total cost of acquiring the plurality of items.

At 2220, the acquisition service 104B receives user input changing a position of the slider control. In some examples, the slider control may contain at least 3 different positions (e.g., a best performance position, a best cost position, and a balanced position between the two). In some examples, the slider control may contain anywhere from 3 to 100 positions along the slider control. In some examples, the slider control may be continuously positionable at any position between the extents of the bar. In some examples, each of the positions along the slider control is associated with a ratio or a percentage. Each position along the slider control may be associated with a different ranking formula and/or a different weighting of criteria (e.g., cost, performance, timeliness, etc.). A user can provide input that adjusts a position of the slider control and the acquisition service may dynamically compute a new vendor score for each vendor from the existing vendor data based on the ranking formula and/or weighting associated with the current position of the slider control, and update the ranking of the vendors accordingly.

The vendor ranking may be based at least in part on this vendor score. In some examples, the vendor score may be based at least in part on an ability of each vendor to fulfill the set of requirements, a vendor's top scoring product(s) (i.e., best performing product) associated with each requirement, a vendor's least costly product(s) associated with each requirement, a vendor's ability to meet any absolute or enterprise requirements, or the like.

At 2222, the acquisition service 104B causes the GUI to dynamically display changes to a ranking of the plurality of vendors based on receiving the user input changing the position of the slider control. Adjusting a position of the slider control causes the acquisition service to dynamically compute a new vendor score for each vendor from the existing vendor data based on the ranking formula and/or weighting associated with the current position of the slider control, and update the ranking of the vendors accordingly.

Figure 23:
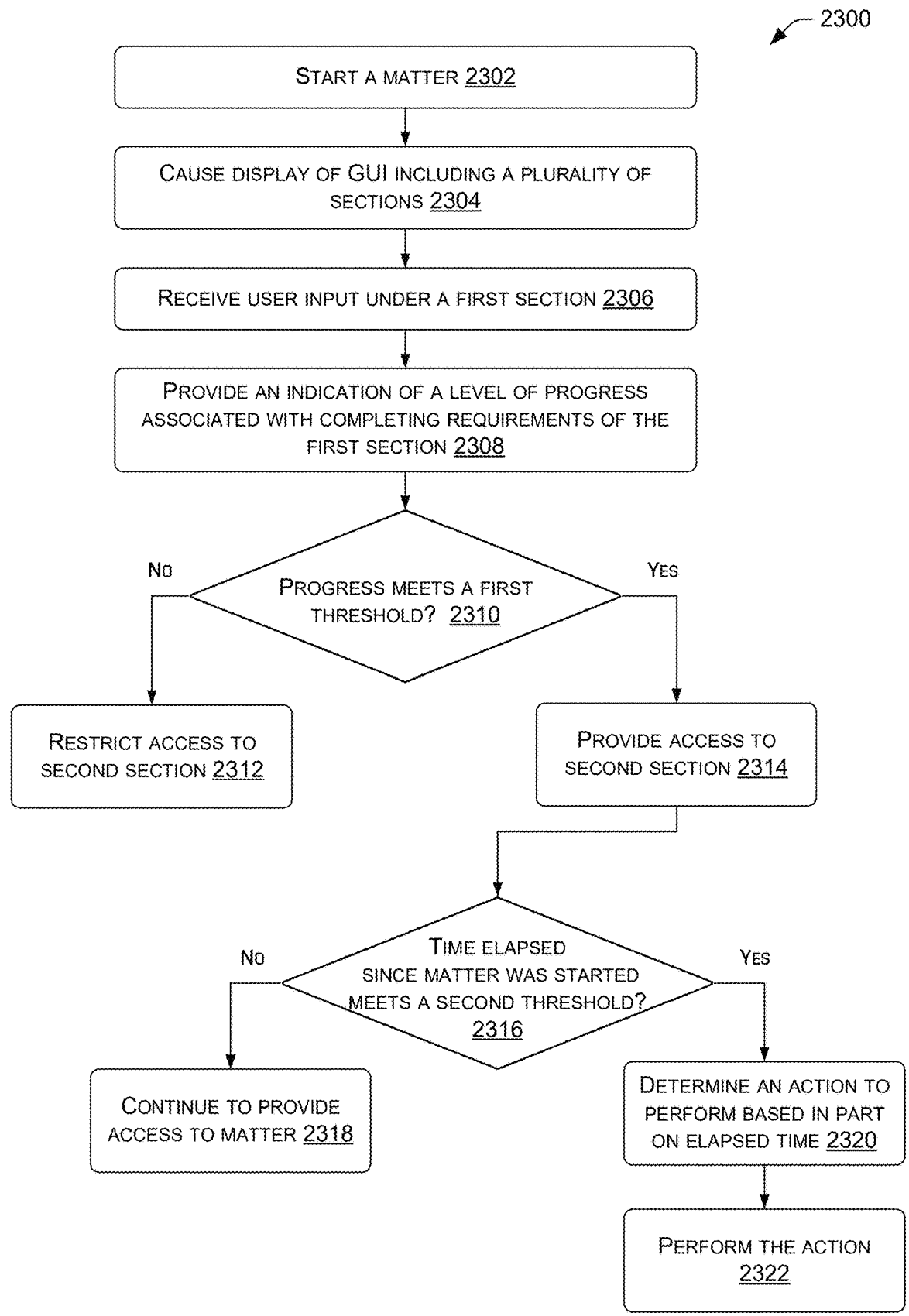
FIG. 23 illustrates an example "stage gating" process associated with techniques described herein.

FIG. 23 illustrates an example "stage gating" process associated with techniques described herein. For ease of discussion, the process 2300 is described as being performed in the architecture 100B of FIG. 1B. For example, one or more of the individual operations of the process 2300 may be performed by the device 102B, the computing device associated with the vendor 106B, and/or acquisition service 104B. However, the process 2300 may be performed in other architectures. Moreover, the architecture 100B may be used to perform other processes.

At 2302, a user may start an acquisition process, matter, project, or request. For example, a user may start a matter for acquiring items. For example, a hospital may be interested in purchasing new equipment including computers, servers, beds, medical devices (e.g., defibrillators, heart monitors, etc.), and so on. Here, the hospital may want to specify a set of requirements in a request or matter. The requirements may specify the types of computers, servers, beds, medical devices, and so on that the hospital may require to run its business. For example, the hospital may want to start an acquisition process for 100 touch screen tablet computers that have a particular processing speed, 10 servers that satisfy particular security measures, 50 new heart monitors that have particular features, and so on. In another example, a business may start a request for a laundry service and may want to specify requirements such as how many pieces of clothing will be picked-up, how often cleanings will be needed, how quickly clothing needs to be returned, and so on.

At 2304, the acquisition service may cause a GUI to be displayed on a computing device, the GUI comprising a plurality of sections or tabs. In some examples, the plurality of sections may include a first section associated with a setup of a matter, a second section associated with a set of requirements for acquiring one or more items, a third section associated with vendor data, a fourth section associated with one or more reports, a fifth section associated with one or more awards. In some instances, additional or other sections or tabs may be presented via the GUI to enable a user to specify or access a variety of information. For example, additional sections may include a networking section, server section, security section, interfacing section, remote access section, test environment section, project management section, management section, or the like. In some instances, the interface may provide the requestor with access to a vendor library, which displays details (e.g., features, specifications, etc.) regarding items that are available from vendors and which vendors can supply which items.

In some examples, individual sections are associated with one or more subsections. For example, the first section may be associated with multiple subsections, each of the multiple subsections may be associated with a progress indicator indicating a level of progress. In some examples, the multiple subsections may include a first subsection associated with a matter description, a second subsection associated with one or more locations associated with the matter, a third subsection associated with assigning a user to the matter, a fourth subsection associated with enterprise requirements, and a fifth subsection associated with administration of the matter.

At 2306, the acquisition service 104B may receive user input under a first section. For example, a requestor may provide some information under a project setup section. The project setup section may be associated with a variety of section requirements. For example, a user may be required to enter a matter or project name, project type, a project category, a project description, and/or add at least one project file. The project setup section may be associated with an indicator indicating whether the section requirements have been met for that particular section.

At 2308, the acquisition service may provide an indication of a level of progress associated with completing the section requirements of the first section. In some examples, the indication (or indicator) is a visual element such as an image or icon. In some examples, the indicator may change color as more section requirements are completed. For example, an indicator may be red when a section has not been started, an indicator may be yellow when some but not all section requirements have been met, and an indicator may be green when all or a threshold level of section requirements are complete. In some examples, the indicator may be shown as a percentage, progress wheel, progress bar, or any combination thereof.

At 2310, the acquisition service may determine whether a user has completed a threshold level of section requirements. If a threshold level of section requirements has not been completed or met, the user may not be able to access one or more subsequent sections. For example, a user may be required to enter a project name (i.e., the threshold section requirement for a first section) before being granted access to any subsequent sections. In another example, a user may be required to enter at least one location (i.e., the threshold section requirement) before granted access to a subsequent team members section. Sections and subsections may be associated with different section requirements and therefore have different threshold requirements. In some examples, some sections or subsections may not have section requirements or have a very low section requirement (i.e., a user may acknowledge that he or she has reviewed a particular section). The section requirements allow the acquisition service to facilitate a "stage gating" process in order to ensure that the required information is completed before the sales process moves to the next step. In some examples, the acquisition service 104B may send a notification to a user to complete the first section. In some examples, the acquisition service 104B receives additional input under the first section and determines that, based on the additional input, the level of progress associated with the first section meets or exceeds the first threshold. The acquisition service 104B may then provide access to the second section based at least in part on the level of progress associated with the first section meeting or exceeding the first threshold.

At 2314, the acquisition service may determine that a threshold level of section requirements has been completed for a first section and provide the user access to a second section. For example, a user may have added at least one location to a project under a first section (i.e., a first threshold section requirement) and may access a second section where the user may assign one or more users to the project. In some examples, the user may not be able to access a third section directed to enterprise requirements until the user has added at least two locations to a project (i.e., a second threshold section requirement).

At 2316, the acquisition service may determine whether an amount of time that has elapsed since a matter was started meets a certain threshold. In some examples, the acquisition service may track the amount of time that has elapsed since a matter was started. In some examples, the acquisition service may estimate or track the amount of time left until a matter may be completed (e.g., when a vendor fulfils an acquisition request). In some examples, the acquisition service may track the amount of time that has elapsed since a user was notified about starting a task, completing a task, completing a particular section, updating a particular task or section, or the like.

At 2318, the acquisition service may continue to provide a user access to a matter or one or more sections associated with the acquisition service if the time elapsed since the matter was started does not meet a threshold period of time. In some examples, the acquisition service may determine that the amount of time remaining until the matter is to be completed is below a threshold period of time. For example, if a user was granted three days to complete a task, such as entering requirements for a particular department at a particular location, and the acquisition service determines that the task is due in one day, the acquisition service may continue to provide the user access to the assigned task and associated sections. In some examples, the acquisition service may send the user a notification or reminder that the task is due within a certain amount of time (e.g., the task is to be completed within 24 hours).

At 2320, the acquisition service may determine that the time that has elapsed since a matter was started meets a threshold period of time. For example, based on an amount of time that has passed since the matter was set up and/or an amount of time remaining until the matter is to be completed (e.g., this could be a total project completion date or simply a milestone date for a part of the project), the acquisition service can take one or more actions to promote completion. In some examples, the action may include sending a reminder to a first user from whom the input was received. In some examples, the reminder may escalate in frequency, urgency, and/or in the number and role of recipients based on an amount of time that has passed since the matter was set up and/or an amount of time remaining until the matter is to be completed. For instance, if the user assigned to complete the task does not do so within some time, the system may notify his/her manager, administrator, etc. In some examples, the action may include sending a reminder to a second user different than the first user (e.g., manager, a coworker in the same department and/or location, administrator, etc.).

In some examples, the action may include applying a default action to complete the first action. Default actions may include completing one or more portions of the project based on preset or default instructions. For instance, default actions may include automatically approving any proposed/tentative selections/inputs. For example, if a first user input proposed responses but was waiting on approval by a second user (e.g., manager, purchasing agent, etc.), if the approval is not received within a specified period of time or by a certain date, the proposed responses may be automatically approved. In some examples, the action may include granting a permission to the first user or another user to complete the first section. For example, if approval is not received within a period of time or by a due date, the first user or a third user (e.g., supervisor, administrator, coworker) may be granted permissions to approve the proposed responses. In some examples, the action may include reassigning responsibility for completion of the first section to a different user. If a required task is not completed within a specified period of time, by a certain date, and/or after a certain number of reminders, the system may reassign the task to another user.

At 2318, the acquisition service 104B may perform the action. The action may include, for example, sending a reminder to a first user from whom the input was received. In some examples, the reminder may escalate in frequency, urgency, and/or in the number and role of recipients based on an amount of time that has passed since the matter was set up and/or an amount of time remaining until the matter is to be completed. For instance, if the user assigned to complete the task does not do so within some time, the system may notify his/her manager, administrator, etc. In some examples, the action may include sending a reminder to a second user different than the first user (e.g., manager, a coworker in the same department and/or location, administrator, etc.).

In some examples, the action may include applying a default action to complete the first action. Default actions may include completing one or more portions of the project based on preset or default instructions. For instance, default actions may include automatically approving any proposed/tentative selections/inputs. For example, if a first user input proposed responses but was waiting on approval by a second user (e.g., manager, purchasing agent, etc.), if the approval is not received within a specified period of time or by a certain date, the proposed responses may be automatically approved. In some examples, the action may include granting a permission to the first user or another user to complete the first section. For example, if approval is not received within a period of time or by a due date, the first user or a third user (e.g., supervisor, administrator, coworker) may be granted permissions to approve the proposed responses. In some examples, the action may include reassigning responsibility for completion of the first section to a different user. If a required task is not completed within a specified period of time, by a certain date, and/or after a certain number of reminders, the system may reassign the task to another user.

In some examples, one or more operations described herein may be implemented using machine learning techniques. By way of example and not limitation, the process of obtaining vendor information regarding available products or services, the process of generating a taxonomy or other representation of particular product or service area, the process of generating requirements gathering questionnaires to be sent to requestors, the process of generating requirements specifications to be sent to vendors regarding their ability to meet a requestor's requirements, and the process of ranking vendors based on cost, performance, and/or other factors may all be implemented in whole or in part by machine learning techniques. In some instances, aspects of some or all of the components discussed herein can include any models, algorithms, and/or machine learning algorithms. For example, in some instances, one or more of the modules 122B, 124B, and/or 126B described as being stored in the memory 120B and/or the operations described with reference to FIGS. 1A, 8, 22, and 23 can be implemented as a neural network or other machine learned model. As used herein, a neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning (e.g., K Nearest Neighbor's algorithm), unsupervised learning (e.g., K-Means Clustering Algorithm), semi-supervised learning, etc.

In examples in which the database is organized at least in part as a knowledge graph, machine learned techniques can be used to make logical inferences about the nature of a product based on how the product is stored in the knowledge graph (e.g., the product node, the nodes connected to the product node, links, and semantic labels associated with the product node and/or nodes connected therewith). For instance, a machine learned model can be trained by inputting training data (e.g., knowledge graphs) to recognize dependencies, compatibilities, or other relationships between products or features. As another example, the machine learned model may be configured to identify or suggest composite categories of products or features that may be more relevant to a purchaser. For example, a home theater has speakers, video display, seating, and even lighting. A high-end home can have speakers (for music), lighting, and seating with a home theater room. There are a lot of different types of speakers, lights, seating, and display systems on the market that can support a broad set of purposes. Some speakers, lights, seats, might be suitable for use both a home theater and throughout the home (e.g., a kitchen, living room, bedrooms, etc.). However, while not necessarily apparent to a purchaser, vendor, or other users, these various different uses may not be relevant to all purchasing decisions. A machine learned model trained to identify or suggest composite categories can help to determine that these different uses are not important to a particular purchasing decision (e.g., based on requestor requirements) and can suggest combining smaller more specialized categories into larger, more system-oriented categories, while ensuring that data is shared and 'normalized' throughout them. This may improve the performance of the computing system by enabling the system to provide more accurate and pertinent recommendations to a requestor/purchaser.

As yet another example, the machine learned model may be configured to select and/or recommend vendors. In some instances, an overfitting problem can exist when a particular vendor has a vastly superior product to anything else on the market. Take for example a new electrocardiogramachine, the X2022, made by Acme EEG. At the time of its introduction the X2022 was the only product of its kind, and Acme EEG was the only company offering it. It's still an Electrocardiograph, but it had every feature imaginable. Because of this, the X2022 would be the best match for every configuration that dealt with Electrocardiographs, the acquisition service wouldn't recommend anything else for that vendor and/or may recommend that vendor at the exclusion of other qualified vendors. This is a problem, because other qualified vendors and products would not get considered. In that case, selecting vendors to whom to send to requirements specifications at operation 116A, when ranking vendors at operation 120A, and/or when generating report 122A, a machine learned model may be used to avoid this overfitting problem. For example, by using a machine learned model trained to recognize this situation and expand or alter the ranking parameters in such instances to include other qualified, though arguably inferior, products. Machine learned models that may be used in this overfitting example may include, for example, the K-means Clustering and/or KNN algorithms. In other examples, other algorithmic solutions may be applied to address this overfitting problem and avoid bias in recommendations.

As other non-limiting examples, machine learning techniques may also enable to the system to identify trends in categories, identify relative importance of features relative to each other, identify relative importance of features to different types of customers (e.g., a particular feature may be more or less important to hospital purchasers relative to doctors' offices, emergency clinics, pharmacies or types of purchasers), to recommend or promote certain products or features to a purchaser based on similarities to other purchasers, etc.

The methods 100A, 800, 2200, and 2300 are illustrated as collections of blocks in logical flow graphs, which represent sequences of operations that can be implemented on whole or in part in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the methods 100A, 800, 2200, and 2300 may be combined in whole or in part with each other or with other methods.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A computing system comprising:
   one or more processors; and
   one or more memory devices storing instructions that, when executed by the one or more processors, cause the computing system to perform operations comprising:
   identifying a plurality of uses associated with a plurality of specialized categories for an item;
   combining the plurality of specialized categories into a composite category to improve performance of the computing system, wherein the combining is performed by a machine learning algorithm trained based on inputting a knowledge graph of item nodes to suggest the composite category based on a determination that one or more particular uses for the item from the plurality of uses are not relevant to a purchasing decision;
   outputting a recommendation of the item based on the composite category determined by the machine learning algorithm;
   receiving entity data for a plurality of entities, the entity data including information about a requested item;
   ranking the plurality of entities based at least in part on performance level of the plurality of entities and a total cost of acquiring the requested item from the plurality of entities; and
   causing a graphical user interface (GUI) to be displayed at a computing device, the GUI comprising:
   a table including the ranking of the plurality of entities; and
   a slider control that is adjustable to multiple settings associated with multiple different weightings slidable along a length of a bar, wherein the slider control includes multiple different positions, and each position of the multiple different positions is associated with a different weighting of the performance level relative to the total cost of acquiring the requested item;
   receiving a user input changing a position of the slider to the control to change among the multiple settings; and
   causing the GUI to dynamically display changes to the ranking of the plurality of entities based on receiving the user input changing to change among the multiple settings position of the slider control.

2. The computing system of claim 1, wherein the ranking comprises:
   inputting the entity data and a requirements specification to a machine learned model trained to rank entities based on an extent of their ability to meet individual requirements of the requirements specification; and
   receiving, from the machine learned model, an output including the ranking of the plurality of entities.

3. The computing system of claim 1, the GUI further comprising:
   a bar graph comprising an x-axis representing the plurality of entities and a y-axis representing a score, the score based at least in part on the performance level and the total cost of acquiring the requested item.

4. The computing system of claim 3, further comprising:
   causing the GUI to update the bar graph based at least in part on receiving the user input to change among the multiple settings the change in position of the slider control.

5. The computing system of claim 1, the GUI further comprising a table associated with an entity cost breakdown of the total cost of acquiring the item from individual entities of the plurality of entities, the computing system further comprising;
   receiving user input selecting a cost icon associated with the table;
   displaying, via the GUI, the table including the total cost of acquiring the item and a total lifecycle cost over a period of time, the total lifecycle cost based at least in part on at least one of recurring costs and episodic costs.

6. The computing system of claim 1, wherein the GUI further comprises a total project cost icon, the operations further comprising:
   receiving user input selecting the total project cost icon; and
   displaying, via the GUI, a total project cost for acquiring items associated with a project.

7. The computing system of claim 6, wherein the GUI further comprises a total project lifecycle cost icon, the operations further comprising:
   receiving user input selecting the total project lifecycle cost icon;
   displaying, for individual entities of the plurality of entities and via the GUI, recurring costs and episodic costs of acquiring items associated with the project;
   receiving user input changing a period of time associated with the total project lifecycle cost; and
   displaying, via the GUI, changes to the total project lifecycle cost based at least in part on the user input changing the period of time.

8. The computing system of claim 1, the operations further comprising receiving user input specifying a relative importance of the requested item relative to one or more other items,
  wherein the ranking is further based at least in part on the relative importance of the requested item relative to the one or more other items.

9. The computing system of claim 1, wherein the GUI further comprises an entity performance table representing a degree to which individual entities of the plurality of entities meet one or more enterprise requirements as a percentage, the entity performance table comprising:
  a first column including entities that are qualified based at least in part on the percentage meeting or exceeding a first threshold percentage;
  a second column including entities that are partially qualified based at least in part on the percentage being less than the first threshold and meeting or exceeding a second threshold; and
  a third column including entities that are disqualified based at least in part on the percentage being less than the second threshold.

10. A computer-implemented method comprising:
  identifying a plurality of uses associated with a plurality of specialized categories for an item;
  combining the plurality of specialized categories into a composite category to improve performance of a computing system, wherein the combining is performed by a machine learning algorithm trained based on inputting a knowledge graph of item nodes to suggest the composite category based on a determination that one or more particular uses for the item from the plurality of uses are not relevant to a purchasing decision;
  outputting a recommendation of the item based on the composite category determined by the machine learning algorithm;
  receiving entity data for a plurality of entities, the entity data including information about a requested item;
  ranking the plurality of entities based at least in part on performance level of the plurality of entities and a total cost of acquiring the requested item from the plurality of entities; and
  causing a graphical user interface (GUI) to be displayed at a computing device, the GUI comprising:
    a table including the ranking of the plurality of entities; and
    a control that is adjustable to multiple settings associated with multiple different weightings of the performance level relative to the total cost of acquiring the requested item;
    receiving a user input to the control to change among the multiple settings; and
    causing the GUI to dynamically display changes to the ranking of the plurality of entities based on receiving the user input to change among the multiple settings.

11. The computer-implemented method of claim 10, wherein the ranking comprises:
  inputting the entity data and a requirements specification to a machine learned model trained to rank entities based on an extent of their ability to meet individual requirements of the requirements specification; and
  receiving, from the machine learned model, an output including the ranking of the plurality of entities.

12. The computer-implemented method of claim 10, the GUI further comprising:
  a bar graph comprising an x-axis representing the plurality of entities and a y-axis representing a score, the score based at least in part on the performance level and the total cost of acquiring the requested item,
  wherein the computer-implemented method further comprises causing the GUI to update the bar graph based at least in part on receiving the user input to change among the multiple settings.

13. The computer-implemented method of claim 10, the GUI further comprising a table associated with an entity cost breakdown of the total cost of acquiring the item from individual entities of the plurality of entities, the computing system further comprising:
  receiving user input selecting a cost icon associated with the table;
  displaying, via the GUI, the table including the total cost of acquiring the item and a total lifecycle cost over a period of time, the total lifecycle cost based at least in part on at least one of recurring costs and episodic costs.

14. The computer-implemented method of claim 10, wherein the GUI further comprises a total project cost icon, the computer-implemented method further comprising:
  receiving user input selecting the total project cost icon; and
  displaying, via the GUI, a total project cost for acquiring items associated with a project.

15. The computer-implemented method of claim 10, the computer-implemented method further comprising receiving user input specifying a relative importance of the requested item relative to one or more other items,
  wherein the ranking is further based at least in part on the relative importance of the requested item relative to the one or more other items.

16. The computer-implemented method of claim 10, wherein the GUI further comprises an entity performance table representing a degree to which individual entities of the plurality of entities meet one or more enterprise requirements as a percentage, the entity performance table comprising:
  a first column including entities that are qualified based at least in part on the percentage meeting or exceeding a first threshold percentage;
  a second column including entities that are partially qualified based at least in part on the percentage being less than the first threshold and meeting or exceeding a second threshold; and
  a third column including entities that are disqualified based at least in part on the percentage being less than the second threshold.

17. One or more non-transitory computer-readable media storing instructions that, when executed by one or more processors, configures a computing system to perform operations comprising:
  identifying a plurality of uses associated with a plurality of specialized categories for an item;
  combining the plurality of specialized categories into a composite category to improve performance of the computing system, wherein the combining is performed by a machine learning algorithm trained based on inputting a knowledge graph of item nodes to suggest the composite category based on a determination that one or more particular uses for the item from the plurality of uses are not relevant to a purchasing decision;
  outputting a recommendation of the item based on the composite category determined by the machine learning algorithm;

receiving entity data for a plurality of entities, the entity data including information about a requested item;

ranking the plurality of entities based at least in part on performance level of the plurality of entities and a total cost of acquiring the requested item from the plurality of entities; and causing a graphical user interface (GUI) to be displayed at a computing device, the GUI comprising:

a table including the ranking of the plurality of entities; and a control that is adjustable to multiple settings associated with multiple different weightings of the performance level relative to the total cost of acquiring the requested item;

receiving a user input to the control to change among the multiple settings; and causing the GUI to dynamically display changes to the ranking of the plurality of entities based on receiving the user input changing among the multiple settings.

18. The one or more non-transitory computer-readable media of claim 17, wherein the ranking comprises:

inputting the entity data and a requirements specification to a machine learned model trained to rank entities based on an extent of their ability to meet individual requirements of the requirements specification; and receiving, from the machine learned model, an output including the ranking of the plurality of entities.

19. The one or more non-transitory computer-readable media of claim 17, the GUI further comprising:

a bar graph comprising an x-axis representing the plurality of entities and a y-axis representing a score, the score based at least in part on the performance level and the total cost of acquiring the requested item, wherein the operations further comprise causing the GUI to update the bar graph based at least in part on changing among the multiple settings.

20. The one or more non-transitory computer-readable media of claim 17, the GUI further comprising a table associated with an entity cost breakdown of the total cost of acquiring the item from individual entities of the plurality of entities, the computing system further comprising;

receiving user input selecting a cost icon associated with the table;

displaying, via the GUI, the table including the total cost of acquiring the item and a total lifecycle cost over a period of time, the total lifecycle cost based at least in part on at least one of recurring costs and episodic costs.

21. The one or more non-transitory computer-readable media of claim 17, wherein the GUI further comprises a total project cost icon, the operations further comprising:

receiving user input selecting the total project cost icon; and displaying, via the GUI, a total project cost for acquiring items associated with a project.

22. The one or more non-transitory computer-readable media of claim 17, the operations further comprising receiving user input specifying a relative importance of the requested item relative to one or more other items, wherein the ranking is further based at least in part on the relative importance of the requested item relative to the one or more other items.

\* \* \* \* \*